(12) United States Patent
Ebisawa et al.

(10) Patent No.: US 6,537,423 B1
(45) Date of Patent: Mar. 25, 2003

(54) OPTICAL DISK PRODUCTION DEVICE

(75) Inventors: Shoei Ebisawa, Kounosu (JP); Kiyoshi Oshima, Kitaadachi-gun (JP); Norio Tsunematsu, Ageo (JP); Daisuke Ito, Ageo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/700,866

(22) PCT Filed: Sep. 24, 1999

(86) PCT No.: PCT/JP99/05206

§ 371 (c)(1),
(2), (4) Date: Nov. 20, 2000

(87) PCT Pub. No.: WO00/57414

PCT Pub. Date: Sep. 28, 2000

(30) Foreign Application Priority Data

Mar. 23, 1999 (JP) .......................... 11-078696
Mar. 23, 1999 (JP) .......................... 11-078697
Jun. 25, 1999 (JP) .......................... 11-180965

(51) Int. Cl.7 ................................ G11B 7/26
(52) U.S. Cl. ................ 156/379.6; 156/379.8; 156/556; 156/578
(58) Field of Search ................ 156/379.6, 379.8, 156/538, 556, 578

(56) References Cited

U.S. PATENT DOCUMENTS 5,681,634 A * 10/1997 Miyamoto et al. ......... 428/64.6
5,779,855 A * 7/1998 Amo et al. ............... 156/379.6
5,938,891 A    8/1999 Kashiwagi et al.
6,121,339 A * 9/2000 Kominami et al. ........... 522/31
6,180,200 B1 * 1/2001 Ha et al. .................. 428/64.1
6,406,770 B1 * 6/2002 Ebisawa et al. ........... 428/64.1

FOREIGN PATENT DOCUMENTS

| EP | 0 793 224 B1 | 9/1997 | |
| JP | 61-126648 | 6/1986 | |
| JP | 9-320121 | 12/1997 | |
| JP | 10-112081 | 4/1998 | |
| WO | WO 9735720 A1 | 10/1997 | .......... B32B/31/00 |
| WO | WO 9854708 A1 | 12/1998 | .......... G11B/7/26 |

* cited by examiner

Primary Examiner—Michael W. Ball
Assistant Examiner—John T. Haran
(74) Attorney, Agent, or Firm—Armstrong, Westerman & Hattori, LLP

(57) ABSTRACT

Optical disc manufacturing apparatus of the present invention comprises a nozzle for ejecting TV curable cationic composition, ultraviolet radiation means for radiating ultraviolet rays while the UV curable cationic composition dropping from the nozzle reaches a disc substrate; and superimposing means for superimposing the two disc substrates one upon another by allowing planes onto which the UV curable cationic composition is dropped to be faced. To allow the UV curable cationic composition to spread between the two disc substrates superimposed by the superimposing means: a statically placing plane for placing the disc should be provided. A stacking means for stacking the plurality of discs and rigid disc placing means for placing a rigid disc having a flat plane on the disc in the course of stacking the plurality of discs should be provided.

10 Claims, 26 Drawing Sheets

FIG. 13

| No | | EVALUATED PLANE | EVALUATED DIRECTION | WARP ANGLE |
|---|---|---|---|---|
| EXAMPLE | | DISC UPPER PLANE | SEMI-DIAMETER DIRECTION | 0.32° |
| | | | CIRCUMFERENCE DIRECTION | 0.17° |
| | | DISC DOWN SIDE PLAN | SEMI-DIAMETER DIRECTION | 0.29° |
| | | | CIRCUMFERENCE DIRECTION | 0.15° |
| COMPARISON EXAMPLE 1 | | DISC UPPER PLANE | SEMI-DIAMETER DIRECTION | 0.69° |
| | | | CIRCUMFERENCE DIRECTION | 0.23° |
| | | DISC DOWN SIDE PLAN | SEMI-DIAMETER DIRECTION | 0.69° |
| | | | CIRCUMFERENCE DIRECTION | 0.21° |
| COMPARISON EXAMPLE 2 | | DISC UPPER PLANE | SEMI-DIAMETER DIRECTION | 0.48° |
| | | | CIRCUMFERENCE DIRECTION | 0.20° |
| | | DISC DOWN SIDE PLAN | SEMI-DIAMETER DIRECTION | 0.46° |
| | | | CIRCUMFERENCE DIRECTION | 0.19° |
| COMPARISON EXAMPLE 3 | | DISC UPPER PLANE | SEMI-DIAMETER DIRECTION | 0.65° |
| | | | CIRCUMFERENCE DIRECTION | 0.22° |
| | | DISC DOWN SIDE PLAN | SEMI-DIAMETER DIRECTION | 0.67° |
| | | | CIRCUMFERENCE DIRECTION | 0.20° |

FIG. 14
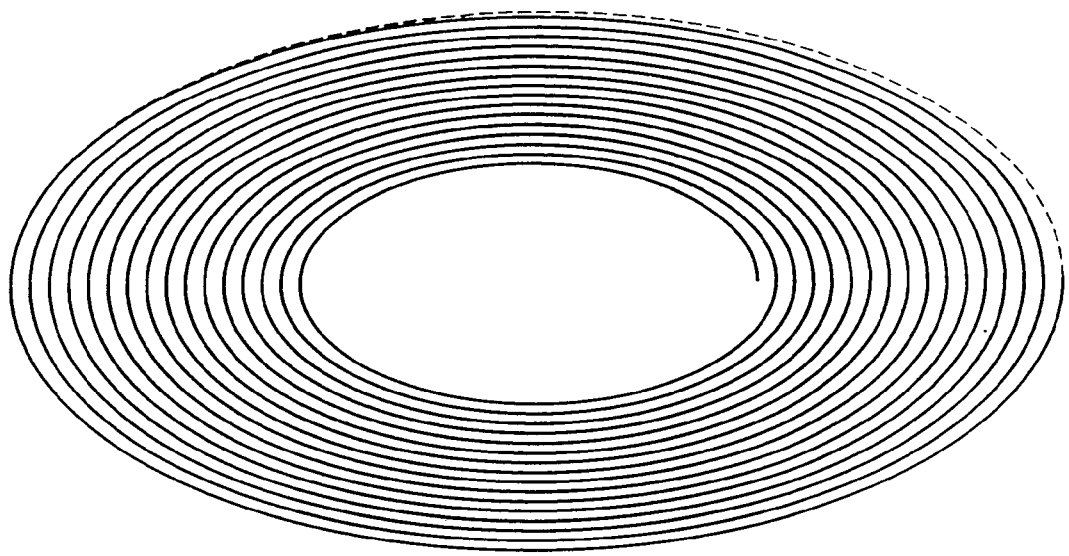
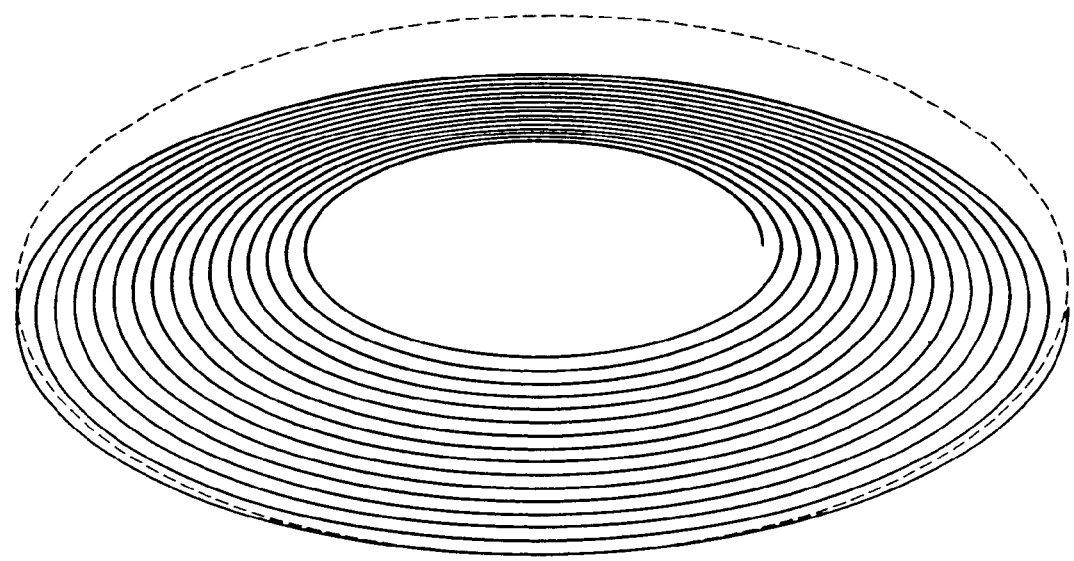

FIG. 16

| EVALUATED PLANE | | EVALUATED DIRECTION | WARP ANGLE | AVERAGE THICKNESS OF DISC PREPARED AT AMBIENT TEMPERATURE OF 24°C | AVERAGE THICKNESS OF DISC PREPARED AT AMBIENT TEMPERATURE OF 27°C |
|---|---|---|---|---|---|
| EXAMPLE | DISC UPPER PLANE | SEMI-DIAMETER DIRECTION | 0.29° | 35.1 μm | 35.3 μm |
| | | CIRCUMFERENCE DIRECTION | 0.13° | | |
| | DISC DOWN SIDE PLAN | SEMI-DIAMETER DIRECTION | 0.27° | | |
| | | CIRCUMFERENCE DIRECTION | 0.11° | | |

FIG. 17

| | EVALUATED PLANE | EVALUATED DIRECTION | WARP ANGLE | AVERAGE THICKNESS OF DISC PREPARED AT AMBIENT TEMPERATURE OF 24°C | AVERAGE THICKNESS OF DISC PREPARED AT AMBIENT TEMPERATURE OF 27°C |
|---|---|---|---|---|---|
| COMPARISON EXAMPLE | DISC UPPER PLANE | SEMI-DIAMETER DIRECTION | 0.28° | 35.1 μm | 45.5 μm |
| | | CIRCUMFERENCE DIRECTION | 0.15° | | |
| | DISC DOWN SIDE PLAN | SEMI-DIAMETER DIRECTION | 0.29° | | |
| | | CIRCUMFERENCE DIRECTION | 0.10° | | |

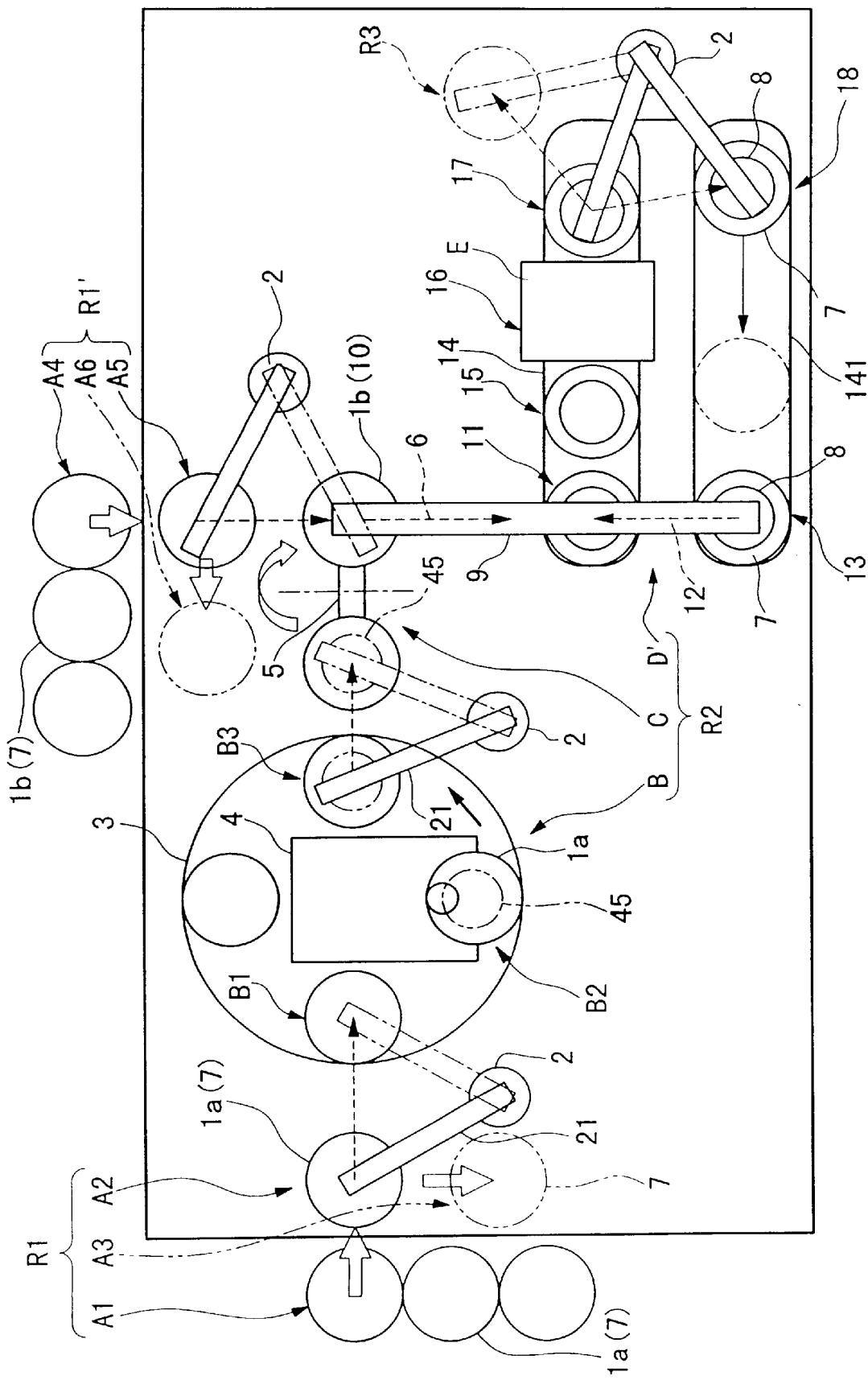

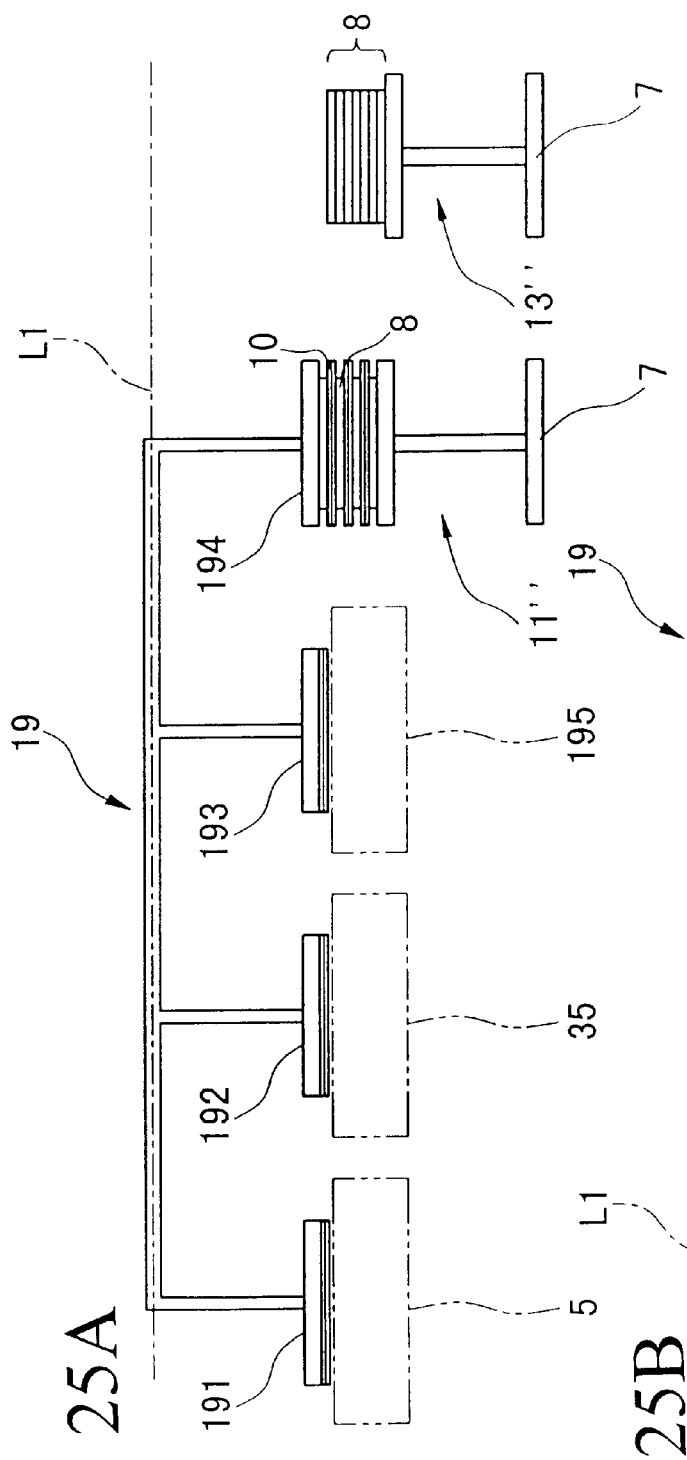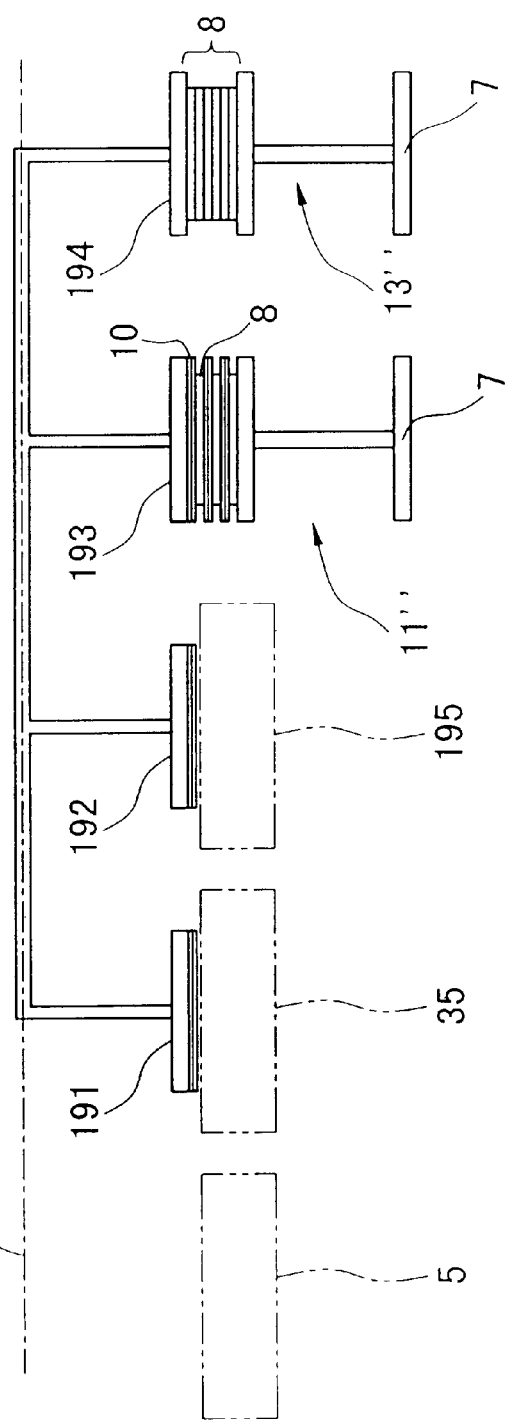

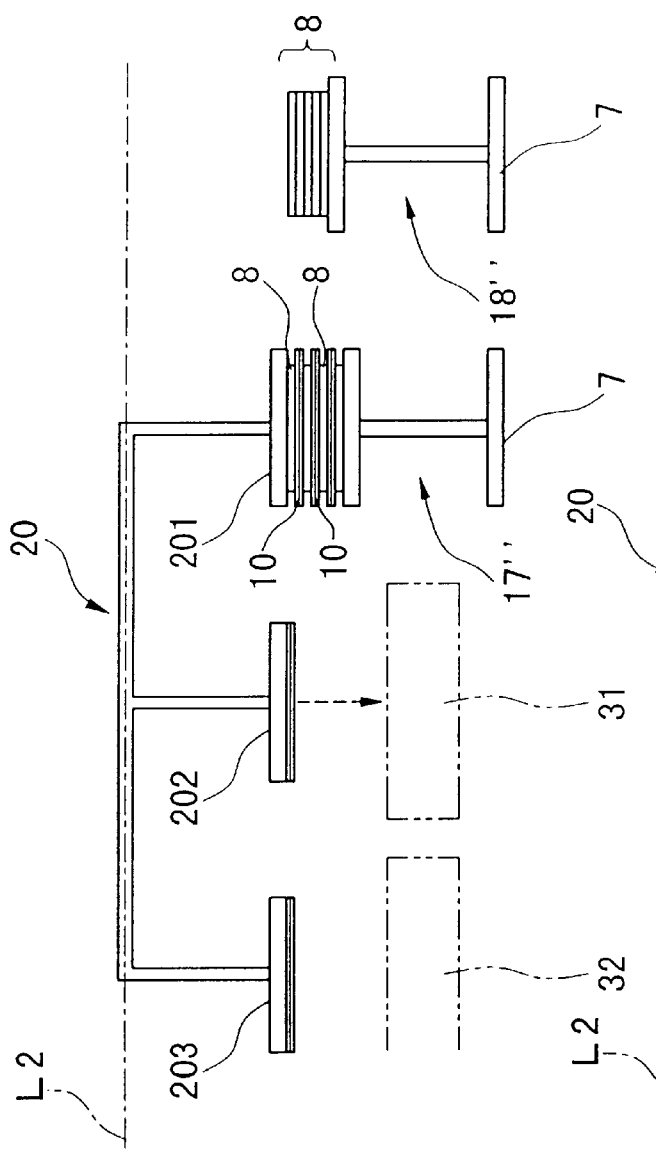
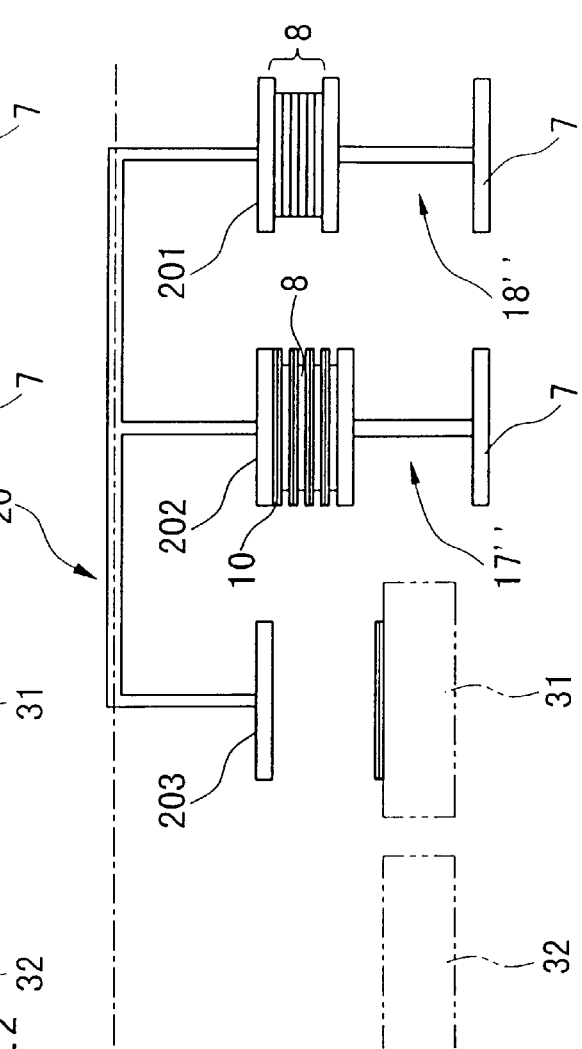
FIG. 27A
FIG. 27B

OPTICAL DISK PRODUCTION DEVICE

TECHNICAL FIELD

The present invention relates to an optical disc manufacturing apparatus for manufacturing optical discs such as digital video/versatile discs (hereinafter referred to as DVD) adopting particularly a bonding method.

BACKGROUND ART'

When two plate shaped substances are stuck together using UV curable composition as adhesive, UV curable radical polymerization composition has heretofore been applied to surfaces to be bonded uniformly by a spin coating method, a screen printing method and the like, which have been existing technologies, and the surfaces to be bonded have been superposed on another, so as to be opposite, followed lower by curing the UV curable composition by irradiating ultraviolet rays continuously tinuously emitting light thereonto.

A high pressure mercury lamp, a metal halide lamp, a mercury-xenon lamp and the like have heretofore been used as an ultraviolet irradiation source. In such methods, there has been a problem that heat is apt to be caused owing to continuous light emission of the lamps and the heat has adverse effects on deformation of the plate shaped substances and mechanical properties thereof.

Furthermore, in the lamps of such lampes which emit light continuously, since it takes usually a time of more than several minutes until a light emission is stabilized lized after turning on the lamp, turning the lamp off/on is not easy. Accordingly, when the manufacturing is carried out continuously, the lamp must be kept turned on. Assuming that a time (cycle time of a production) required for bonding performed formaed one time (one cycle) be five seconds, and a time required for an ultraviolet irradiation radiation of five seconds be two seconds, the remaining three seconds are consumed uselessly wasting energy.

Furthermore, in the case where the two plate shaped substances are stuck together using the UV curable composition as the adhesive, when at least one of the plate shaped substances offers permeability to ultraviolet light, a severe problem does not occur. However, when the plate shaped substance attenuates an ultraviolet intensity, problems occur.

Specifically, the foregoing DVD and the like have a problem that because of the existence of an Al thin layer or the like in discs, the ultraviolet intensity is significantly attenuated by the thin layer and the layer until ultraviolet rays reach a bonding layer using the foregoing UV curable radical polymerization composition as the adhesive, so that curing-bonding with a high efficiency cannot be performed.

In addition, when it is intended to expedite the cure, lamp equipment having a large capacity is necessary, leading to an inevitable increase in the cost of products. Moreover, use of the lamp having a large capacity causes also a problem producing much conductive heat and radiation heat from the lamp, and a disc tends to be deformed. formed. In order to prevent this, cooling equipment around the lamp is additionally necessary, and the whole of the apparatus has been obliged to be large in size and more intricate.

On the contrary, when it is intended to perform ultraviolet curing with small capacity of the lamp equipment, though the ultraviolet curing is possible, a radiation time of several tens of seconds or more is required, so that the ultraviolet curing has been obliged to be poor in practicability.

A bonding method of a disc for solving the foregoing problems has been proposed in Japanese Patent Application Laid-Open No. 9-193249. Specifically, the bonding method of the disc disclosed in Japanese Patent Application Laid-Open No. 9-193249 has a feature in that ultraviolet rays are not radiated continuously but the ultraviolet rays are radiated in pulses. The method to radiate the ultraviolet ray continuously is the epoch-making one that can restrain power consumption for the ultraviolet radiation and increase the number of plate shaped substances to be stuck per unit of time, and can prevent a warp of the disc from occurring after sticking, compared to the case where the ultraviolet ray is continuously radiated.

Incidentally, there is also the following problem in the method by the flashing ultraviolet radiation. Specifically, when objects to be bonded is a DVD, for reasons of a structure of the DVD, an ultraviolet ray passes through an Al film which offers poor permeability to ultraviolet ray and reaches UV curable composition to cure this compound. Accordingly, when the Al film is thick by a product specification, a curing efficiency is deteriorated. Moreover, among the DVDs, for a DVD-RAM in which a film, for example, a ZnS—$SiO_2$ film exists, through which ultraviolet rays cannot pass substantially, such a method cannot be adopted, in which the ultraviolet ray is radiated onto UV curable composition existing on sticking planes of two discs to cure the UV curable composition and bond the sticking planes to each other.

An effective bonding method against these problems has been disclosed in Japanese Patent Laid-Open No. 9-69239. The method stated in Japanese Patent Laid-Open No. 9-69239 has a feature in that UV curable cationic composition offering delayed action is used compared to the conventional method in which the UV curable radical polymerization composition has heretofore been used as the adhesive. To be more specific, the UV curable cationic composition is coated on the entire surface of one disc to be stuck, and ultraviolet is radiated onto the UV curable cationic composition after coating thereof Thereafter, the one disc is superposed on the other disc that is a sticking object, and then the UV curable cationic composition is hardened by compressing them to each other.

The method using the UV curable cationic composition stated in Japanese Patent Laid-Open No. 9-69239 is effective one in which bonding is possible when the Al film is thick or even in the DVD-RAM in which the ZnS—$SiO_2$ film and the like allowing no ultraviolet to pass therethrough substantially stantially exist.

However, also in the method stated in Japanese Patent Laid-Open No. 9-69239, points to be further improved were found out. In other words, in the method in which the ultraviolet is radiated after the UV curable cationic composition position is coated on the disc substrate, though the ultraviolet radiation is required quired only for the UV curable cationic composition essentially, the ultraviolet is radiated also onto the disc substrate formed of polycarbonate and the like inevitably. Such unnecessary ultraviolet radiation onto the disc substrate is apt to cause thermal deformation in the disc substrate such as the DVD having a thickness of 0.6 mm due to heat from a lamp that is an ultraviolet light source.

Moreover, in the curing of the UV curable cationic composition, polymerization is disturbed by humidity of the air. Accordingly, the UV curable cationic composition protruding from an outer periphery of the disc after the superposition is sticky owing to delay of the curing. In addition, some measures must be taken to prevent deformation of the UV curable cationic composition and slippage of the two disc substrates from each other. In the DVD, though it is required for a deflection angle of the disc to be equal to a predetermined value or less according the standard, it is not clear with what measure the deflection angle can be fit in a predetermined range.

Accordingly, the subject of the present invention is to provide an optical disc manufacturing apparatus capable of manufacturing an optical disc having less air bubble trapping and suppressed unevenness in curing even when the UV curable cationic composition is used, and preventing a deformation of the disc due to conductive heat and radiation heat from a lamp that have been considered to be a problem in the conventional methods.

DISCLOSURE OF THE INVENTION

The inventor of this application made investigations to solve the foregoing subjects, and obtained the following knowledge. Specifically, since an ultraviolet ray is radiated onto a disc substrate inevitably in the conventional methods in which ultraviolet radiation is performed after a UV curable cationic composition is coated on the disc substrate, the inventor examined to coat the UV curable cationic composition on the disc substrate after the ultraviolet radiation. In other words, the inventor obtained knowledge that the UV curable cationic composition should be coated on the disc substrate after the ultraviolet ray is radiated onto the UV curable cationic composition in a place where the ultraviolet ray is not radiated onto the disc substrate or where the disc substrate is not affected thermally even if the ultraviolet is radiated.

Then, as a concrete technique to radiate the ultraviolet onto the UV curable cationic composition before this compound is coated on the disc substrate, the inventor conclude that the ultraviolet should be radiated in a space where the UV curable cationic composition falling in the air until it reaches the disc substrate. Specifically, this is because a sufficient ultraviolet radiation amount can be secured if diameters of the UV curable cationic composition falling are made to be small.

An optical disc manufacturing apparatus of the present invention realizes the above described methods based on the knowledge obtained, and the optical disc manufacturing apparatus of the present invention comprises: a nozzle for ejecting UV curable cationic composition; ultraviolet radiation means for radiating ultraviolet while the UV curable cationic composition falling from the nozzle reaches a disc substrate; and superimposing means for superimposing the two disc substrate so as to allow faces thereof onto which the UV curable cationic composition falls to be opposite to each other, thus making one disc.

Furthermore, as a whole of the apparatus, provided are a disc substrate taking-out area for taking out a plurality of disc substrates one by one from a disc holder which holds them in a stacked state, the foregoing nozzle and the foregoing ultraviolet radiation means, and provided are a disc preparation area for sticking the two disc substrates taken out together interposing the foregoing UV curable cationic composition therebetween, thus obtaining one disc, a disc checking area for checking the obtained disc, and a disc stacking region for stacking the foregoing disc holder with the discs after completion of checking.

Here, the fall of the UV curable cationic composition may be performed by dropping or by allowing this compound to fall continuously in such a manner that thick malt syrup falls stringily.

In the apparatus constituted as above, since the ultraviolet is previously radiated onto the UV curable cationic composition and thereafter the compound is spread on the disc substrate, air is not trapped therein, and the disc without unevenness in curing can be obtained. Specifically, the ultraviolet is radiated while the UV curable cationic composition falls from the nozzle to the disc substrate, so that the ultraviolet ray can be radiated onto the inside thereof uniformly, unevenness in curing does not occur as a result even in a method allowing the UV curable cationic composition to fall so as to form a ring shape, such as a spin coater method and the like, and an air bubble trapping prevention effect is also exerted. In addition, since sticking is performed without direct radiation of the ultraviolet ray onto the surface of the disc substrate, deformation of the disc after sticking can be avoided.

By the way, in the present invention, the UV curable cationic composition made from UV curable cationic resin (epoxy resin) and cationic polymerization photoinitiator is used. For this compound, the degree of cure is not saturated immediately after the ultraviolet radiation but saturated substantially after the passage of a predetermined time (such nature thereof is called a delayed action), unlike the degree of cure for ordinary UV curable composition is saturated substantially at approximately the same time as the ultraviolet radiation. Specifically, there is a time until the degree of cure is saturated after the ultraviolet radiation, that is, there is a pot life. The UV curable cationic composition containing the UV curable cationic resin and the cationic polymerization photoinitiator as essential ingredients should be made to be substantially solventfree liquid for the sake of its easiness of falling to the disc substrate. It is more preferable to select the composition of the compound so that the compound itself and its cured bonding layer become transparent.

A viscosity of the compound set to 50 to 10000 mPa·s at a temperature of 25° C., more preferably 100 to 1000 mPa·s. A time during after the ultraviolet radiation is completed until the degree of cure saturates and an absolute value of the saturation degree of cure, are adjusted depending on kinds and the ratio in weight of the UV curable cationic resin and the cationic polymerization photoinitiator combined with the resin. For example, the time is adjusted to 3 to 30 minutes, preferably 5 to 25 minutes, more preferably 5 to 15 minutes, and most preferably 5 to 10 minutes.

As UV curable cationic composition, all of known compounds can be used, and epoxy resins containing cationic polymerization photoinitiator fall into this. As the cationic polymerization photoinitiator, sulfonium salt, iodonium salt, diazonium salt and the like are used.

As examples of the iodonium salts, there are the following.

Diphenyl iodonium hexafluorophosphate, diphenyl iodonium hexafluoro antimonate dipheny liodium tetrafluoro borate, diphenyl iodonium tetrakis(pentafluorophenyl) borate, bis(dodecylphenyl)iodonium hexafluorophosphate, bis(dodecylphenyl)iodonium hexafluoroantimonate, bis (dodecylphenyl)iodonium tetrafluoroborate, bis (dodecylphenyl)iodonium tetrakis(pentafluorophenyl) borate, 4-methylphenyl-4-(1-methylethyl)phenyliodonium hexafluorophosphate, 4-methylphenyl-4-(1-methylethyl) phenyliodonium hexafluoroantimonate, 4-methylphenyl-4-(1-methylethyl)phenyliodonium tetrafluoroborate, and 4-methylphenyl-4-(1-methylethyl)phenyliodonium tetrakis (pentaflurophenyl)borate can be mentioned.

The epoxy resin may be any of bisphenol-A-epichlorohydrin type, alicyclic epoxy, long chain fatty group type, bromide epoxy resin, glycidyl ester type. glycidyl ether type, heterocyclic type series and the like. As a preferable epoxy resin, there are "EPICLON 850S" produced by DAINIPPON INK AND CHEMICALS, Inc., and "DENACOL EX-313", "DENACOL EX-314", "DENACOL EX-321", "DENACOL EX-421", "DENACOL EX-512" and "DENACOL EX-521" produced by Nagase Chemicals Ltd., As the epoxy resin to produce a DVD-RAM, for example, it is preferable to use the one showing contents of free chlorine liberated and chlorine ions which are equal to zero or value as close to zero as possible, to prevent to the utmost a change of properties with time in an information recording layer made of a metal film which reflects almost ultraviolet. It is recommended to set an amount of chlorine to be 1 weight % or less and preferably 0.5 weight % or less.

A ratio of the UV curable cationic resin to the cationic polymerization photoinitiator in weight can be selected based on the above descriptions, and the ratio is 0.1 to 20 part by weight per 100 part by weight of the UV curable If the ultraviolet ray is radiated also onto an ejection opening of the nozzle in radiating the ultraviolet onto the falling UV curable cationic composition, the UV curable cationic composition is cured at the ejection opening of the nozzle, and this causes troubles such as a reduction in an ejection amount and blocking of the ejection opening. To prevent such troubles, in the apparatus of the present invention, the ejection opening is protected by a prevention cover against ultraviolet exposure. It is not always required for the ultraviolet exposure prevention cover to cover the entire periphery of the ejection opening. Its shape is optional, as long as the object to protect the ejection opening from the ultraviolet ray is achieved.

The ultraviolet radiation is performed so that an amount of the ultraviolet radiation onto the falling UV curable cationic composition during the falling of this compound from the nozzle to the disc substrate is ordinarily 50 to 500 $mJ/cm^2$ and preferably 100 to 400 $mJ/cm^2$.

The total thickness of a bonding layer made of the UV curable cationic composition containing the UV curable cationic resin and the cationic polymerization photoinitiator is not especially limited, but ordinarily, the total thickness thereof is set to 15 to 60 $\mu m$, and preferably 20 to 55 $\mu m$.

The following technique should be adopted to superpose the two disc substrates interposing the UV curable cationic composition therebetween.

Specifically, the UV curable cationic composition that has been subjected to the ultraviolet radiation previously is coated on one disc substrate in the form of a ring. Thereafter, when the other disk substrate is superimposed on the one disc substrate, it is recommended that the two disc substrates are superimposed not in the state of being parallel with each other from the beginning, but the two disc substrates are superimposed in a state where the two disc substrates are tilted from each other at first, then gradually made to be close to a cationic resin, and preferably 0.2 to 5 part by weight per 100 part by weight thereof.

Note that to more effectively use waves of a near ultraviolet region and a visible region in a wavelength region of an ultraviolet light source, photosensitizer publicly known and commonly used can be used together with these compounds. As the photosensitizer used at this time, anthracene, phenothiazine, benzyl methyl ketal, benzophenone, acetophenone and the like are, for example, enumerated.

To radiate the ultraviolet ray onto the UV curable cationic composition falling from the nozzle, ultraviolet radiation means may be provided on the side of the UV curable cationic composition falling, and as the light source for the ultraviolet radiation, known lamps such as a xenon lamp, a xenon-mercury lamp, a metal halide lamp, a high pressure mercury lamp, a low pressure mercury lamp and the like may be used.

To radiate the ultraviolet ray onto the UV curable cationic composition falling more uniformly, it is satisfactory to make diameters of the falling UV curable cationic composition small by reducing a diameter of the nozzle.

Moreover, it is also effective to radiate the ultraviolet ray onto the falling UV curable cationic composition from all directions. As concrete means for radiating the ultraviolet ray onto the falling UV curable cationic composition from all directions, it is conceived that a plurality of ultraviolet radiation means are provided around the falling UV curable cationic composition and the ultraviolet ray is radiated thereonto. However, when the falling UV curable cationic composition is surrounded by reflection plates and the ultraviolet ray is radiated onto the inside of the reflection plates surrounding the compound, the plurality of ultraviolet radiation means need not to be provided. Accordingly, energy saving and space saving can be achieved. desired distance, and thereafter the two disc substrates are allowed to be parallel with each other.

By adopting the above described method, compared to the method superpose the two disc substrates after setting the two disc substrates to be parallel with each other, reduction in air bubble trapping is possible. Moreover, it is desirable that when a gap between the two disc substrates is made to be small, a control is performed so as to approach in a unit of micron per one second, and the approach is performed intermittently.

Furthermore, in the present invention, the disc substrates to be stuck are made of either a material which allows hardly the ultraviolet ray to pass therethrough or a material which does not allow the ultraviolet ray substantially to pass therethrough. In fact, the disc substrates are not but made of a single material, also sometimes made of a composite material containing materials which allows the ultraviolet ray fully to pass and materials which hardly or substantially does not allow the ultraviolet ray to pass therethrough. As an example of these, there is DVD-10, DVD-18 having a thick metal film of such as the foregoing Al and the like among the DVD-ROM, or DVD-RAM.

In some cases, when the two disc substrates make DVD-ROM, at least one is a disc substrate having an information recording layer on an ultraviolet permeability substrate, and the other disc substrate does not have the information recording layer. Specifically, with reference to the discs which are the object of the present invention, there are a case where the two disc substrates have the information recording layer respectively and a case where though one disc substrate has the information recording layer, the other disc substrate does not have the information recording layer. In any case, the disc substrates have a thickness ranging from 0.3 to 1 mm usually.

As the disc substrates, any material which has been publicly known and commonly used can be used, for example, heat resistance thermoplastic synthetic resin such as acryl, polycarbonate and amorphous polyolefin are enumerated. The information recording layer is constituted by providing irregularities corresponding to recording information on one surface of the foregoing substrate, and laminating a metal film thereon.

In the present invention, though UV curable cationic composition can be coated directly on a metal film typified by a semi-reflection film and a reflection film then spread, it is also possible that the conventional UV curable composition adjusted so as to prevent as possible a change of properties with time in the metal film, as described above, is previously spread on this metal film and cured, and then the UV curable cationic composition may be coated, spread and cured on a protection layer made of a cured substance thereof. It should be preferable that a thickness of the protection film is set to 5 to 20 μm in total. In this case, each protection film of the first and second disc substrates is bonded with each other by the UV curable cationic composition.

As the foregoing metal film, the one is preferably used, which is capable of reflecting visible light adopted for reading out the recording information, with a high efficiency, and identifying the foregoing irregularities accurately. A film reflecting the visible light with a high efficiency also reflects generally ultraviolet rays with a high efficiency.

As this metal film, Al, Ni, alloys made of these metals and the like are enumerated, which satisfy conditions that a visible light reflectance ranges from 80 to 100%, and a transmittance of ultraviolet rays across all over the wavelength regions thereof exceeds 0% and is equal to 10% or less, preferably exceeds 0 and is equal to 0.5% or less. Moreover, in discs according to standards called DVD-9 and DVD-18, a film called a semi-reflection film made of, for example, gold, which is a material offering a light transmittance ranging from 70 to 82%, is formed.

The DVD-RAM has a characteristic layered structure which is different from that of the above described DVDs. As an example of the DVD-RAM, the one having a following structure is known, that is, two disc substrates prepared such that a ZnS—SiO$_2$ layer, a GeSbTe layer, a ZnS—SiO$_2$ layer, an Al alloy layer and a protection layer are sequentially laminated on each substrate made of polycarbonate, are stuck to each other with their protection layer sides facing to each other, by using curing adhesive.

By the way, to stick the disk substrates in the foregoing manufacturing apparatus, the two kinds of disc substrates must be taken out from an inventory location one by one. At this junction, in view of spaces on production lines, the disc substrates are stored in a state of being stacked. When objects like the disc substrate having a smooth surface and a thin thickness are stacked, adhesive forces such as vacuum adsorption forces and electrostatic forces are apt to be generated between the disc substrates. If such adhesive forces exist, a disc substrate to be taken out is taken out with other disc substrates attached thereto, in spite of trying to take out the disc substrates one by one, resulting in taking out two or more disc substrates at one time.

When only one plate shaped substance is taken out from a plurality of stacked plate shaped substances such as the disc substrate, and transported to a next step, the following methods have been heretofore adopted to prevent taking-out of two or more disc substrates.

(1) a spacer is previously inserted between the plate shaped substances that is an object to be processed.
(2) ionized air for removing static electricity is blown from the side face of the stack of plate shaped substances.

In the method (1) in which the spacers for separating the plate shaped substances, which have a small size, are inserted between the stacked plate shaped substances, adhesive force due to electrostatic force and vacuum adsorbability are reduced to a large degree, and it is possible to certainly prevent the taking of the two or more plate shaped substances at a time. However, when the spacers are inserted in the above described manner, the spacers of the number equal to the number of the plate shaped substances are necessary, as well as means for inserting the spacers and means for removing the spacers are necessary, resulting in reducing throughput in the production significantly.

Moreover, like the method (2), when the ionized air is blown at the side of the stack of plate shaped substances, by supplying the ionized air from a small gap between the plate shaped substances stacked, the electrostatic adhesive force between the plate shaped substances is reduced, and the taking of the two or more disc substrates can be prevented. However, when the surfaces of the plate shaped substances are smooth mutually and scarcely making gaps on the sides of the stacked plate shaped substances, or when the vacuum adsorbability is strong, an ion neutralizing action does not work even if the ionized air is blown, and secure effects cannot be sometimes obtained. In addition, in the case where the ionized airs is blown, a costly ionized air generating apparatus and a supply source of compressed air are necessary. These causes an increase in cost of production equipment, leading to an increase in price of products.

To solve the foregoing subjects, the apparatus of the present invention should comprise deflection impartation means for deflecting one plate shaped substance located on the top of a plurality of stacked plate shaped substances; top plate shaped substance holding means for holding one uppermost plate shaped substance and separating the one uppermost plate shaped substance from other plate shaped substances, the one uppermost plate shaped substance being in a deflected state; and transporting means for transporting the one uppermost plate shaped substance which is separated from other plate shaped substances.

In such apparatus, when the one plate shaped substance located on the top of the plurality of stacked plate shaped substances is deflected, a deflection similarly occurs also in a plate shaped substance contacting with the under surface of the uppermost plate shaped substance. With this, restoring force to remove the deflection of the plate shaped substance contacting with the under surface of the uppermost plate shaped substance works. If the restoring force exceeds adhesive force acting between the uppermost plate shaped substance and the plate shaped substance under the uppermost plate-shapes object, the adherence of the uppermost plate shaped substance with the plate shaped substance under the uppermost plate shaped substance is dissolved, and the plate shaped substance under the uppermost plate shaped substance restores its original shape. In this case, if it is tried to separate the foregoing uppermost plate shaped substance from other plate shaped substances while keeping the deflection of the uppermost plate shaped substance, a re-attachment in the uppermost plate shaped substance can be prevented. Moreover, when it is tried to cause the foregoing deflection plural times, the attachment of the uppermost plate shaped substance to the plate shaped substance under the uppermost plate shaped substance can be dissolved more securely. Furthermore, to cause the deflection, it suffices that a load is applied to a portion of the uppermost plate shaped substance while mechanically constraining another portion of the uppermost plate shaped substance. In this case, as the way to apply the load, if the portion of the uppermost plate shaped substance is sucked by vacuum suction, flaws on the surface of the plate shaped substance can be prevented.

In the above described manner, without use of the spacer nor means for blowing the ionized air, the uppermost plate shaped substance among the stacked plate shaped substances can be separated and transported securely and cheaply.

Moreover, in the foregoing manufacturing apparatus, in order to try not to cause deformation and slippage during the step of curing the UV curable cationic composition after the two disc substrates are superposed while interposing the UV curable cationic composition therebetween, the following items are essential. Specifically, if the. deformation and the slippage occur in a state where the UV curable cationic composition spreads all over the plane between the two disc substrates, that is, in a state where the spreading thereof is completed, it is very difficult to dissolve the deformation and the slippage even if the UV curable cationic composition is not perfectly cured, and a deflection angle created in the disc substrate after the cure thereof is large. Accordingly, a countermeasure should be taken such that the deformation and the slippage are not caused while the UV curable cationic composition is spreading all over the plane between the two disc substrates, after the UV curable cationic composition is coated on disc substrate and the other disc substrate is superimposed thereon. When the manufacture of DVDs is considered, since the disc substrate is as thin as 0.6 mm and made of polycarbonate showing a low rigidity, a spreading step must be performed on a flat plane composed of a member showing a rigidity at a level that prevents the disc substrate from deformation due to its own weight.

The present invention based on such knowledge has a feature in that to allow the foregoing UV curable cationic composition to spread between the foregoing two disc substrates superposed upon another by the foregoing superimposing means, a statically placing plane for placing the foregoing disc substrates comprises.

Although it is essentially easy to prepare such statically placing plane, it is difficult to realize the statically placing plane in a space limited on actual production lines. This is because the preparation of the statically placing plane having a wide area, which statically places the DVDs to be mass-produced one by one, is not practical.

The DVDs includes a type of DVD in which a convex portion having a ring shape (a ring-shaped convex portion) is formed in an external periphery of a clamping area. Since this convex portion exists on an external surface of the DVD, when the DVDs are stacked, the ring-shaped convex portions existing upper and lower external surfaces contact the ring-shaped convex portions of the adjacent DVDs, so that the disc surfaces of the DVD cannot be contacted with those of the DVDs adjacent thereto. Accordingly, the DVD having a low rigidity is deformed into an umbrella shape, that is, deflected, by its own weight or by a weight of the DVD stacked thereon.

There is also a type of DVD in which the convex portion is not formed, and deformation owing to existence of the convex shaped ring does not occur. However, if the number of DVDs stacked becomes large, minute deformations are accumulated, and there is a fear that the deformations of the DVDs positioned at an upper portion of the stacked DVDs cannot be neglected from the viewpoint of a product specification.

To realize the statically placing plane in a limited space, it is conceived that a rigid disc having a flat plane, for example, a disc made of Al, is interposed between the stacked discs.

Accordingly, the present invention has a feature in that stacking means for stacking the plurality of discs upon another; and rigid disc placing means for placing a rigid disc having a flat plane on the foregoing disc during a step for stacking the plurality of discs upon another. Moreover, a material of the rigid disc is not especially limited as long as the object is achieved. However, since it is also assumed that the stacked DVDs are transported to other places, the material of the DVD should be light for the convenience of the transportation. Generally, since the smaller specific gravity a material has, the lower rigidity the material shows, the disc must have a considerable thickness to achieve the object as the rigid disc. For example, polycarbonate which is the same material as that of the disc substrate of the DVD, can be used. In this case, the thickness of the rigid disc must be determined so as to have a sufficient rigidity. A metal material can be used as the rigid disc, and aluminum and titanium having a small specific gravity are preferable in this case.

Here, in the case where a type of a DVD without the convex ring formed is applied to, a rigid disc having a simple flat plane is satisfactorily used. In the case of the DVD with the convex ring formed, consideration for forming a ring-shaped groove in a portion of the rigid disc corresponding to the ring-shaped convex portion is necessary. Flatness of the flat plane is not especially limited as long as a deflection is within a predetermined range of value, and it suffices that the flatness is experimentally determined in accordance with conditions of the spreading and the like. Moreover, the flat plane needs not to be an entirely continuous plane, and an intermittent flat plane is well adopted as long as the desired objects can be achieved. For example, an intermittent flat plane in which ring-shaped members having different diameters are arranged coaxially may be adopted, and the flat plane which is here described is a concept including these constitutions.

In such apparatus, since the spreading is performed on the statically placing plane, occurrence of the deflection can be controlled.

After the UV curable cationic composition is spread, the disc may be left until resin is completely cured. However, in consideration for productivity, the disc should be transported to other places. Since the UV curable cationic composition is in an uncured state for a while immediately after the spreading, the two disc substrates shift relatively from each other unless the two disc substrates are transported with considerable caution. Moreover, there is also a problem that the UV curable cationic composition protruded from the external peripheral end of the disc that is a superposition object is sticky, and tractability is poor.

The inventor made the investigation about this point, and obtained knowledge that even in the UV curable cationic composition, the cure thereof is promoted extremely when ultraviolet ray having illuminance of a predetermined level or more is radiated thereonto for a short period of time. As means for radiating the ultraviolet ray of a predetermined level or more for a short period of time, it was ascertained that flashing ultraviolet radiation using a flash lamp is effective. At this time, the ultraviolet radiation may be performed satisfactorily in such manner that the ultraviolet ray is concentrated not on the surface of the disc substrate but on the external peripheral end thereof. In the case where the ultraviolet ray is radiated onto the external peripheral end concentratedly, adverse effects owing to heat from a lamp light source scarcely become problems. The apparatus of the present invention has a feature in that a second ultraviolet radiation means for radiating ultraviolet rays onto each external peripheral end of the plurality of stacked discs is provided. With such constitution, the UV curable cationic composition at the external peripheral ends of the two disc substrates is cured in early stages, so that the problem of stickiness is dissolved and the slippage between the two disc substrates occurred in transporting the disc substrates can be prevented.

When the UV curable cationic composition near the external peripheral end of the disc is cured by further radiating the ultraviolet ray onto the external peripheral end thereof, as above-described, efficiency is bad when the ultraviolet radiation is performed for the discs one by one. Accordingly, the plurality of discs are stacked, and the ultraviolet radiation may be satisfactorily performed for an aggregation of the stacked discs. By such ultraviolet radiation, it is possible to perform the end curing treatment for a lot of discs at a time. Moreover, the plurality of discs should rotate around a central axis obtained by connecting the centers of the discs when the ultraviolet ray is radiated by the second ultraviolet radiation means. Thus, the ultraviolet rays can be easily radiated onto the external peripheral ends of all the discs uniformly.

The second ultraviolet radiation means should adopt a flashing type in terms of energy efficiency.

The above-described effects can be exerted only by the cationic polymerization photoinitiator, and hence exerted also by the light initiator combined with the cationic polymerization photoinitiator. The curing promotion effect can be improved by this action.

Besides the methods for radiating the ultraviolet rays in the above-described manners, there is also a method to apply a heat to a predetermined temperature. In this case, a constitution, in which a heating means for performing a heating treatment for the plurality of stacked discs is provided, suffices. Since the technique to heat the discs can be satisfactorily performed by cheaper equipment compared to that necessary for the ultraviolet radiation, this technique is effective for reduction of production cost. Although a heat temperature must be decided appropriately in accordance with a material constituting the disc substrates and UV curable cationic composition, the heat temperature should be set to 70° C. or less in the case of the DVD because of a possibility that a deformation of the disc substrate may occur due to a thermal stress at a temperature above 70° C. Moreover, to promote the cure of the UV curable cationic composition, the heating temperature should be set to a temperature of 40° C. or more.

As the apparatus for the heat treatment, though a heater using the most prevailing heating wire heater can be used, it is preferable in consideration for heating performance that a heater using a halogen heater is used. Specifically, compared to heaters including the heating wire heater, a quartz heater, a ceramics heater and the like, since the halogen heater reaches to a predetermined temperature in a short time after starting the heating, the halogen heater can perform the heat treatment quickly.

As the halogen heater, the one publicly known and commonly used can be used, and a halogen heater with a reflection film capable of radiating energy toward one direction effectively should be used.

This heat treatment should be performed at least for whole the end of the disc. Moreover, to make the deflections of the individual discs as little as possible, it is preferable that each disc is heated so that the entire surface thereof is made to equal in temperature uniformly. To achieve this, each disc can be left for a determined period of time in, for example, a temperature controlled chamber which controlled to a predetermined temperature by a heater. A plurality of heaters having directivity may be provided such that the heaters do not contact the outside of the disc and surround the entire end of the disc. However, only one heater is preferably used, and the heater and the disc are disposed so that the heater and the disc do not contact with each other. The heat treatment should be performed while rotating only the disc and the heater is fixed. Although a rotation speed of the disc at this time is not especially limited, in terms of productivity, the rotation speed should be selected at a range of, for example, 20 to 200 rpm. A distance between the heater and the end of the disc can be appropriately selected depending on sorts of substrate materials constituting the disc and a thickness thereof, and a power of the heater, and is within a range of 1 to 100 cm, ordinarily. The distance should be 10 to 70 cm in terms of space saving. When the heater power is high, it suffices that the distance between the heater and the disc is made to be larger. In some cases, it is also possible to allow only the heater to rotate along the end of the disc without rotating the disc such that the heater does not touch the disc. The heat treatment should be performed for a period of time until the end of the disc is completely cured. The time of the treatment is 1 to 15 minutes, ordinarily, and especially should be 3 to 10 minutes in terms of productivity.

As described above, by performing the heat treatment after the superposition of the discs, the stickiness of the UV curable cationic composition protruding from the external periphery end of the disc after the superposition can be suppressed, and the cure of the UV curable cationic composition is promoted. Thus, the performance of the heat treatment after the superposition can contribute to production efficiency.

By the way, in manufacturing such disc, as the method for transporting the disc, a method is used widely, in which adsorption means such as vacuum suction is provided in a tip of an arm so as to hold one surface of the disc by suction, and the disc is transported by allowing the arm to perform turning movement. However, in any case where one of the above described methods is used, when the discs which are stuck with each other and form a unit are transported to the ultraviolet radiation step, the cure of the adhesive between the two discs substrates is not completed yet. For this reason, there has been a fear that a central axis deviation may occur in the disc substrate that is not firmly held by the adsorption means, because of influences such as centrifugal force and acceleration in the transportation. Since the disc, which caused the central axis deviation cannot be used, such disc is scrapped as defectives.

To reduce the influences such as the centrifugal force and the acceleration, applied to the disc substrate which is not held firmly in the transportation, it is conceived that such influences can be effectively reduced by lowering a transportation speed. However, a problem of a lowering of productivity occurs.

Accordingly, in the apparatus of the present invention, it suffices that holding means for holding discs; axis alignment means for allowing positions of inner wall planes of hole portions formed in the foregoing two disc substrates to be coincident with each other; and movement means for moving the foregoing holding means and the foregoing axis alignment means simultaneously are provided. At this time, the foregoing axis alignment means should be diameter enlargement/reduction means.

Specifically, the holding means holds the discs which are stuck, and the axis alignment means performs the central axis alignment by allowing the positions of the inner wall planes of the hole portions formed in the two disc substrates to be coincident with each other. In this state, the movement means moves the holding means and the axis alignment means simultaneously, and hence the discs can be transported in a stage where the adhesive is not cured. Accordingly, until the adhesive is cured, the discs need not to be statically placed at the place where the discs are to be stuck, and the adhesion of the disc substrates can be effectively performed. Thus, production efficiency of the discs can be increased.

Furthermore, to allow the axes of the two disc substrates to be coincident with each other, conceived are a method in which external periphery portions of the substrates are allowed to be coincident with each other and a method in which positions of hole portions provided at the centers of the principal surfaces of the substrates are allowed to be coincident with each other. The method to allow the positions of the hole portions to be coincident with each other can cope easily with a case where a size of the disc substrate changes. Moreover, when the disc substrate is thin, a deflection and a strain may occur in the disc substrate by applying force to the external periphery portion of the substrate for positioning. However, since the hole portion is formed so as to be smaller compared to a size of the disc and will be hardly deformed with an application of force, the positioning is performed easily.

As the axis alignment means, diameter enlargement/reduction means should be used, and specifically an air picker or a chuck should be used. The chuck is essentially a tool which seizes work pieces and the like by opening and shutting several nails. It is possible to press the inner wall plane of the hole portion formed in the disc substrate by utilizing the opening of the nail.

BRIEF DESCRIPTION OF THE DRAWINGS

FIG. 13 is a table illustrating experiment results of an embodiment 3.

FIG. 14 is a drawing showing an external shape of a disc in the embodiment 3 and a comparative example.

FIG. 16 is a table illustrating experiment result of an embodiment 4.

FIG. 17 is a table illustrating experiment results in a comparative example relative to the embodiment 4.

FIG. 20 is a plan view schematically showing a second embodiment of the optical disc manufacturing apparatus according to the present invention.

FIG. 25 is an elevation view schematically showing a disc transportation apparatus used in the optical disc manufacturing apparatus of FIG. 24.

FIG. 27 is an elevation view schematically showing a transferring apparatus of a disc used for the optical disc manufacturing apparatus of FIG. 24.

MOST PREFERABLE EMBODIMENTS FOR EMBODYING THE INVENTION

Embodiments of the present invention will be described with reference to the drawings below.

First Embodiment

Figure 1:
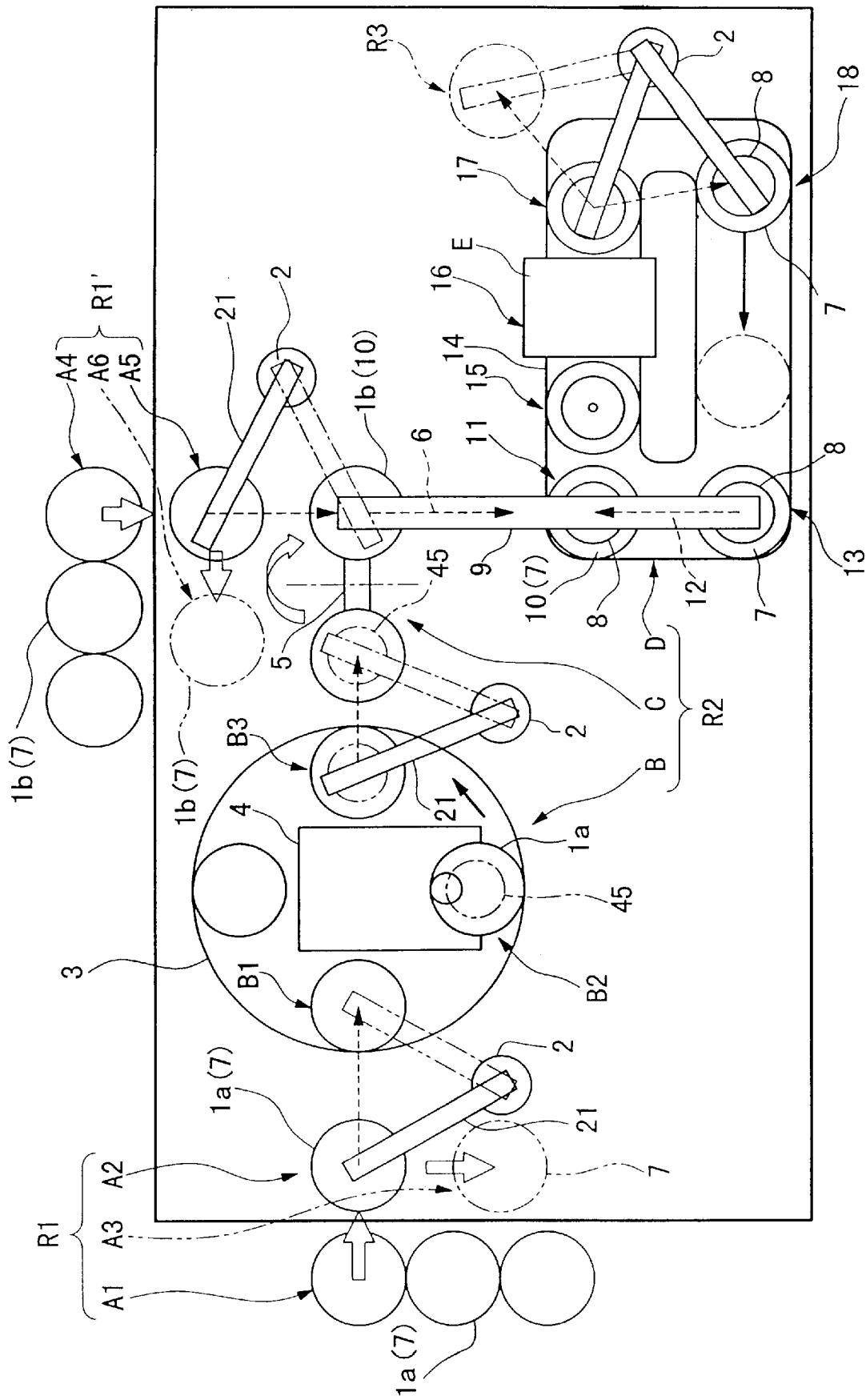
FIG. 1 is a plan view schematically showing a first embodiment of an optical disc manufacturing apparatus according to the present invention.

A DVD manufacturing apparatus shown in FIG. 1 is roughly constituted by a disc substrate taking-out region R1, a disc preparation region R2, a disc checking region R3 and a disc stacking region.

The disc taking-out region R1 is constituted by a stock area A1 where first and second disc substrates 1a and 1b are held by a disc holder 7 in a state where the first and second disc substrates 1a and 1b are stacked one upon another, and a taking-out area A2 for taking out the first and second disc substrates 1a and 1b one by one, which are held in the disc holder 7.

The disk preparation region R2 is constituted by providing a coating stage B having a dropping and radiating apparatus 4 for dropping UV curable cationic composition to the first disc substrate 1a, and a superimposing apparatus 5 for allowing a plane of the first disc substrate 1a, on which the UV curable cationic composition is dropped, to face the second disc substrate 1b and superimposing the first and second disc substrates 1a and 1b one upon another.

Next, an outline of DVD manufacturing steps in the foregoing apparatus will be described.

The first disc substrate 1a stacked upon another in the stock area A1 in the disc substrate taking-out region R1 is supplied to the disc preparation region R2. In the stock area A1, the plurality of first disc substrates 1a stacked on the disc holders 7, 7, . . . are housed. When the disc holder 7 is moved from the stock area A1 to the taking-out area A2, a transportation apparatus 2 having an arm 21, which turns swingingly between the solid line and the dashed line, transports the uppermost disc substrate among the first disc substrates 1a stacked on the disc holder 7 to a supply position B1 on a rotation table 3 of the coating stage B in the disc preparation region R2, and places the uppermost disc substrate thereon. In such manner described above, the first disc substrate 1a is sequentially supplied to the disc preparation region R2.

Moreover, when all of the first disc substrates 1a stacked in the disc holder 7 on the taking-out area A2 have taken out, the disc holder 7 is allowed to move to the disc holder stock area A3, and another disc holder 7 in which the first disc substrates 1a are newly stacked is allowed to move from the stock area A1 to the taking-out area A2.

On the other hand, the first disc substrate 1a supplied to the supply position B1 of the coating stage B is moved to the coating position B2 by rotating the rotation table 3 in the arrow direction in the drawing.

On the first disc substrate 1a placed in the coating position B2, UV curable cationic composition 45 onto which ultraviolet rays are radiated by the dropping and radiating apparatus 4 is dropped so as to form a ring shape, and coated thereon. When the coating of the UV curable cationic composition 45 is completed, the rotation table 3 rotates in the arrow direction in the drawing until the first disc substrate 1a moves to the transportation position B3. By the arm 21 of the transportation apparatus 2, the first disc substrate 1a placed at the transportation position B3 is transported to the superposition apparatus 5 on the superposition stage C in the disc preparation region R2.

On the superposition stage C, the d disc substrate 1b transported from the disc substrate stock area A4 by the transportation means 2 waits. This second disc substrate 1b is housed in a state where the second disc substrate 1b is stacked on other second disc substrates on each of the disc holders 7 arranged in the disc substrate stock area A4 in the disc substrate taking-out region R1'. When the disc holder 7 is moved to the taking-out area A5, the transportation apparatus 2 having the arm 21 seizes the uppermost second disc substrate among the second disc substrates 1b stacked on the disc holder 7. The transportation apparatus 2 transports this second disc substrate 1b to the superposition stage C and places the second disc substrate thereon. In the above described manner, the second disc substrate 1b is sequentially supplied to the superposition stage C.

Moreover, when all of the second disc substrates 1b stacked on the disk holder 7 on the taking-out area A5 have been taken out, the disc holder 7 is moved to the disc holder stock area A6, and another disc holder 7 in which the second disc substrates 1b are newly stacked is moved from the disc substrate stock area A4 to the taking-out area A5.

In the superposition stage C, the first disc substrate 1a is superimposed, by the superposition apparatus 5, on the second disc substrate 1b that has been waiting. As a matter of course, the two disc substrates are superimposed with the UV curable cationic composition 5 interposed therebetween. Note that a unit obtained by superimposing these disc substrates is simply referred to as a disc hereinafter.

The disc 10 is transported along the transportation path 9 to the disc stacking/separating apparatus D, provided in the disc preparation region R2, by the axis alignment transportation apparatus 6. Specifically, the disc 10 is transported onto the disc holder 7 positioned in the first position 11 in the disc stacking/separating apparatus D. In this disc stacking/separating apparatus D, the spreading treatment is performed in a state where the plurality of discs 10 is stacked. This is because it is intended to realize the spreading treatment in a limited space as described above. However, since mere stacking of the discs 10 causes a deformation and a misalignment in the discs, the rigid disc 8 is placed on the disc 10 by the rigid disc transportation apparatus 12 when the disc 10 is transported to the first position 11 on the disc stacking/separating apparatus D. Then, the subsequent disc 10 is transported to the rigid disc 8 and placed thereon. Accordingly, the rigid disc 8 exists between the discs 10, and the disc 10 and the rigid disc 8 are alternately superposed one upon another on the disc holder 7 disposed in the first position 11. Hereupon, the rigid discs 8 are stacked on the disc holder 7 disposed in the fourth position 13 on the disc stacking/separating apparatus D and disposed thereon.

The disc holder 7 on which the discs 10 are placed in a stacking state is allowed to move to the fifth position 15 on the disc stacking/separating apparatus D by the conveyor (disc holder circulation means) 14 provided in the disc stacking/separating apparatus D. Then, the spreading treatment is performed by leaving the discs 10 for a period of time in this fifth position 15.

When this spreading treatment is completed, the disc holder 7 loading the discs 10 is transported to the end curing treatment apparatus E provided in the sixth position 16 on the disc stacking/separating apparatus D by the conveyor 14. The end curing treatment means is a treatment aiming at the following. Since the cure of the UV curable cationic composition, which exposes to the outside of the stuck plane of the disc 10, is delayed, troubles are brought about in terms of disc handling. Accordingly, it is intended to promote the cure of the UV curable cationic composition by means for radiating ultraviolet rays onto this end or means for heating the disc.

When the end treatment is finished, the disc holder 7 loading the discs 10 is transported to the second position 17 on the disc stacking/separating apparatus D by the conveyor 14. In this second position 17, the disc 10 is moved to the disc checking region R3 by the transportation apparatus 2 and placed thereon. The rigid discs 8 are stacked on the disc holder 7 disposed in the third position 18 on the disc stacking/separating apparatus D and disposed therein.

Then, when the number of the rigid discs 8 on the disc holder 7 disposed in the third position 18 reaches a predetermined value, the disc holder 7 disposed in the third position 18 is moved to the fourth position 13 by the conveyor 14.

Subsequently, the rigid discs 8 stacked on the disc holder 7, which was moved to the fourth position 13, are again stacked, by the rigid disc transportation means 12, onto the disc 10 alternately one upon another on the disc holder 7 disposed in the first position 11.

The above is the total flow of this embodiment. The movement/placing of the disc substrate from the taking-out area, a dropping and radiating of the UV curable cationic composition, the superposition of the disc substrates, the central axis alignment transportation, the spreading treatment and the end treatment will be explained while enumerating concrete examples.

Figure 2A:
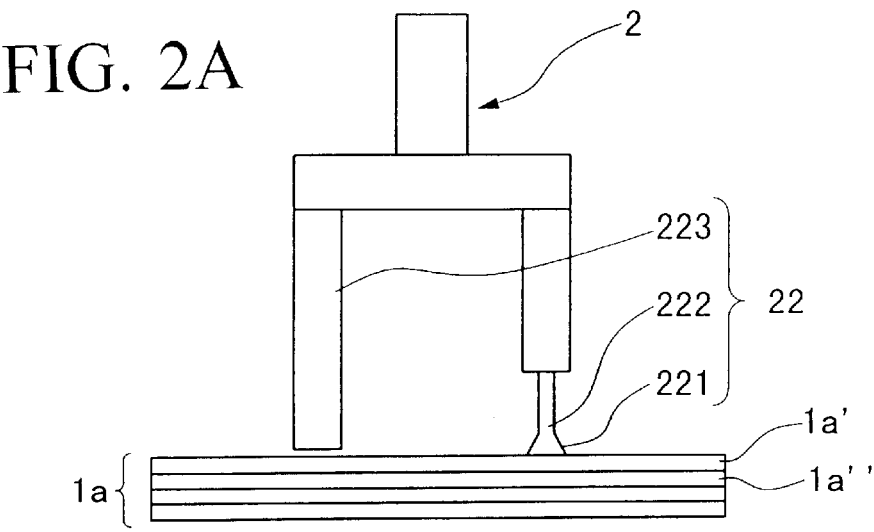
FIG. 2 is a drawing showing procedures in seizing a disc substrate in a transportation apparatus used in the optical disc manufacturing apparatus of FIG. 1.
Figure 2B:
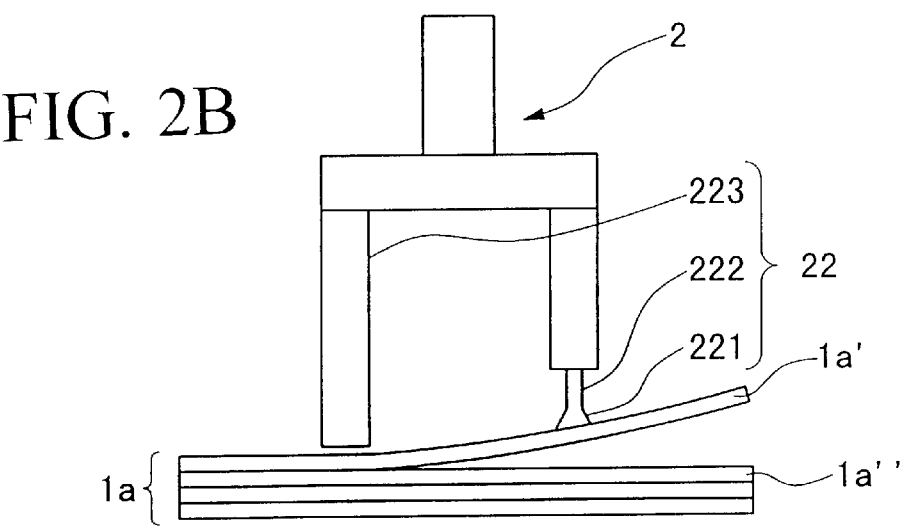
Figure 2C:
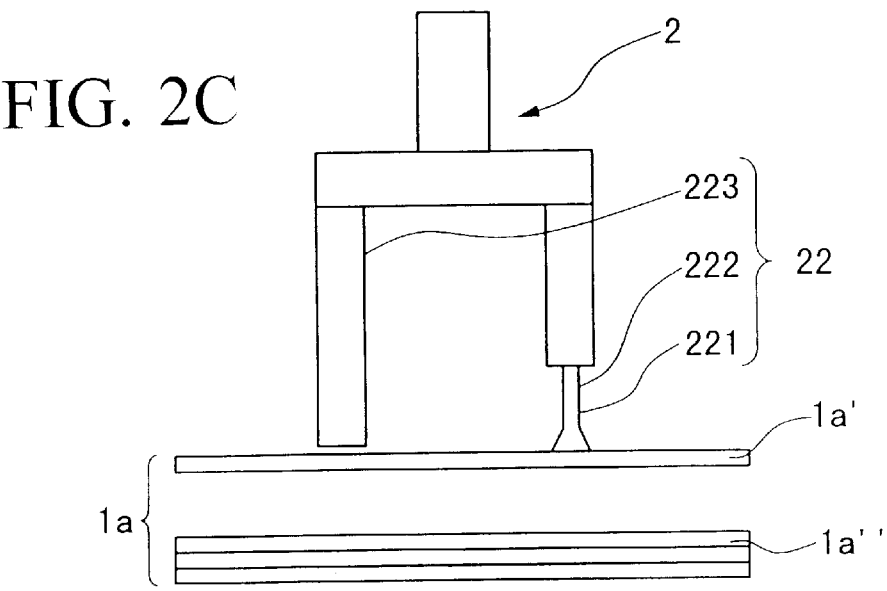

In FIG. 2, the procedures in transferring the first and second disc substrates 1a and 1b respectively stacked on the taking-out areas A2 and A5 by the respective transportation apparatuses 2 are shown. Note that the disc substrate shown in the drawing is the first disc substrate 1a, and the procedures similar to the following procedures are adopted in moving the second disc substrate 1b. Accordingly, the first disc substrate 1a in the drawing may be the second disc substrate 1b.

In the transportation apparatus the deflection impartment means (uppermost disc substrate holding means) 22 as shown in FIG. 2 is provided. The deflection impartment means 22 has a constitution in which the vacuum suction portion 221 for performing vacuum suction for the first disc substrate 1a, the reciprocation operation portion 222 for allowing the vacuum suction portion 221 to reciprocate in a direction perpendicular to the first and second disc substrates 1a and 1b, and the displacement suppression portion 223 for restraining a part of the first disc substrate 1a mechanically when the vacuum suction portion 221 operates. Moreover, this deflection impartment means 22 has also a function as holding means for holding the first disc substrate 1a, by the operation of the vacuum suction portion 221.

To transfer the first disc substrates 1a, the transportation apparatus 2 is made to face the uppermost one disc substrate 1a' among the first disc substrates 1a, and the vacuum suction portion 221 and the displacement restrain portion 223 are made to contact the first disc substrate 1a', as shown in FIG. 2(a).

Next, the vacuum suction portion 221 is made to suck the surface of the first disc substrate 1a', and further the reciprocation operation portion 222 is made to retire as shown in FIG. 2(b). In this case, the vacuum suction portion 221 provided on the tip of the reciprocation operation portion 222 is elevated while sucking the first disc substrate 1a, and the portion of the first disc substrate 1a sucked by the vacuum suction portion 221 makes displacement upwardly.

At this time, the portion of the first disc substrate 1a' contacted by the displacement suppression portion 223 is mechanically restrained by the displacement suppression portion 223, so that its displacement is restrained. As a result, the first disc substrate 1a' made of a material having flexibility is deformed to a curvature state as shown in FIG. 2(b), thus causing a strain therein.

By the way, since the uppermost first disc substrate 1a' and another first disc substrate 1a (hereinafter referred to as a first disc substrate 1a") contacting the under surface of the disc substrate 1a' offer high surface smoothness alike, the first disc substrates 1a' and 1a" happen to fall into a state where both are adhered to each other imitationally. In this case, when the uppermost first disc substrate 1a' is made to be deformed as described above, a force which attempts to deform the first disc substrate 1a", which is imitationally adhered to the first disc substrate 1a', also acts along the uppermost first disc substrate 1a'. Thus, a strain occurs also in the first disc substrate 1a" under the first disc substrate 1a', and, at the same time, restoring force to dissolve the strain acts thereon.

Since the strain occurred in the under first disc substrate 1a" was created by adhesive force acting between the uppermost first disc substrate 1a' and the first disc substrate 1a", the strain in the first disc substrate 1a" under the fist disc substrate 1a' is never dissolved when this adhesive force is equal to the restoring force or more.

However, when the strain in the first disc substrate 1a" becomes large and the restoring force generated with this strain exceeds the adhesive force between the first disc substrates 1a' and 1a", the under first disc substrate 1a" comes off from the first disc substrate 1a', and restores its shape to the original plate shape. Thus, it is possible to separate the uppermost first disc substrate 1a' from the under first disc substrate 1a", and the simultaneous taking-out of the two first disc substrates 1a can be securely prevented.

As described above, after the separation of the first disc substrate 1a' from the under the first disc substrate 1a", the transportation apparatus 2 is moved upward while sucking the first disc substrate 1a'. In this case, the first disc substrate 1a' is separated while keeping its deflected state. In such manner, it is possible to prevent the first disc substrate 1a' from being adhered again to the under first disc substrate 1a". Thereafter, the reciprocation operation portion 222 is restored to the original position, and thus the first disc substrate 1a' is restored to the original plate shape. Then, the first disc substrate 1a' separated in such manner is moved to a next treatment step.

Note that when the first disc substrate 1a' is deformed by incurvating as described above, as a curvature of the deflection is made to be smaller, a strain generated becomes larger. Thus, also a restoring force exerted on the first disc substrate 1a' becomes larger, and a separation force of the first disc substrate 1a' can be adjusted. Moreover, to make the curvature of the deflection large, a distance between the vacuum suction portion 221 and the displacement suppression portion 223 may be satisfactorily made to be small, or a movement distance of the reciprocation operation portion 222 may be satisfactorily made to be large.

In the above described manner, after the disc substrates are taken out from the disc holder 7 of the taking-out area A2 by a predetermined amount, the disc holder 7 becomes an empty state, and the empty disc holder 7 is transported toward the disc stacking region via the transportation path.

Moreover, among the first and second disc substrates 1a and 1b taken out in the above described manner, the first disc substrate 1a is supplied to the supply position B1 of the coating stage B. The first disc substrate 1a supplied to the supply position B1 is moved to the coating position B2 by rotating the rotation table 3 in the arrow direction in the drawing.

On the first disc substrate 1a at the coating position B2, the UV curable cationic composition 45 onto which the ultraviolet ray is radiated by the dropping and radiating apparatus 4 is dropped and applied.

Figure 3:
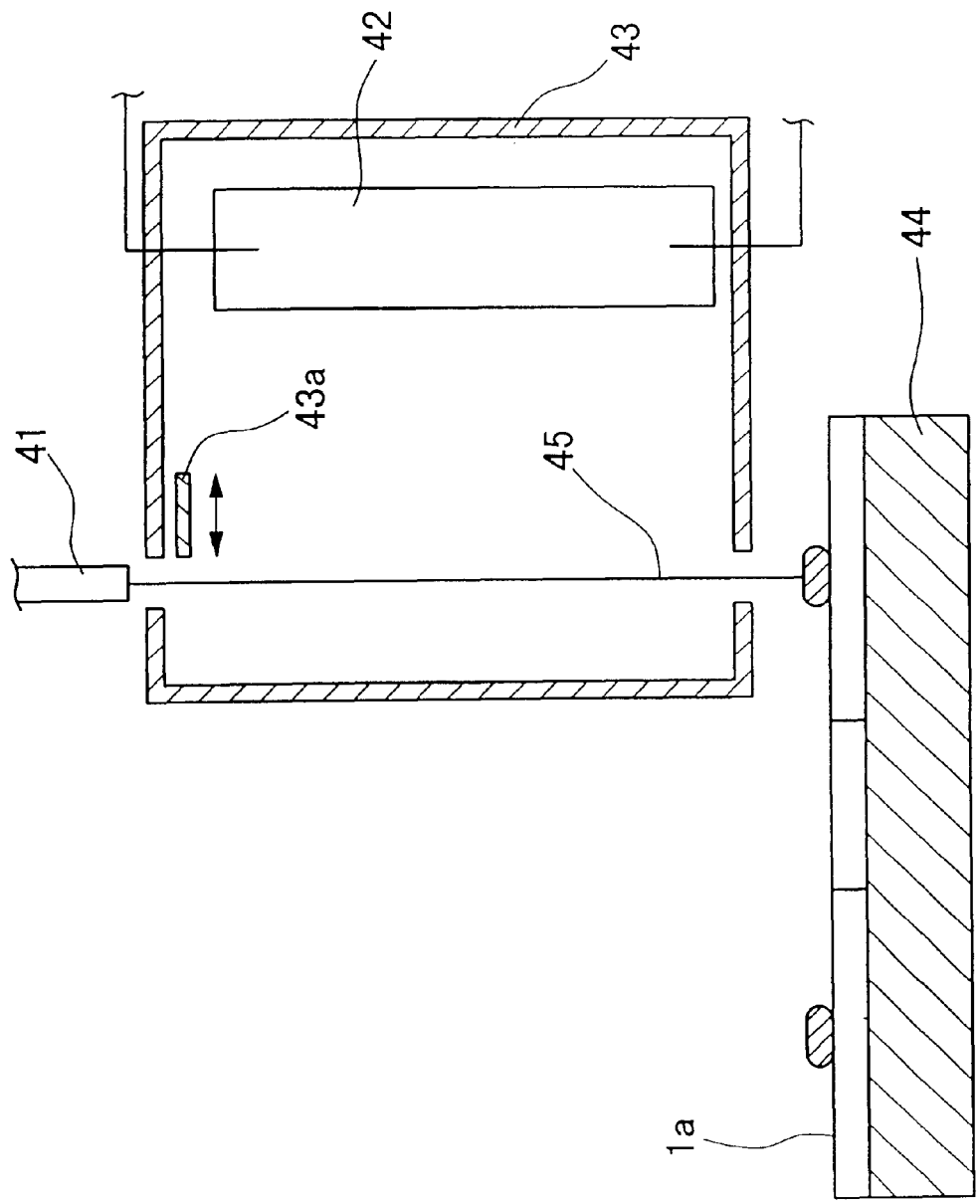
FIG. 3 is a drawing showing a constitution of a dropping and radiating apparatus for UV curable cationic composition used in the first embodiment.

Next, a constitution for dropping the UV curable cationic composition onto the disc substrate wile radiating ultraviolet ray will be described with reference to FIG. 3. In FIG. 3, reference numeral 41 denotes a dispenser (nozzle) for dropping UV curable cationic composition; 42, ultraviolet radiation means; 43, a box having a reflection plate on its inner plane; and 44, a disc substrate placing table.

As the dispenser 41, a model 1500 DV (nozzle inside diameter of 0.83 mm), manufactured by EFD, INC., in United States of America, was used. As the ultraviolet radiation means 42, an ultraviolet radiation apparatus T250 type, D valve (light radiation length of 25 cm), manufactured by Fusion Co. Ltd., was used. Moreover, the disc substrate placing table 44 is made to be rotative by a motor (not shown). Note that a distance between the ultraviolet radiation apparatus 42 and the falling UV curable cationic composition is set to 50 mm, and the box 43, in which the inner plane is constituted by the reflection plate, surrounds the ultraviolet radiation means 42 and the falling UV curable cationic composition, thus achieving an increase in uniformity of the ultraviolet radiation. Moreover, a shutter 43a moving in the arrow direction in the drawing is provided in the box 43.

The ultraviolet radiation means 42 is allowed to emit light while the UV curable cationic composition 45 is falling, thus radiating ultraviolet rays onto the UV curable cationic composition 45. Since the disc substrate placing table 44 is rotated during these operations, the UV curable cationic composition 45 is coated on the first disc substrate 1a so as to form a ring shape thereon. Note that a ring-shaped convex portion of the first disc substrate 1a is omitted. When the dropping of the UV curable cationic composition 45 by a predetermined amount is completed, a hole through which the UV curable cationic composition 45 passes is closed by operating the shutter 43a in the left direction in the drawing. Then, if the first disc substrate 1a to which the UV curable cationic composition 45 is to be subsequently dropped moves here, the shutter 43a is operated as shown in the drawing, and the dropping of the UV curable cationic composition 45 is resumed. Since the light emission by the ultraviolet radiation means 42 is continuously performed during the UV curable cationic composition 45 is not dropped, the ultraviolet radiation onto the dispenser 41 can be prevented by opening and shutting the shutter 43a, and clogging thereof is prevented.

Figure 4:
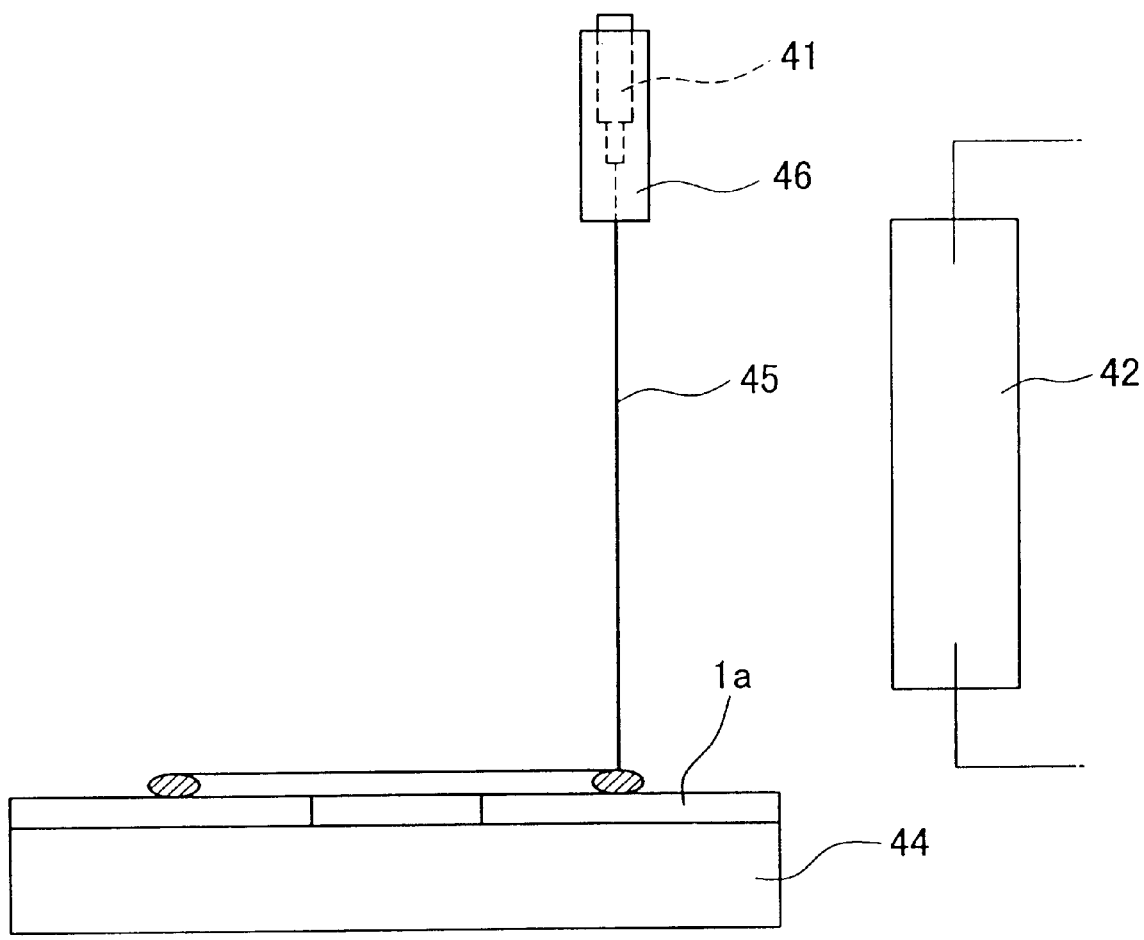
FIG. 4 is a drawing showing a schematic constitution of an apparatus used for dropping the UV curable cationic composition to a disc substrate.

By the way, as shown in FIG. 4, the foregoing dispenser 41 is protected by the ultraviolet exposure prevention cover 46, and the dispenser 41 is not exposed to the ultraviolet ray radiated from the ultraviolet radiation means 42.

FIG. 5 is an enlarged view of the dispenser 41 and the ultraviolet exposure prevention cover 46.

Figure 5A:
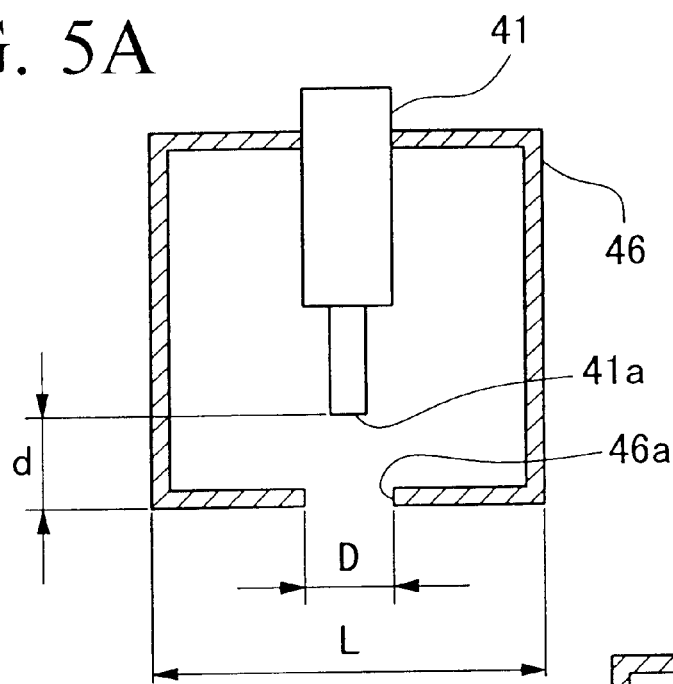
FIG. 5 is an enlarged view of a nozzle and an ultraviolet exposure prevention cover.

In FIG. 5(a), as a distance (d in the drawing) between the nozzle tip 41a and the opening portion 46a of the ultraviolet exposure prevention cover 46 is larger, an ultraviolet shielding effect becomes higher. However, if the distance d is too large, the dropping distance of the UV curable cationic composition 45 becomes long, and an adverse effect that the total height of the apparatus becomes high is brought about. Accordingly, the distance d should be determined in consideration for this point.

As a diameter (D in the drawing) of the opening portion 46a of the ultraviolet exposure prevention cover 46 is smaller, the ultraviolet shielding effect becomes higher. However, if the diameter D is too small, the UV curable cationic composition 45 may touch the opening portion 46a. Accordingly, the diameter D should be determined in consideration for also this point.

As a diameter (L in the drawing) of the ultraviolet exposure prevention cover 46 is larger compared to the diameter of the nozzle tip 41a, the ultraviolet shielding effect becomes higher. However, if the diameter L is too large, an adverse effect that the total height of the apparatus becomes high is brought about. Accordingly, the diameter L should be determined in consideration for also this point. Moreover, if the diameter L has a length which is not too different from the external diameter of the dispenser 41, there is a fear that ultraviolet rays incident from the opening portion 46a are reflected at the inner plane of the ultraviolet exposure prevention cover 46, and irradiated indirectly onto the nozzle tip 41a to clog the tip 41a. To prevent this, the inner plane of the ultraviolet exposure prevention cover 46 is made of a material which hardly reflects the ultraviolet rays (apt to absorb the ultraviolet rays).

Figure 5B:
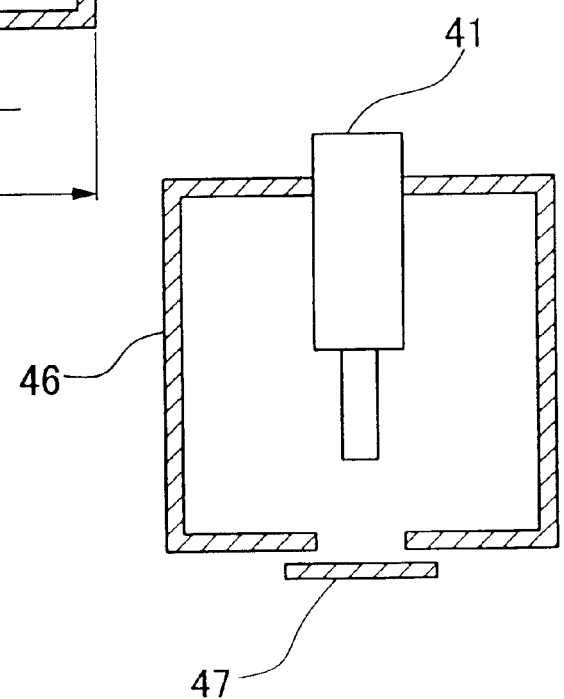

Furthermore, as shown in FIG. 5(b), a constitution in which the shutter 47 is provided in the opening portion 46a of the ultraviolet exposure prevention cover 46 may be adopted. If the shutter 47 is closed while the UV curable cationic composition 45 is not being ejected, the ultraviolet ray is never irradiated onto the nozzle tip 41. When the UV curable cationic composition 45 is ejected, the ejection should be performed after opening the shutter 47. With such constitution, the ultraviolet shielding effect is further higher, and clogging of the nozzle tip 41a is effectively prevented.

Hereupon, when the dropping of the UV curable cationic composition 45 is repeatedly performed, a liquid drop of the UV curable cationic composition 45 is sometimes made on the nozzle tip 41a. To prevent this, the UV curable cationic composition 45 should be recovered and reused by the following techniques.

(1) the liquid drop is removed by sucking using vacuum sucking means, (2) the liquid drop is blown away by gas (gas which preferably contains no humidity and does not react with the compound), or (3) the UV curable cationic composition 45 is ejected by a rotary volume type pump (typified by mohno ROBO dispenser (brand name) manufactured by Heisin Engineering & Equipment Co. Ltd.,), the pump is rotated in the reverse direction to the ejection direction after completion of the ejection, and the liquid drop is returned to the nozzle 41.

The first disc substrate 1a onto which the UV curable cationic composition 45 is dropped so as to form a ring shape and applied in the above described manner is superposed on the second disc substrate 1b in the superposition apparatus 5.

Next, a superposition of the two disc substrates will be described with reference to FIG. 6.

In FIG. 6, the superposition apparatus 5 is constituted by a pair of disc substrate holding tables 51 and 52, a hinge 53 for connecting the disc substrate holding tables 51 and 52, and a suction path 54 connected to a vacuum pump (not shown).

Figure 6A:
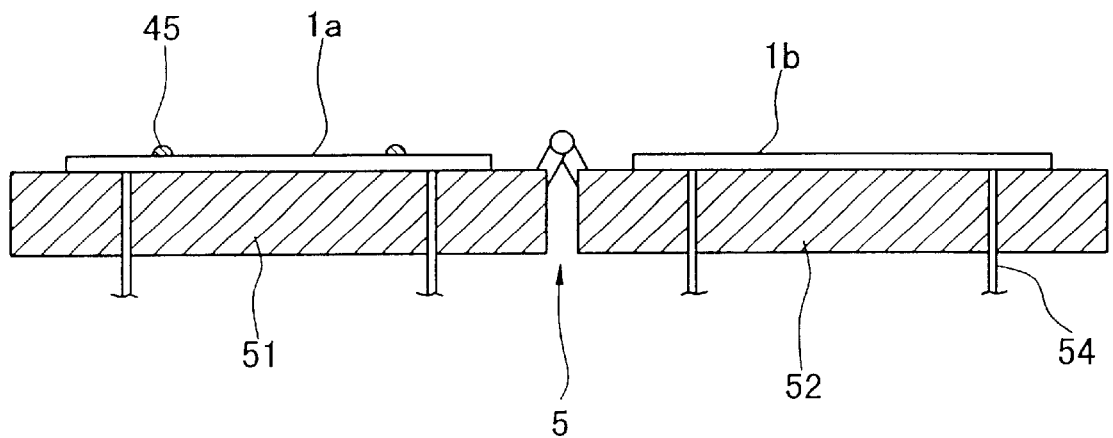
FIG. 6 is a drawing for explaining a superposition.
Figure 6B:
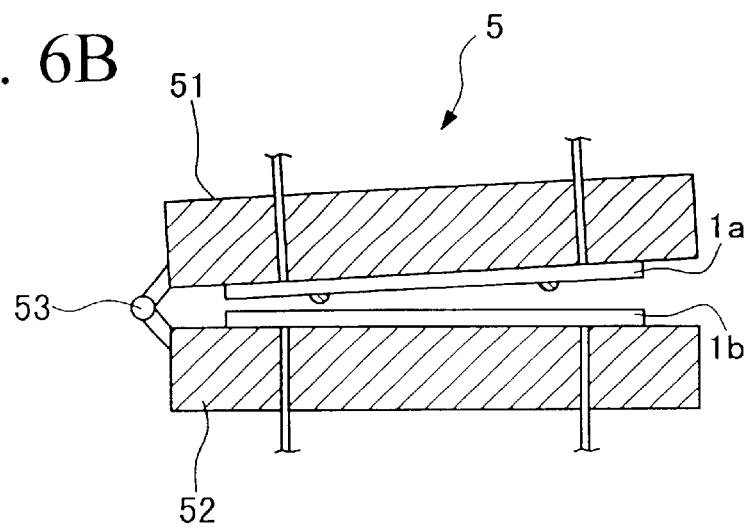

As shown in FIG. 6(a), the first disc substrate 1a onto which the UV curable cationic composition 45 is applied in a ring shape is placed on the disc substrate holding table 51, and the second disc substrate 1b is placed on the disc substrate holding table 52. By driving the vacuum pump (not shown), the first and second disc substrate 1a and 1b are sucked onto the disc substrate holding tables 51 and 52 through the suction path 54, respectively. Then, the disc substrate holding table 51 is rotated around the hinge 53 at a high speed in a state shown in FIG. 6(a). When the disc substrate holding table 51 approaches the disc substrate holding table 52 as shown in FIG. 6(b), the rotation speed is slowed down, and thereafter control is performed such that the both discs may approach each other at a speed on the order of micron per one second. Then, when the distance between the first and second disc substrates 1a and 1b becomes a predetermined value, the approach is stopped, and the drive of the vacuum pump is stopped.

The disc 10 obtained by superposing the first and second disc substrates 1a and 1b is transported to the next disc stacking/separating apparatus D by the axis alignment transportation apparatus 6.

Figure 7A:
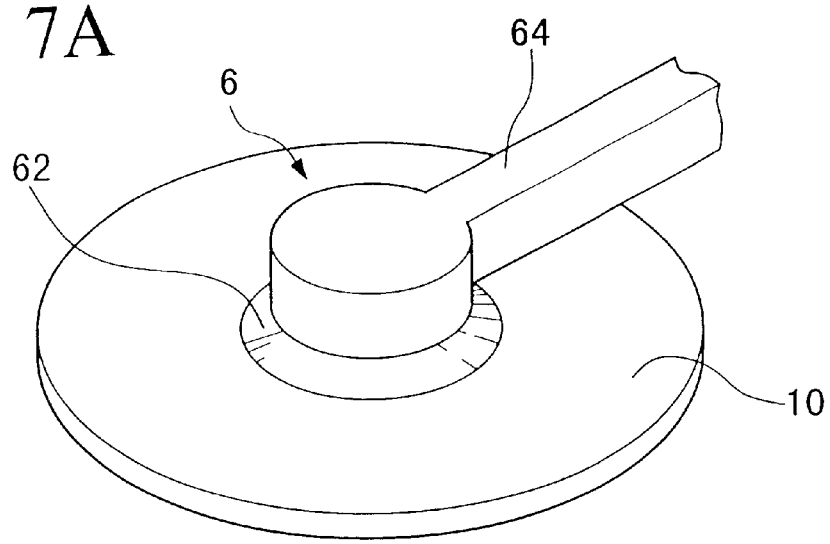
FIG. 7 is a drawing showing a principal part of an apparatus for performing a transportation while performing a central axis alignment.

A principal portion of the axis alignment transportation apparatus 6 and an operation thereof are shown in FIG. 7. As shown in FIG. 7, the axis alignment transportation apparatus 6 is constituted by an air flowing path 64, a disc-shaped vacuum suction portion 62 provided on a tip thereof, and a cylinder-shaped air picker 63 protruding from a central portion of the under surface of the vacuum suction portion 62. The air picker 63 is made of rubber, and the inside thereof is hollow. Moreover, a supply path 64a of the airs flowing path 64 is communicated with air supply means (not shown), and the suction path 64b is communicated with a vacuum pump (not shown). A diameter of a hollow portion of the air picker 63 can be changed by supplying air to the hollow portion thereof via the supply path 64a. Furthermore, the axis alignment transportation apparatus 6 is disposed so as to be reciprocating movable on the transportation path 9 of FIG. 1.

Figure 7B:
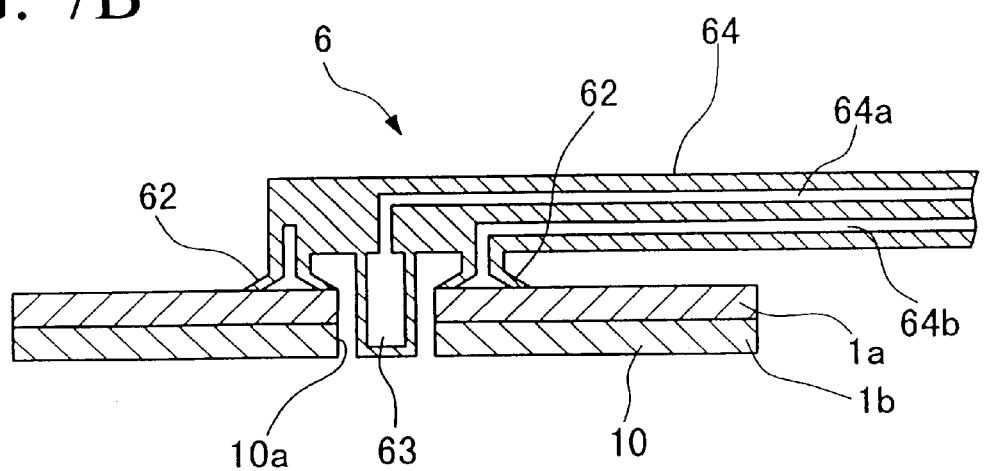
Figure 7C:
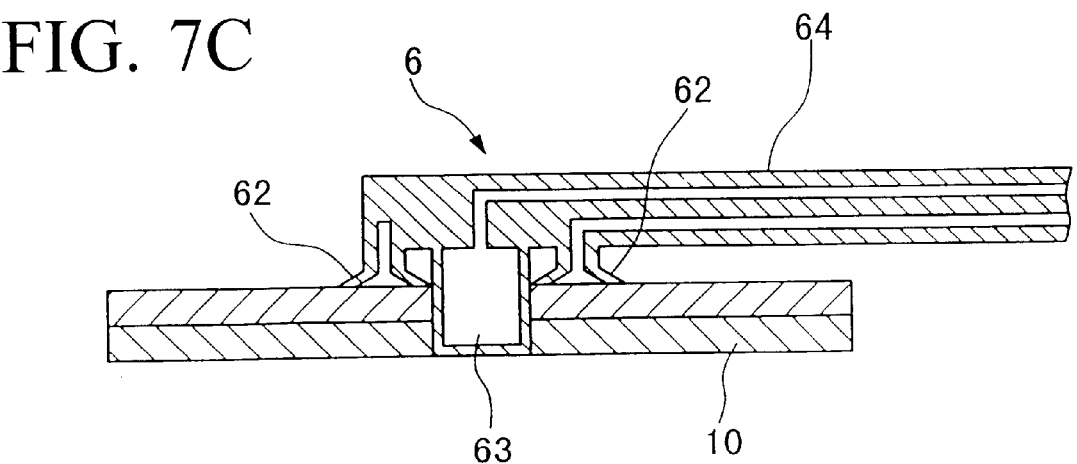

The axis alignment transportation apparatus 6 performs vacuum suction when the vacuum suction portion 62 contacts the superposed disc 10 as shown in FIG. 7(b). Next, when air is supplied to the inside of the air picker 63 in which a diameter is smaller than a hole portion 10a of the disc 10, the diameter thereof is enlarged, and the air uniformly presses the hole portion 10a of the disc 10 from the inside thereof as shown in FIG. 7(c). With such operation, even when the central axes of the first and second disc substrates 1a and 1b deviate from each other, the central axes can be made to be coincident with each other. In such situation, by moving the axis alignment transportation apparatus 6 to the disc stacking/separating apparatus D along the transportation path 9, the central axes of the disc substrates 1a and 1b composing the disc 10, which was transported to the disc stacking/separating apparatus D, are coincident with each other.

In this disc transportation apparatus, a chuck may be used instead of the air picker, as the axis alignment means.

Figure 8A:
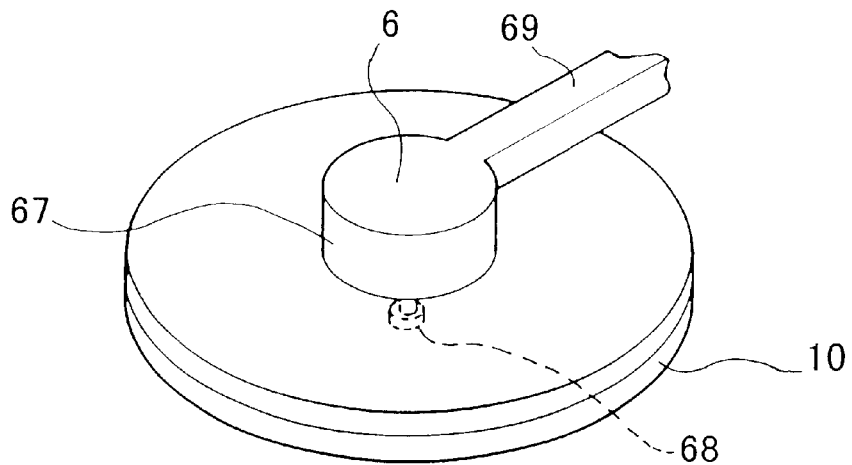
FIGS. 8(a) and 8(b) are drawings showing another embodiment of the apparatus for performing the transportation while performing the central axis alignment, and FIGS. 8(b) and (c) are enlarged views of a chuck.
Figure 8B:
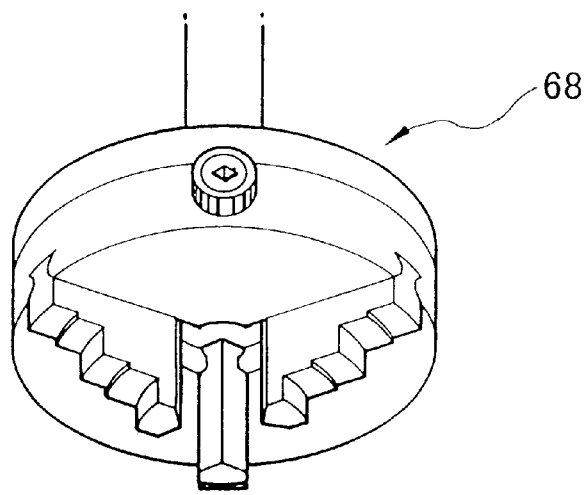
Figure 8C:
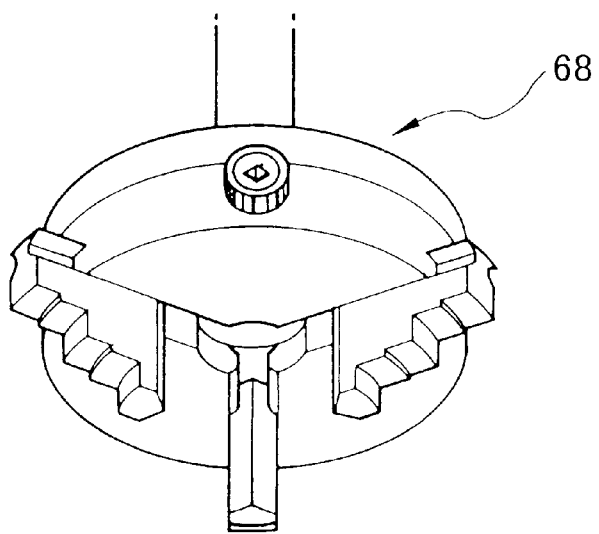

FIG. 8(a) is a perspective view showing a disc transportation apparatus of a second embodiment, and FIGS. 8(b) and 8(c) are enlarged views of the chuck. This disc transportation apparatus 6 is roughly constituted by a vacuum suction portion 67 (holding means), a chuck 68 (axis alignment means) and an arm 69.

As shown in FIG. 8(a), the disc transportation apparatus 6 is constituted by provided the disc-shaped vacuum suction portion 67 in the tip of the arm 69. The chuck 68 protrudes from an under central portion of the vacuum suction portion 67. The arm 69 is constituted so as to be turnable around the vicinity of the end of the arm 69 where the vacuum suction portion 67 is not provided.

The tip of the chuck 68 has a shape as shown in FIG. 8(b), which is constructed so as to be thinner than an internal diameter of the hole portion 10a of the disc 10. After the chuck 68 is inserted in the hole portion 10a, when the chuck 68 is operated, a nail of the chuck 68 is expanded, and presses uniformly the hole portion 10a of the disc 10 from the inside thereof as shown in FIG. 8(c). Thus, even when the positions of the two disc substrates constituting the disc 10 are not coincident with each other, a central axis alignment can be performed by an action of the chuck 68.

Figure 9:
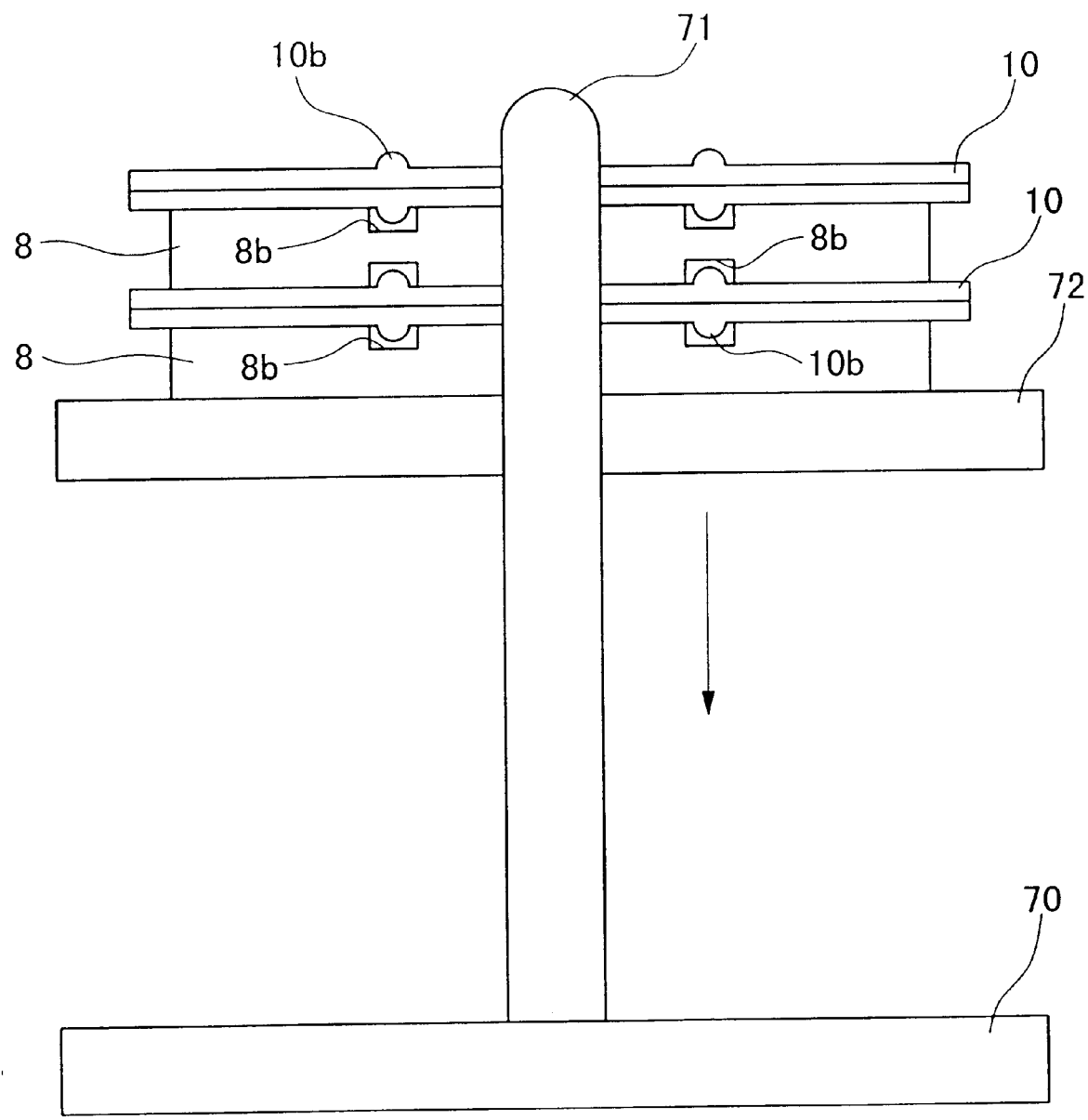
FIG. 9 is a drawing showing a state where a disc and a rigid disc are stacked one upon another.

The disc 10 transported to the disc stacking/separating apparatus D is processed in the following manner. FIG. 9 is a drawing showing a constitution of a disc holder 7 used in the disc stacking/separating apparatus D. The constitution of the disc holder 7 is identical to that used in the disc substrate taking-out regions R1 and R1' (see FIG. 1).

In FIG. 9, reference numeral 70 denotes a pedestal; 71, a spindle erected on the pedestal 70; and 72, a vertically moving stage moving upward and downward along the spindle 71. The disc 10 first transported by the axis alignment transportation apparatus 6 is transported to the disc holder 7 disposed at the first position 11 in the disc stacking/separating apparatus D and placed thereon. At this time, in the disc holder 7, the rigid disc 8 is already disposed on the vertically moving stage 72, and the disc 10 transported is placed on this rigid disc 8. Subsequently, after the vertically moving stage 72 is moved downward until a tip of the spindle 71 protrudes from the disc 10, a subsequent rigid disc 8 is placed on the disc 10 by the rigid disc transportation apparatus 12 (see FIG. 1). In this case, the rigid disc 8 which has been stacked on the disc holder 7 disposed in the fourth position 13 (see FIG. 1) is supplied.

The rigid disc 8 is a disc made of Al having a thickness of 2 mm, in which a ring-shaped groove 8b for avoiding interference with a ring-shaped projection 10b of the disc 10 is formed. An external diameter of the rigid disc 8 is set to be smaller than an external diameter of the disc 10. This is because a return owing to an injection molding may occur in external periphery portions of the disc substrates constituting the disc 10 and interference of this return and the rigid disc 8 must be avoided.

When the rigid disc 8 is disposed on the disc 10 in the above described manner, the vertically moving stage 72 is similarly moved downward, and the disc 10 transported is placed on the rigid disc 8. By repetition of such operation, a predetermined number of discs 10 are stacked on the disc holder 7 disposed in the first position 11 (see FIG. 1). At this stage, the UV curable cationic composition is not spread all over the surfaces of the two disc substrates yet.

Thereafter, the conveyer 14 shown in FIG. 1 is driven, and the disc holder 7 loading the discs 10 stacked one upon another is transported to the fifth position 15, and the discs 10 are here left until a predetermined of time has passed. Meanwhile, the UV curable cationic composition is spread all over the plane between the two disc substrates, and an spreading treatment is completed.

After the completion of the spreading treatment, the disc holder 7 loading the discs 10 is transported to an end curing treatment apparatus E, and an end curing treatment is performed. The end curing treatment apparatus E comprises a temperature controlled chamber (not shown) and heating means such as a heater provided in the temperature controlled chamber, and an end curing treatment is performed by retaining the discs stacked after the spreading treatment in this temperature controlled chamber for a predetermined period of time.

Figure 10:
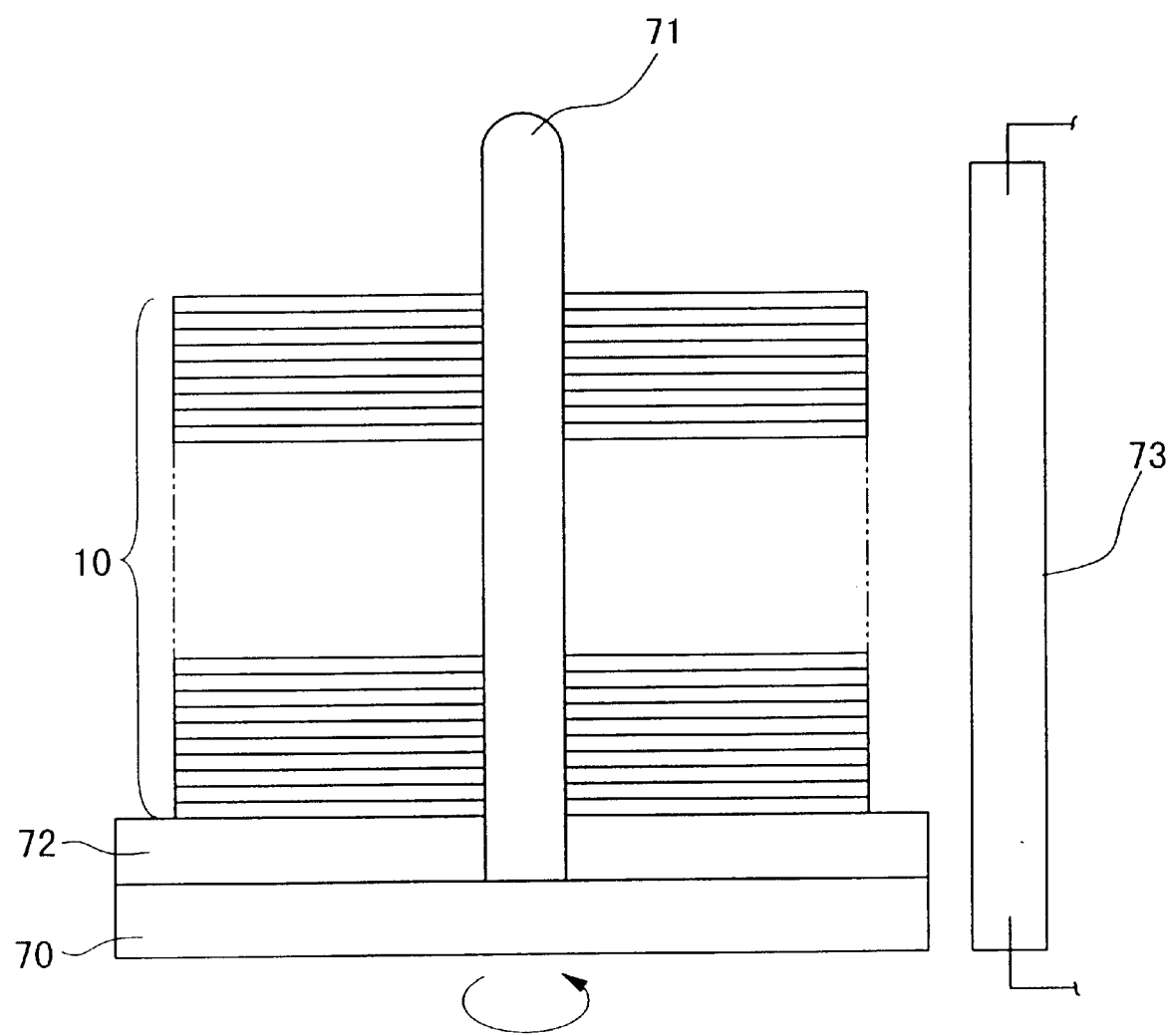
FIG. 10 is a drawing showing a state where a treatment for the end of discs is performed by an ultraviolet radiation while the discs are stacked.

Note that as the end curing treatment, there is a method to radiate ultraviolet rays besides the heating treatment as described above. FIG. 10 shows a concrete example of the method. Specifically, after the spreading treatment is completed, ultraviolet rays are radiated from an ultraviolet radiation means 73 while the discs 10 keeping the stacked state are rotated. The ultraviolet radiation may be any of continuous radiation or flashing radiation. Moreover, a reflection plate should surround the discs 10 and the ultraviolet radiation means 73. Note that illustrations of the rigid disc 8 and the ring-shaped projection 10b of the disc 10 are omitted in FIG. 10.

The UV curable cationic composition is susceptible to curing inhibition by humidity in the air, and curing of a portion of the compound touching the humidity in the air is delayed. Since this portion does not cure and remains sticky in some cases, it is very effective to perform the heating treatment or to perform the ultraviolet radiation onto the end of the disc.

After the end curing treatment is performed in the above described manner, the disc holder 7 loading the discs 10 is transported to the second position 17. In the second position 17, the transportation apparatus 2 distributes the discs 10 and the rigid discs 8 alternately stacked one upon another to the disc checking region R3 and the disc holder 7 disposed in the third position 18, respectively.

Thus, all of the discs 10 on the disc holder 7 of the second position 17 and the rigid discs 8 are transported respectively to the disc checking region R3 and the disc holder 7 of the third position 18, and the disc holder 7 of the second position 17 becomes an empty state. On the other hand, at this time, the rigid discs 8 are stacked on the disc holder 7 of the third position 18 by a predetermined amount.

In this situation, the disc holder 7 of the second position 17 and the disc holder 7 of the third position 18 are respectively moved to the third position 18 and the fourth position 13 by driving the conveyer 14. Thereafter, the rigid discs 8 loaded on the disc holder 7 which has reached the second position 17 subsequently are moved to the empty disc holder 7 which has been moved to the third position 18, and placed thereon. Moreover, the rigid discs 8 loaded on the disc holder 7 which was made to move to the fourth position 13 are used in stacking the discs 10 and the rigid discs 8 alternately one upon another on the disc holder 7 disposed at the first position 11.

The rigid discs 8 are moved from the fourth position 13 to the first position 11 and placed thereon, whereby after the disc holder 7 of the fourth position 13 becomes empty, the empty disc holder 7 is allowed to move to the first position 11. At this time, the disc holder 7 that has been at the first position 11 already is allowed to move to the fifth position 15.

In the above described apparatus for manufacturing a DVD, the rigid discs 8 are moved from the first position 11 to the second position 17, and reach the first position 11 via the third position 18 and the fourth position 13. Then, the rigid discs 8 are reused. Accordingly, a limited number of the rigid discs 8 in total can be used effectively, and cost of the apparatus can be reduced.

Furthermore, since by the conveyer 14, the disc holders 7 are similarly transported from the first position 11 to the second position 17 and further transported to the first position via the third position 18 and the fourth position 13, the disc holder 7 are cyclically reused in the disc stacking/separating apparatus D, and a limited number of disc holders 7 are effectively used. In this case, particularly, if the disc holders 7 are disposed in the first, second, third and fourth positions 11, 17, 18 and 13 one by one, the transferring operation of the rigid discs 8 from the third position 18 to the fourth position 13 can be performed during the transferring operation of the rigid discs 8 from the fourth position 13 to the first position 11, and productivity becomes high.

Furthermore, if the disc holder 7 is disposed in the fifth position 15 between the first position 11 and the second position 17 and the spreading treatment is performed in this fifth position 15, the spreading treatment can be performed during the foregoing transferring operations, thus the productivity can be further increased.

Furthermore, if the disc holder 7 is disposed in the sixth position 16 between the first position 11 and the second position 17 and the heating treatment is performed in this sixth position 16, the end curing treatment can be performed during the foregoing transferring operations, thus the productivity can be further increased.

Then, if the fifth position 15 is positioned closer to the first position 11 than the sixth position 16, the UV curable cationic composition can be cured immediately after the spreading step, and hence subsequent handling of the disc 10 becomes easier.

The present invention will be described based on examples below.

Example 1

Two disc substrates for use in a DVD are prepared, in which substrates are made of polycarbonate having an external diameter of 120 mm and an inner diameter of 36 mm, and Al films having a thickness of 80 nm were formed thereon. The two substrates were stuck by UV curable cationic composition. position.

To drop the UV curable cationic composition to the disc substrate, the apparatus shown in FIG. 4 and FIG. 5 was used.

As a dispenser (nozzle) 41, used was the model 1500 DV (nozzle inner diameter: 0.26 mm) manufactured by EFD, Inc., in United States of America. As an ultraviolet radiation means 42, a metal halide lamp M03-L31, manufactured by Iwasaki Electric Co. Ltd., was used. Conditions for the lamp were as follows. A power is 3 kW, a light radiation length is 25 cm and input energy to the lamp is 120 w/cm. Moreover, a rotation table 3 is made to be turnable by a motor (not shown). A distance between the ultraviolet radiation means 42 and the dropping UV curable cationic composition is set to 50 mm, and a reflection plate (not shown) surrounds the ultraviolet radiation means and the UV curable cationic composition, thus achieving uniformity of the ultraviolet radiation.

As the UV curable cationic composition, resin of viscosity of 230 mPa·s (at 25° C.) having the following compound ingredients was used.

Epoxy Resins:
  EX 314 manufactured by Nagase Chemicals Ltd., . . . 70 parts by weight
  EX 622 manufactured by Nagase Chemicals Ltd., . . . 30 parts by weight
Cationic Polymerization Photoinitiator:
  UVI 6990 manufactured by Union Carbide Inc., . . . 2 parts by weight After the disc substrate 1a was placed on the rotation table 3 of the apparatus shown in FIG. 4, the foregoing UV curable cationic composition 45 was dropped on the surface of the disc substrate 1a in a ring shape while rotating the rotation table 3. The ejecting pressure from the dispenser 41 was adjusted so as to make the dropping amount to be 0.27 g per one disc substrate and the average thickness of the disc after stuck to be 50 μm. The dropped position was set to a position on a circle having a diameter of 80 mm on the disc substrate 1a. This is a position where spreading distances of the UV curable cationic composition toward inner and external diameters of the disc substrate 1a are equal.

During dropping of the UV curable cationic composition 45, ultraviolet rays were radiated onto the UV curable cationic composition by allowing the ultraviolet radiation means 42 to emit light under the foregoing conditions.

The two disc substrates onto which the UV curable cationic composition was applied in the above described manner were prepared, and superposed one upon another after facing the planes thereof coated with the UV curable cationic composition in a ring shape each other. Although air bubbles are apt to be trapped in the UV curable cationic composition in superposing the disc substrate, it is possible to prevent the air bubbles from being trapped therein by superposing the disc substrates so that contact areas of the resins gradually increase.

Figure 11:
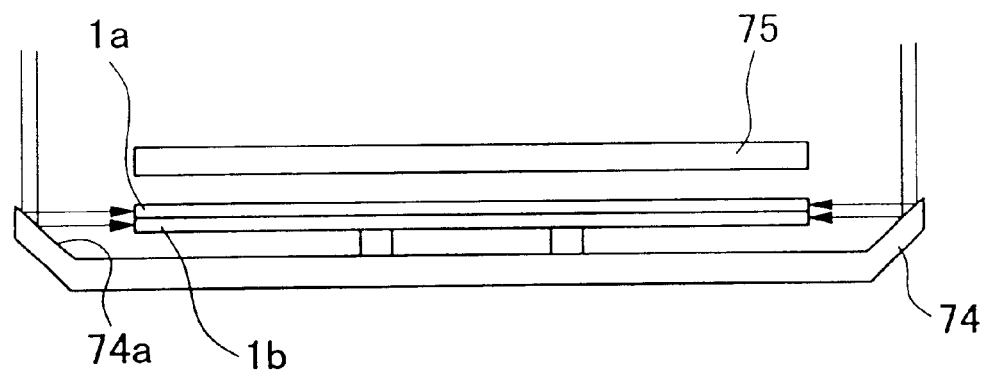
FIG. 11 is a drawing showing a schematic constitution showing an example of a method for radiating ultraviolet rays onto an end of a body of stuck discs.

Accordingly, as a concept of this example is illustrated in FIG. 11, the UV curable cationic compositions are made to contact with each other in a state where one disc substrate 1a slants to the other disc substrate 1b, and thereafter the disc substrates 1a and 1b are moved downward so as to be parallel with each other, whereby the dropped resins come to contact with each other gradually all over the periphery of the disc substrates 1a and 1b, and spread. By adjusting the descending speed of the upper disc substrate 1a, the trapping of the air bubbles could be removed perfectly.

After the spreading of the UV curable cationic composition, the two disc substrates were placed on a tray 74 as shown in FIG. 11, and an ultraviolet ray of 600 mJ/cm$^2$ was radiated from the above. In FIG. 11, since a reflection plate 74a for reflecting the ultraviolet ray is provided on a surface of the tray 74 and a shielding plate 75 is provided above the disc substrate 1a, the ultraviolet ray radiated from the above concentrates in an end of the disc substrate 1a after the superposition as shown by the arrow in the drawing. The UV curable cationic composition is susceptible to curing inhibition by humidity in the air, and curing of a portion of the compound touching the humidity in the air is delayed. Since this portion does not cure and remains sticky in some cases, it is very effective to perform the ultraviolet radiation onto the end of the disc substrate.

The UV curable cationic composition gelled after about 10 minutes, and the two disc substrates were in a condition where the both were hardly peeled off from each other. However, the end portion remains slightly sticky.

After about 20 minutes, the curing of the end portion progressed appreciably, and then fell in a tack free state. By observing the curing and bonding states of the UV curable cationic composition by peeling off the two disc substrates, it was found that the whole of the compound was uniformly cured and no air bubble or un-cured portions were observed.

Example 2

Two disc substrates for use in a DVD are prepared, in which substrates are made of polycarbonate having an external diameter of 120 mm and an inner diameter of 36 mm, and Al films having a thickness of 80 nm were formed thereon. UV curable cationic composition was applied onto one of these disc substrates in a ring shape using the apparatus shown in FIG. 4 similarly to example 1. Ejection pressure from the dispenser 41 was adjusted so that a dropping amount was about 0.8 g. A dropping position was set to a position of a diameter: 65 mm of the disc substrate 1a. The dropping position was selected as a position suitable for spreading the UV curable cationic composition all over the surface of the disc substrate 1a when the compound was spread by a spin coat method later.

After the UV curable cationic composition was dropped in a ring shape, a bonded plane of another disc substrate was made to face the plane of the disc substrate where the UV curable cationic composition was dropped in a ring shape, and then the both were superposed. After the superposition, the both disc substrates were rotated at a speed of 4000 min$^{-1}$ for 3 seconds, whereby the UV curable cationic composition was spread between the two disc substrates.

Figure 12:
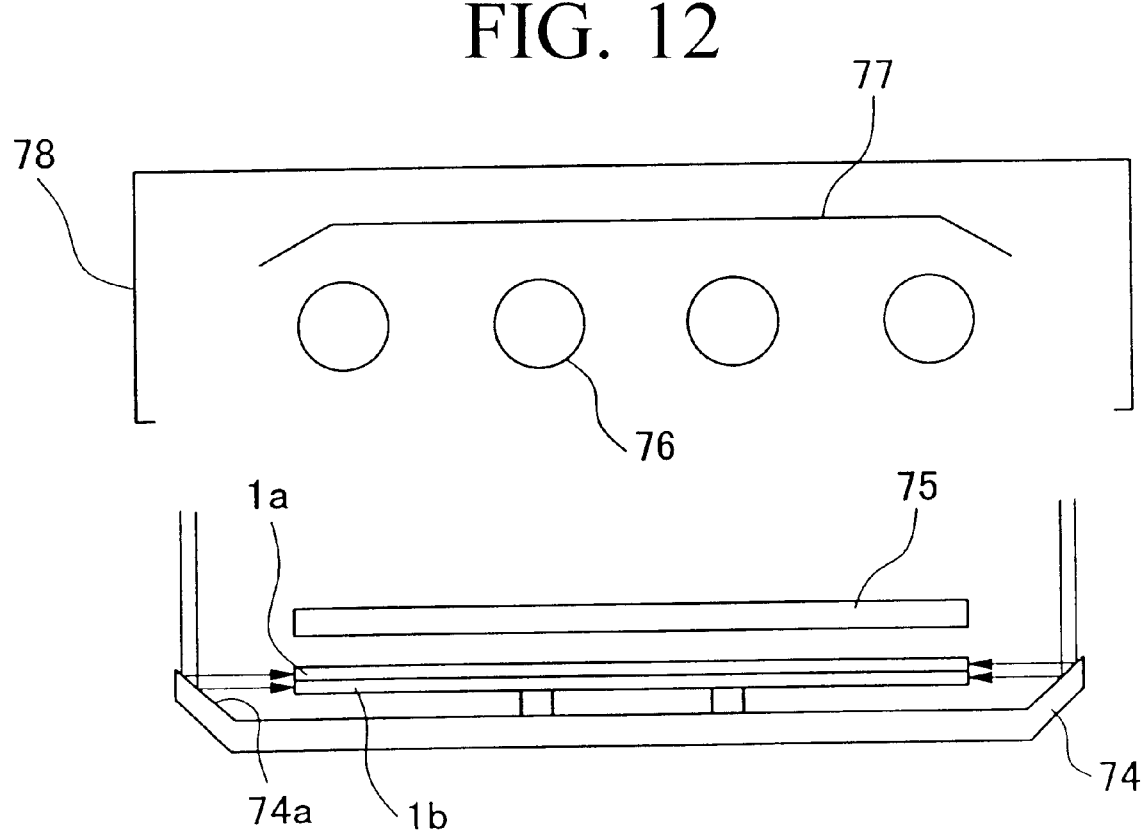
FIG. 12 is a drawing showing a schematic constitution of an apparatus used for ultraviolet radiation onto the end of the body of stuck discs.

Thereafter, similarly to example 1, to promote curing of the end of the disc, which is a unit by superposing the two disc substrates, the disc substrate 1a was placed on a tray 74 having a reflection plate 74a on a surface thereof for reflecting ultraviolet rays, and a shielding plate 75 disposed above the disc substrate 1a, as shown in FIG. 12. The ultraviolet ray was radiated onto the disc substrate 1a flashingly. As shown in FIG. 12, the ultraviolet ray was radiated by ultraviolet radiation means composed of a long cylindrical xenon flash lamp 76 (FQ-20003 type manufactured by Ushio Inc.,) having a pipe diameter of 10.5 mm and offering an effective light radiation length of about 200 mm, a reflection plate 77 and a box 78 housing these constituent components. With reference to radiation conditions, capacitance C of a capacitor and inductance L (not shown) in a discharge circuit were adjusted so that a pulse width of discharge current was 650 microseconds, a charging voltage was adjusted so that lamp input energy was 200 J per one lamp, and 10 shots were radiated at a repetition speed of five times/second. Note that a distance between the xenon flash lamp 76 and the disc substrate 1a was set to 40 mm.

After the above described flashing radiation of the ultraviolet ray, when the curing situation of the UV curable cationic composition was observed, the sticky state of the end portion of the disc which had been observed was not found substantially immediately after the flashing radiation.

The UV curable cationic composition between the disc substrates gelled when about 10 minutes had passed after the superposition by a spin coat method, and the two disc substrates were in a condition that the both were hardly peeled off from each other.

The two disc substrates were forcibly peeled off from each other after about 20 minutes, and the curing and bonding states of the UV curable cationic composition were observed. Then, the whole of the compound was uniformly cured, and un-cured portions were not observed. Moreover, air bubbles were not observed.

Example 3

Next, another experiment, which was performed to confirm effects of the present invention, will be described.

A disc substrate used was a disc substrate for use in a DVD, in which an Al film having a thickness of 80 nm was formed on a surface of a substrate made of polycarbonate having an external diameter of 120 mm and an internal diameter of 15 mm.

As a rigid disc, a hollow disc made of pure Al having a thickness of 2 mm, an external diameter of 100 mm and an internal diameter of 15.2 mm was prepared by a lathe working.

On the other hand, the UV curable cationic composition used was that 60 parts of hydrogenated bisphenol A diglycidyl ether, 40 parts of 1,6-hexanediol diglycidyl ether ("16H-DGE", a low chlorine product of total chlorine content=0.2 weight %, from SAKAMOTO YAKUHIN KOGYO Co. Ltd., Japan), 0.5 parts of cationic polymerization photoinitiator "RHODORSIL PHOTOINITIATOR 2074" (4-methylphenyl-4-(1-methylethyl)phenyliodonium tetrakis(pentafluorophenyl)borate from Rhodia, U.S.A.) and 0.2 parts of silicone oil "L7604" (from NIPPON UNICAR Co. Ltd., Japan) were mixed and dissolved each other for an hour at 60° C., which had a viscosity of 226 mPa·s (at 25° C.). Here, the above hydrogenated bisphenol A diglycidyl ether was obtained by hydrogenating bisphenol A diglycidyl ether ("EPICLON 850S", total chlorine content=0.14 weight %, from DAINIPPON INK AND CHEMICALS, Inc., Japan) under the presence of a ruthenium catalyst, at a hydrogen pressure of 40 kg/cm$^2$ and a temperature of 40° C. for seven hours.

On the foregoing disc substrate, the foregoing UV curable cationic composition was dropped and applied using the foregoing model 1500 DV (nozzle inner diameter: 0.83 mm) manufactured by EFD Inc., in United States of America such that a coating amount was 0.4 g. As ultraviolet radiation means 42, ultraviolet radiation apparatus I250 type D valve (light radiation length: about 25 cm) manufactured by Fusion Co. Ltd., was used, and radiation was performed with an output equal to 70% of the maximum output.

After coating, a disc substrate not coated with the UV curable cationic composition superposed, and the disc was placed on the rigid disc 8 as shown in FIG. 9. By a weight of the disc substrate positioned upper side, the UV curable cationic composition between the two disc substrates started to spread. The rigid disc 8 was placed thereon, and another disc obtained subsequently was placed on the rigid disc 8. The same operation was repeated, and thus the 60 discs and rigid discs are stacked one upon another.

After the 60-th disc substrate was stacked, the discs and the rigid discs were left at a temperature of 24° C. for five minutes. Thereafter, the end treatment by the ultraviolet radiation was performed as shown in FIG. 10. As ultraviolet radiation means 73, a long cylindrical xenon flash lamp (FQ-20004 type manufactured by Ushio Inc.,) having a pipe diameter of 10.5 mm and offering an effective light radiation length of about 200 mm was used. The disc 10 and the ultraviolet radiation means 73 were surrounded by a reflection plate. With the radiation conditions, capacitance C of a capasitor and inductance L (not shown) in a discharge circuit were adjusted so that a pulse width of discharge current was 650 microseconds, a charging voltage was adjusted so that lamp input energy was 200 J, and 10 shots were radiated at a repetition speed of five times/second. Note that the radiation was performed while rotating the spindle 71 at a speed in which the spindle 71 made one revolution for two seconds, and a distance between the xenon flash lamp (ultraviolet radiation means) and the disc 10 was set to 40 mm.

After the end treatment, the UV curable cationic composition between the disc substrates gelled, and stickiness of the end was scarcely observed. Furthermore, after passage of three minutes, the curing and bonding states of the UV curable cationic composition were observed by peeling off the two disc substrates, then the whole of the compound was uniformly cured, and air bubbles in addition to un-cured portions were not observed. Note that the curing state for the disc that had not been undergone the end treatment was observed, then the UV curable cationic composition at the end of the disc was sticky even when ten minutes had passed after the superposition.

After the UV curable cationic composition was cured perfectly, a deformation state of the disc was evaluated. As to a disc (comparison example 1) obtained under the same conditions as those described above other than no use of the rigid disc, a disc (comparison example 2) obtained under the same conditions as those described above other than no use of the rigid disc and use of a flat disc with no ring-shaped convex portion, and a disc (comparison example 3) obtained under the same conditions as those described above other than that the discs were superposed with the rigid disc therebetween after the expansion, the deformation state was also evaluated. The evaluations used the method disclosed in Japan Patent Laid-Open No. 10(1998)-320838 by the inventors of this application. The results are illustrated in FIG. 13.

As is understood from the table of FIG. 13, in example 3 in which the rigid disc was used, a warp angle is smaller compared to the comparison examples. Particularly, the warp angle for the example 3 in the semi-diameter direction is 0.32° at the upper plane of the disc and 0.29° at the lower plane thereof. In the comparative example 1, the warp angle is 0.69° at both of the upper and lower planes thereof, in the comparative example 2, the warp angle is 0.48° at the upper plane and 0.46° at the lower plane, and in the comparative example 3, the warp angle is 0.65 at the upper plane and 0.67 at the lower plane. Specifically, it is found that a warp angle prevention effect is significant in the semi-diameter direction. A trend to create a difference in the warp angle depending on the position of the superposition was not recognized.

From the comparison of the example with the comparative example 3, it is proved that the spreading treatment should be performed on a statically flat plane to prevent the warp. Specifically, it is considered to be a very difficult attempt to remove the warp after the occurrence, the warp being occurred when the spreading is completed. By the way, according to the standard of DVD-RAM, it is required that a warp angle in the semi-diameter direction is 0.7° or less, and the warp angle in the circumference direction is 0.3° or less.

Moreover, from the results of the comparison example 2, it can be confirmed that even in the discs having no ring-shaped convex portion, the warp angle is large because after a plurality of discs are stacked a statically flat plane is not formed.

Based on the data obtained from the foregoing evaluations, the external shape of the disc is shown in FIG. 14. In FIG. 14, (*a*) shows the external shape of the disc of this example, and (*b*) shows the external shape of the disc according to the comparison example 1. Note that both of (a) and (b) show the evaluation result concerning the upper plane of the disc.

In FIGS. 14 (*a*) and (*b*), the ideal external shape of the disc which is assumed to have no warp is shown by the dashed lines, and the external shape of the evaluated substrate is shown by the solid lines (spiral shape). It is proved that the disc in this example has less warp and has the external shape approximate to the ideal disc.

Figure 15:
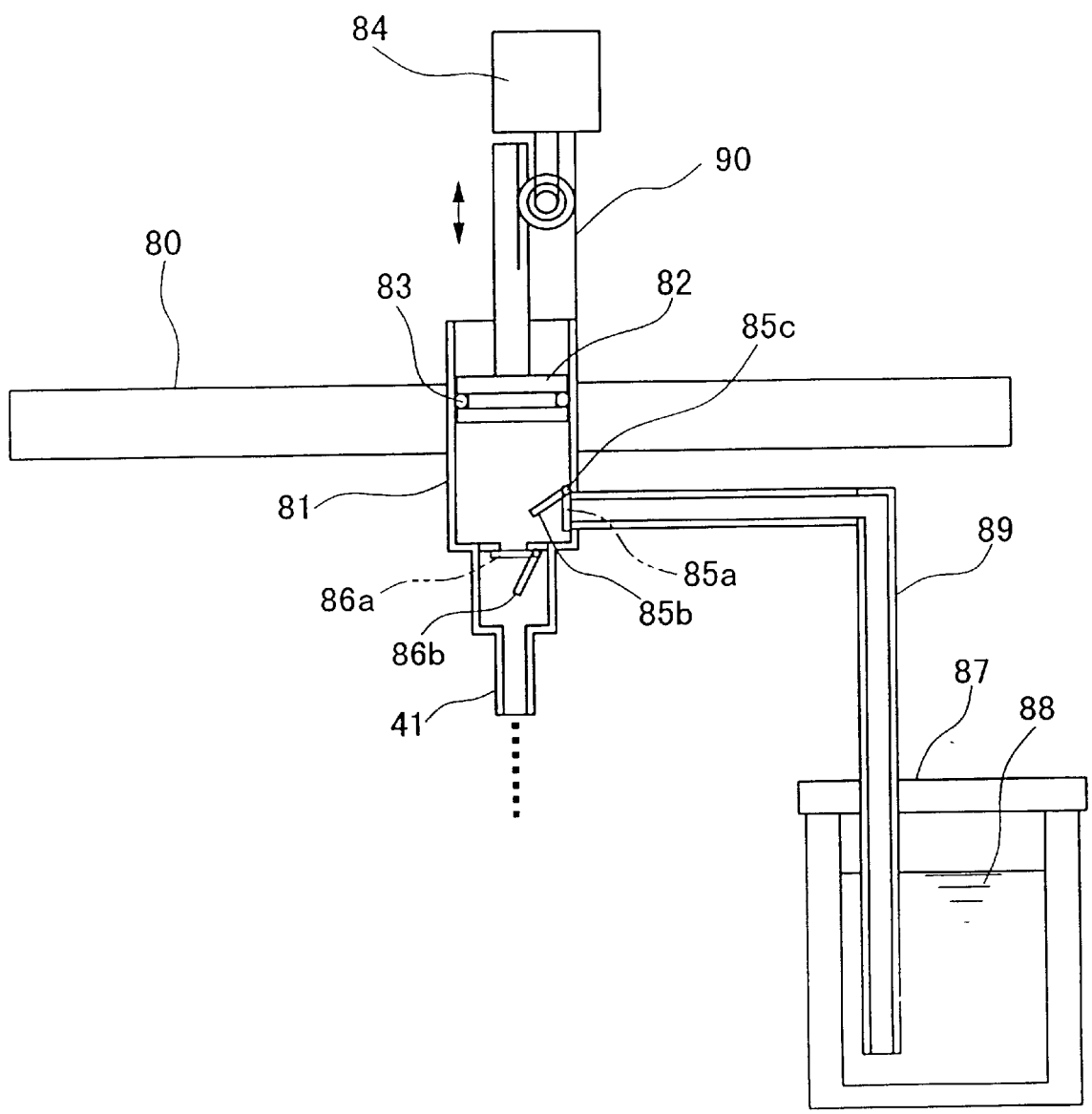
FIG. 15 is a drawing showing another constitution of a coating apparatus for the UV curable cationic composition.

A method of applying the UV curable cationic composition after measuring the volume thereof is shown in FIG. 15. In FIG. 15, reference numeral 80 denotes a pedestal for fixing a coating apparatus; 81, a cylinder portion of the coating apparatus; and 84, a power source (a motor). Reference numeral 90 denotes a supporting column which is united with the cylinder portion and to which the foregoing motor is fitted. Reference numeral 82 denotes a piston which is reciprocation movable upward and downward, and reference numeral 83 denotes an O ring for sealing the UV curable cationic composition so as not to leak upward. Reference numeral 87 denotes a tank for stocking the UV curable cationic composition; 88, the UV curable cationic composition in liquid state; and 89, a pipe for introducing the liquid UV curable cationic composition to the coating apparatus.

Reference numeral 85 denotes a suction valve which is opened when sucking the UV curable cationic composition. Reference numeral 85*b* shows a state where the valve is opened by rotating the valve relative to the starting point 85*c* (using the point 85*c* as a fulcrum) and 85*a* shows a state where the valve is closed by rotating the valve (using the point 85*c* as the fulcrum) relative to the starting point 85*c* (using the point 85*c* as the fulcrum).

Reference numeral 86 denotes an ejection valve which is opened when ejecting the UV curable cationic composition. Reference numeral 86*b* shows a state where the valve is opened by rotating the valve relative to the starting point 86*c* and 86*a* shows a state where the valve is closed by rotating the valve relative to the starting point 86*c*.

Both of the suction valve 85 and the ejection valve 86 have a mechanism which maintain normally a closed state by spring force (not shown).

The suction of the UV curable cationic composition into the cylinder 81 is achieved by allowing the plane (the liquid contact plane) of the piston 82 of the coating apparatus first located at the position Z2, the plane contacting the UV curable cationic composition, to move to the position Z1 by operating the motor 84.

In this suction operation, though the suction valve 85 attempts to keep the closed position 85*a* by means of a spring force (not shown), the driving force of the piston overcomes the spring force, so that the suction valve 85 is opened. Thus, the UV curable cationic composition is introduced from the stock tank 87. On the other hand, since the closed state of the ejection valve 86 is kept by the spring force (not shown), liquid leakage (ejection) never occurs during the suction operation.

Next, the ejection of the UV curable cationic composition is achieved by allowing the plane (liquid contact plane) of the piston 82 of the coating apparatus first located at the position Z1, the plane contacting the UV curable cationic composition, to move to the position Z2 by operating the motor 84. In this ejection operation, since the suction valve 85 is in the closed position 85a, an adverse flow toward the stock tank is blocked. On the other hand, though the ejection valve 86 operates so as to keep the closed state by a spring force (not shown), the driving force of the piston overcomes the spring force, so that the opened state 86b is realized.

In the coating apparatus of the UV curable cationic composition operated as described above, since a coating amount (volume) is determined depending on a product of a sectional area of the cylinder 81 and a difference of water heads (Z1–Z2) of the foregoing liquid contact plane of the piston 82, the coating with the UV curable cationic composition measured for the volume can be realized by means of an operation in which Z1 and Z2 are previously set.

By the way, the reason why the volume measurement is performed before the UV curable cationic composition is applied by the above-described constitution is as follows.

The UV curable cationic composition must inevitably be in a liquid state (liquid) in applying on the stuck object, and a thermal property of viscosity of the liquid generally shows exponential changes called Arrhenius type. That is, the UV curable cationic composition has a feature showing a large rate of change for temperature.

Although a valve type dispenser is sometimes used, the valve type dispenser controls an ejection amount by an open/close time of the valve. Accordingly, this dispenser has a drawback that the ejection amount is influenced by viscosity of liquid to be applied and changes significantly depending on an ambient temperature.

To be concrete, when the ambient temperature becomes high, the viscosity lowers, resulting in an increase in the ejection amount. Thus, the UV curable cationic composition of a larger amount than that previously determined is ejected. On the contrary, when the ambient temperature becomes low, the ejection amount decreases. Thus, the UV curable cationic composition of a smaller amount than that previously set is ejected.

In accordance with the temperature dependency of the ejection amount, a coating amount onto the stuck body depends on temperature. As a result, a situation where a bonding layer is not perfectly formed between the two disc substrates may occur.

However, by adopting a method in which the UV curable cationic composition is ejected through the dispenser nozzle after previously measuring the UV curable cationic composition in terms of volume, as described above, the above described situation never occurs, and manufacturing steps showing a high yield ratio can be realized. As means for measuring the UV curable cationic composition in terms of volume, the UV curable cationic composition is introduced from the tank stocking the compound to the cylinder of the dispenser through the suction valve by the pipe, and the piston is allowed to move to a predetermined position of the cylinder, thus sucking the UV curable cationic composition thereinto to achieve the measurement in terms of volume. The measured volume in this case is determined by a product of a cylinder sectional area and a piston movement amount. In the case where the UV curable cationic composition measured in terms of volume in the above described manner is ejected, the ejection can be realized in such manner that the suction valve is closed, and the piston is moved to a direction reverse to that of the suction while opening the ejection valve provided on the nozzle side. In the above-described method, the suction and ejection operations are repeated, every time the UV curable cationic composition is applied once.

Alternatively, the volume measurement coating is possible also by moving a piston little by little and ejecting the UV curable cationic composition by a necessary amount, after sucking the UV curable cationic composition in a large cylinder having the known diameter. Also the measured volume of the UV curable cationic composition is determined by a product of a cylinder sectional area and a piston movement distance for one ejection. In the above described methods, the ejection is performed in plural times per one suction operation for sucking the UV curable cationic composition, and the suction operation is repeated at the time no UV curable cationic composition remains in the cylinder. The UV curable cationic composition ejected in the above-described manner is applied onto at least one of the two disc substrates after subjected to the ultraviolet rays.

In the ring-shaped coating, to achieve the improvement of a coating precision in the disc circumference direction, when the UV curable cationic composition (adhesive) previously measured in terms of volume is ejected by a predetermined amount, an electric power, for example, an AC servomotor, is used as a driving power source, then not only a coating with a higher precision is possible, but also a coating speed and volume can be adjusted more easily, compared to use of compressed air as the driving power source.

Moreover, when the UV curable cationic composition is measured in terms of volume, the measurement should be performed in consideration for a specific gravity, a degree of shrinkage in curing, a bonding area and a bonding layer thickness of the UV curable cationic composition.

Embodiment 4

Next, an experiment performed to confirm the effects according to the foregoing constitution will be described. Prepared were a disc substrate for use in a DVD, in which an Al film having a thickness of 80 nm is formed on a substrate made of polycarbonate having an external diameter of 120 mm and an internal diameter of 15 mm, and a disc substrate having a semitransparent Au film showing transmittance of 70% at 680 nm, in which an evaluation concerning a thickness of a bonding layer can be easily performed after sticking. As a rigid disc, prepared was a hollow disc made of pure Al having a thickness of 2 mm, an external diameter of 100 mm and an internal diameter of 15.2 mm shaped by lathe working.

On the other hand, the UV curable cationic composition used was that 60 parts of hydrogenated bisphenol A diglycidyl ether, 40 parts of 1,6-hexanediol diglycidyl ether ("16H-DGE", a low chlorine product of total chlorine content=0.2 weight %, from SAKAMOTO YAKUHIN KOGYO Co. Ltd., Japan), 0.5 parts of cationic polymerization photoinitiator "RHODORSIL PHOTOINITIATOR 2074" (4-methylphenyl-4-(1-methylethyl)phenyliodonium tetrakis(pentafluorophenyl)borate from Rhodia, U.S.A.) and 0.2 parts of silicone oil "L7604" (from NIPPON UNICAR Co. Ltd., Japan) were mixed and dissolved each other for an hour at 60° C., which had a viscosity of 226 mPa·s (at 25° C.). Here, the above hydrogenated bisphenol A diglycidyl ether was obtained by hydrogenating bisphenol A diglycidyl ether ("EPICLON 850S", total chlorine content=0.14 weight %, from DAINIPPON INK AND CHEMICALS, Inc., Japan) under the presence of a ruthenium catalyst, at a hydrogen pressure of 40 kg/cm$^2$ and a temperature of 40° C. for seven hours.

Using a coating apparatus having a volume measurement function manufactured by a method publicly known and commonly used, the foregoing UV curable cationic composition was dropped and applied on the foregoing disc substrate in a ring shape such that a coating amount is 0.4 g. Since the inner diameter of the cylinder 81 of the foregoing coating apparatus was 8 mm and a specific gravity of the foregoing UV curable cationic composition was 1.065, the motor was operated by a controlling apparatus (not shown) such that the foregoing water head difference (Z1–Z2) for realizing the foregoing coating amount is 0.48 cm.

As ultraviolet radiation means 42, ultraviolet radiation apparatus I250 type D valve (light radiation length: about 25 cm) manufactured by Fusion Co. Ltd., was used, and radiation was performed with an output equal to 70% of the maximum output.

After coating, a disc substrate on which the UV curable cationic composition was not applied was superimposed, and the disc was placed on the rigid disc 8 as shown in FIG. 9. By a weight of the disc substrate positioned upper side, the UV curable cationic composition between the two disc substrates started to spread. The rigid disc 8 was placed thereon, and another disc obtained subsequently was placed on the rigid disc 8. The same operation was repeated, and thus the 60 discs and rigid discs are stacked one upon another.

After the 60-th disc substrate was stacked, the discs and the rigid discs were left at a temperature of 24° C. for five minutes. Thereafter, the end treatment by a halogen heater was performed. As the halogen heater, a halogen heater unit with a gold mirror having a high efficiency reflection performance (IHU-H01-00 type manufactured by Ushio Inc.,) was used. Heating was performed under conditions that the halogen heater unit was turned on with a voltage of AC 100 V, a distance between the halogen heater unit and the disc 10 was set to 500 mm, and the spindle 71 was rotated at a speed in which the spindle 71 made two revolutions for one second during the heater unit was on.

The same sticking experiments were executed under ambient temperatures of 24° C. and 27° C., to evaluate how an average thickness of the bonding layer changes depending on ambient temperature, and a difference between the both was confirmed.

After the end treatment, the UV curable cationic composition between the disc substrates of the disc prepared at any of the ambient temperatures gelled, and stickiness of the end was scarcely observed. Furthermore, after passage of three minutes, the curing and bonding states of the UV curable cacationic composition were observed by peeling off the two disc substrates, then the whole of the compound was uniformly cured, and no air bubble or un-cured portions were observed. Note that the curing state for the disc that had not been undergone the end treatment was observed, and the UV curable cationic composition at the end of the disc was sticky even when ten minutes had passed after the superposition.

After the UV curable cationic composition was cured perfectly, the warp of the disc and the average thickness were evaluated. Note that when the average thickness was evaluated, a disc was used, which was obtained by sticking the disc substrate having the foregoing Al film formed thereon and the disc substrate having the foregoing Au semitransparent film formed thereon with each other by a method similar to the above described method. For the evaluation of the warp, a method disclosed in Japanese Patent Laid-Open No. 10(1998)-320838 by the inventor and the like was used, and for the evaluation of the bonding layer thickness, a three-dimensional intermediate layer thickness inspection system TMS-901 type manufactured by DAINIPPON INK AND CHEMICALS, Inc., was used. The results are shown in FIG. 16.

Note that a trend to create a difference in the warp angle by the superposition position was not recognized.

According to the standard of DVD-RAM, it is required that a warp angle in the semi-diameter direction is 0.7° or less, and the warp angle in the circumference direction is 0.3020 or less, and according to this example it is proved that there is scarcely a possibility that defective products will be produced.

It is proved that the average thickness of the bonding layer formed by curing the UV curable cationic composition scarcely changes in spite of the change of the ambient temperature.

Next, as a comparative example, when the UV curable cationic composition was applied, an evaluation of the stuck disc obtained by use of a valve type coating apparatus which has no volume measurement function was performed. Using the model 1500 DV (nozzle inner diameter: 0.83 mm) manufactured by EFD Inc., in United States of America was used as the coating apparatus, the bonding was performed under the same conditions as the above described conditions other than the coating apparatus, and the change depending on the ambient temperatures was investigated (comparative example 1). The setting of the coating amount was adjusted so that the coating amount is 0.4 g at ambient temperature of 24° C., and the bonding was performed without any adjustment afterward.

The results are shown in FIG. 17. As shown in FIG. 17, also in the comparative example, it is proved that there is scarcely a possibility that defective products owing to the warp will be produced. On the other hand, while the average thickness of the bonding layer is 35.1 µm when the bonding layer is stuck at the ambient temperature of 24° C., the average thickness is increased to be as large as 45.5 µm when the bonding layer is stuck at the ambient temperature of 27° C., and it is proved that influence of the ambient temperature change are very significant.

Since the coating of the UV curable cationic composition is performed after previously measuring the coating amount in terms of volume when the UV curable cationic composition is applied, the coating amount hardly changes even when the ambient temperature changes, and the bonding step, with a high yield, capable of keeping the average thickness of the bonding layer constant is realized.

Note that also in the foregoing embodiment, another constitution may be adopted without departing from spirit and scope of the present invention.

For example, in stead of the deflection impartment means 22 in the transportation apparatus 2 shown in FIG. 2, deflection impartment means (uppermost disc substrate holding means) 22' shown in FIG. 18 and deflection impartment means (uppermost disc substrate holding means) 22" shown in FIG. 19 may be adopted.

The deflection impartment means 22' in the transportation apparatus 2 shown in FIG. 18 comprises a pair of vacuum suction portions 221 and a pair of reciprocation operation portions 222. The two reciprocation operation portions 222 are capable of operating independently from each other.

Figure 18A:
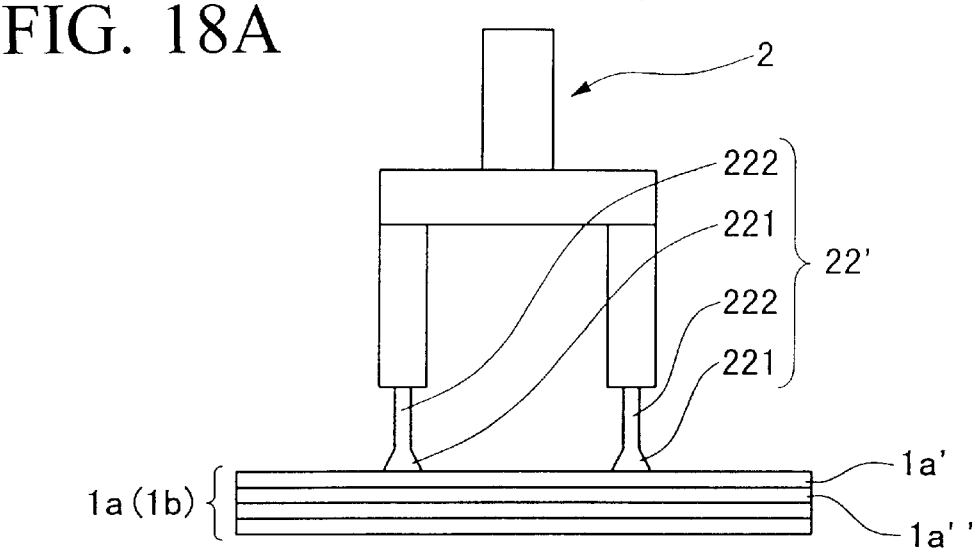
FIG. 18 is a diagram showing another example of the transportation apparatus shown in FIG. 2.

In such constitution, to transport the first disc substrate 1a, the transportation apparatus 2 is disposed so as to face the uppermost disc substrate 1a' among the first disc substrates 1a, and both of the vacuum suction portions 221 are allowed to be in contact with the first disc substrate 1a' as shown in FIG. 18(a).

Figure 18B:
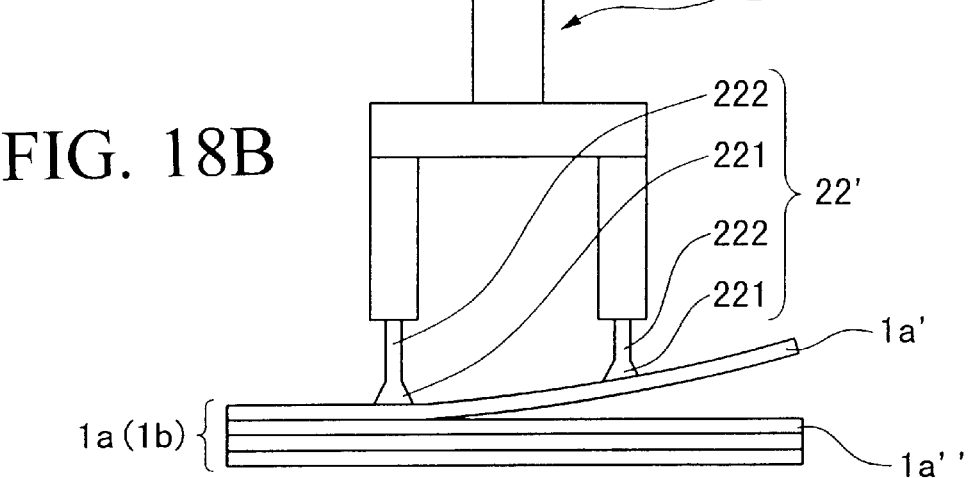

Next, the vacuum suction portions 221 are allowed to vacuum adhere the surface of the first disc substrate 1a', and one of the reciprocation operation portions 222 is allowed to retire as shown in FIG. 18(b). In this case, the reciprocation operation portion 222 retired elevates a portion in the first disc substrate 1a' upward, the portion being sucked by the vacuum suction portion 221 provided in the tip of the reciprocation operation portion 222.

At this time, among the first disc substrates 1a', the reciprocation operation portion 222 which do not retire and the vacuum suction portion 221 provided in the tip thereof act so as to mechanically constrain the first disc substrate 1a' and to suppress the displacement thereof Thus, the first disc substrate 1a' made of a material having flexibility deforms to a curvature state as shown in FIG. 18(b), thus causing a strain in the first disc substrate 1a'.

Force which attempts to also deform the first disc substrate 1a" along the uppermost first disc substrate 1a' acts, the first disc substrate 1a" being imitationally adhered to the first disc substrate 1a'. Thus, a strain occurs, and, at the same time, restoring force to dissolve the strain acts thereon.

Then, when the restoring force exceeds adhesive force acting between the uppermost first disc substrate 1a' and the first disc substrate 1a", the lower side first disc substrate 1a" comes off from the first disc substrate 1a', and restores its shape to the original plane shape. Thus, the portion of the uppermost first disc substrate 1a', which is sucked by the vacuum suction portion 221 which has retired, separates from the lower side first disc substrate 1a".

Generally, vacuum suction force accompanied with no suction by static electricity force and motive power has a nature that weakens rapidly when a small air space has once occurred. Accordingly, when a portion of the first disc substrate 1a' is allowed to be apart from the lower side first disc substrate 1a" as shown in FIG. 18(b), it is possible to significantly reduce adhesive force acting on the separated portion.

Figure 18C:
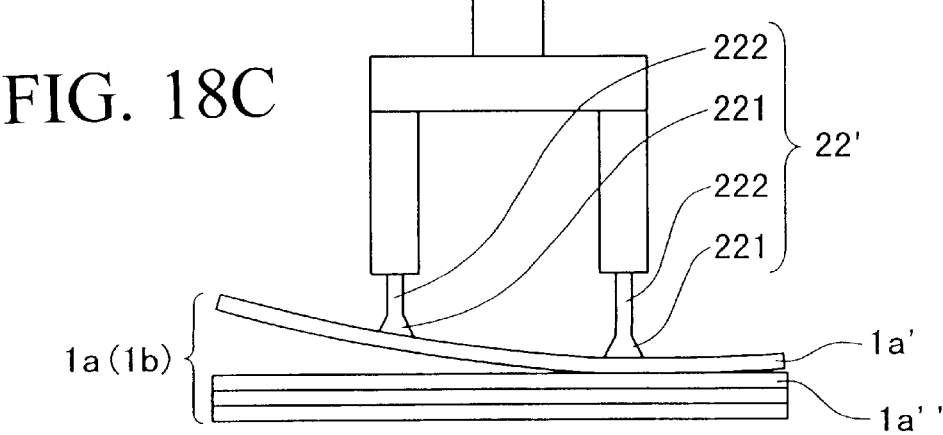

Next, as shown in FIG. 18(c), the reciprocation operation portion 222 that has been retired is returned to the original position, and another reciprocation operation portion 222 is made to retire. Thus, by the same operation as that described above, the portion sucked by the vacuum suction portion 221 newly retired is separated from the lower side first disc substrate 1a", and adhesive force acting on the portion separated can be significantly reduced.

When deflection is made to occur twice in the first disc substrate 1a' by alternately retiring the two reciprocation operation portions 222 which are stretchable independently, the adhesive force all over the first disc substrate 1a' can be securely reduced even when imitational adhesive force is relatively strong. Thus, it is possible to prevent the simultaneous taking-out of the two first disc substrates 1a securely.

Moreover, the reciprocation operation portion 222 and the vacuum suction portion 221 which are operated independently may be provided at three places as the deflection impartment means 22" shown in FIG. 19.

Figure 19A:
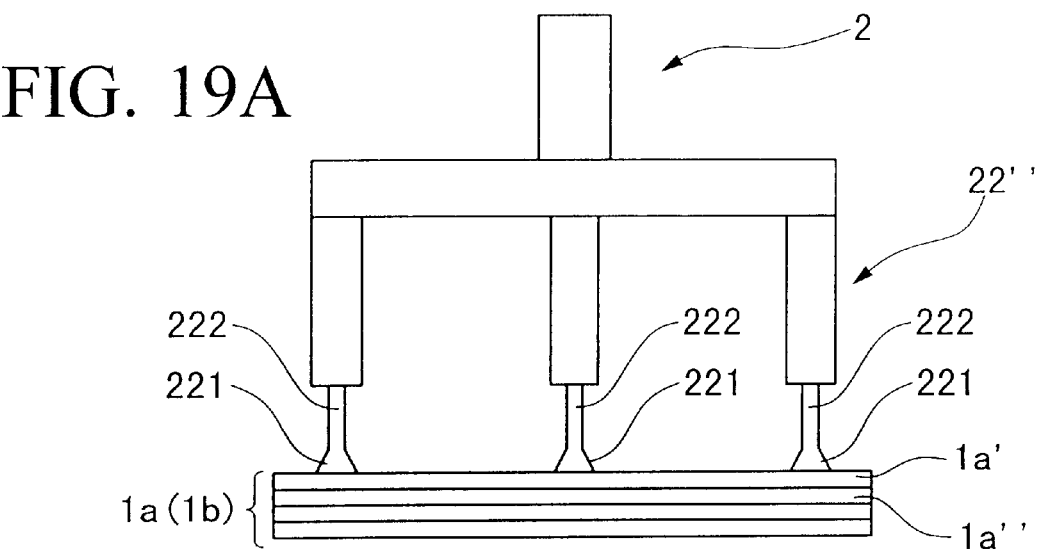
FIG. 19 is a drawing showing still another example of the transportation apparatus shown in FIG. 2.
Figure 19B:
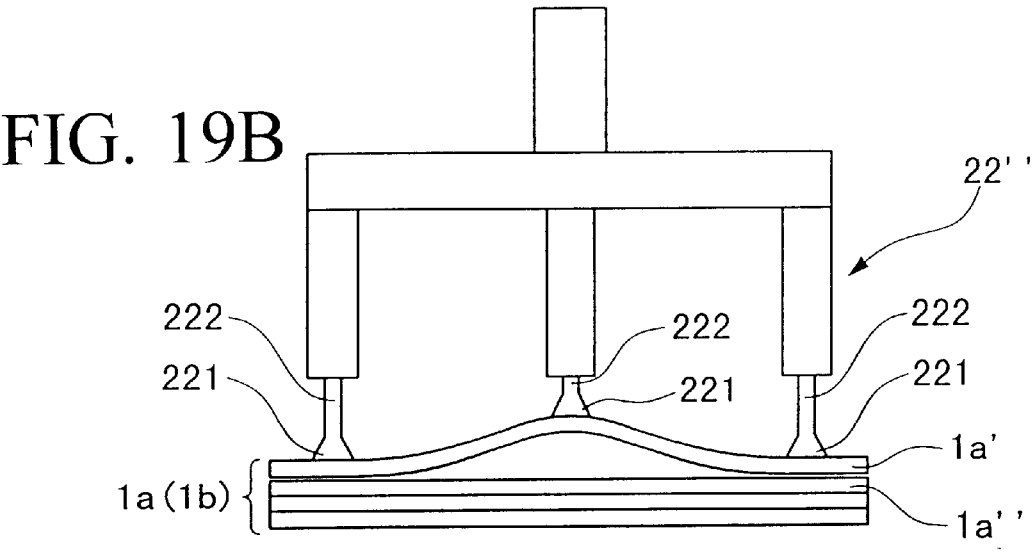
Figure 19C:
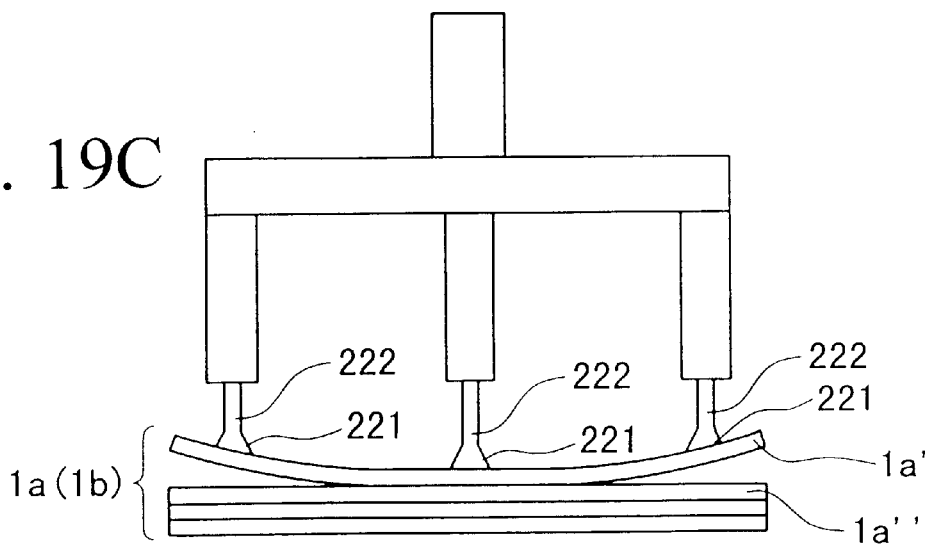

In this constitution, as shown in FIG. 19(a), after the vacuum suction portions 221 are allowed to suck respectively the first disc substrate 1a", the vacuum suction portion 221 positioned in the middle is allowed to make displacement upward as shown in FIG. 19(b), and then the vacuum suction portion 221 in the middle is returned to the original position as shown in FIG. 19(c). Subsequently, the vacuum suction portions 221 on both sides are allowed to make displacement upward. Thus, adhesive force acting on the uppermost first disc substrate 1a' is reduced securely all over the disc substrate, and only the first disc substrate 1a' can be separated.

As described above, by providing the reciprocation operation portions 222 and the vacuum operation portions 221 in the three points, a strain imparted to the first disc substrate 1a' can be made to be larger, and separation force can be increased.

Also in the method for separating the disc substrates shown in FIG. 18 and FIG. 19, by adjusting the distance between the vacuum suction portions 221 and the movable range of the reciprocation operation portions 222, it is possible to adjust the separation force. However, needless to say, these adjustments should be confined within a range of an elastic deformation of the disc substrate. The first disc substrate 1a shown in FIG. 18 and FIG. 19 may be a second disc substrate 1b.

In the method for separating the disc substrates shown in FIG. 2 or FIGS. 18 and 19, the vacuum suction is adopted as means for imparting a load to cause a deflection in the first disc substrate 1a'. In this case, if the vacuum suction portion 221 is made of rubber, it is particularly possible to prevent surface defects of the disc substrate from occurring. However, as the means for imparting the load to the first disc substrate 1a', other means may be satisfactorily adopted in addition to the vacuum suction.

Second Embodiment

Next, a second embodiment of the present invention will be described while taking a manufacture of a DVD as an example with reference to the drawings.

A manufacturing apparatus of a DVD described in the second embodiment has the same constitution as that of the manufacturing apparatus of a DVD shown in the first embodiment in its principal portions. Accordingly, only portions different from those of the first embodiment will be described, and portions common to those of the first embodiment will be denoted by the same reference numerals. Descriptions for these potions will be omitted.

The manufacturing apparatus of a DVD shown in FIG. 20 differs from that of the foregoing first embodiment in constitutions of a disc stacking/separating apparatus D'.

Figure 21:
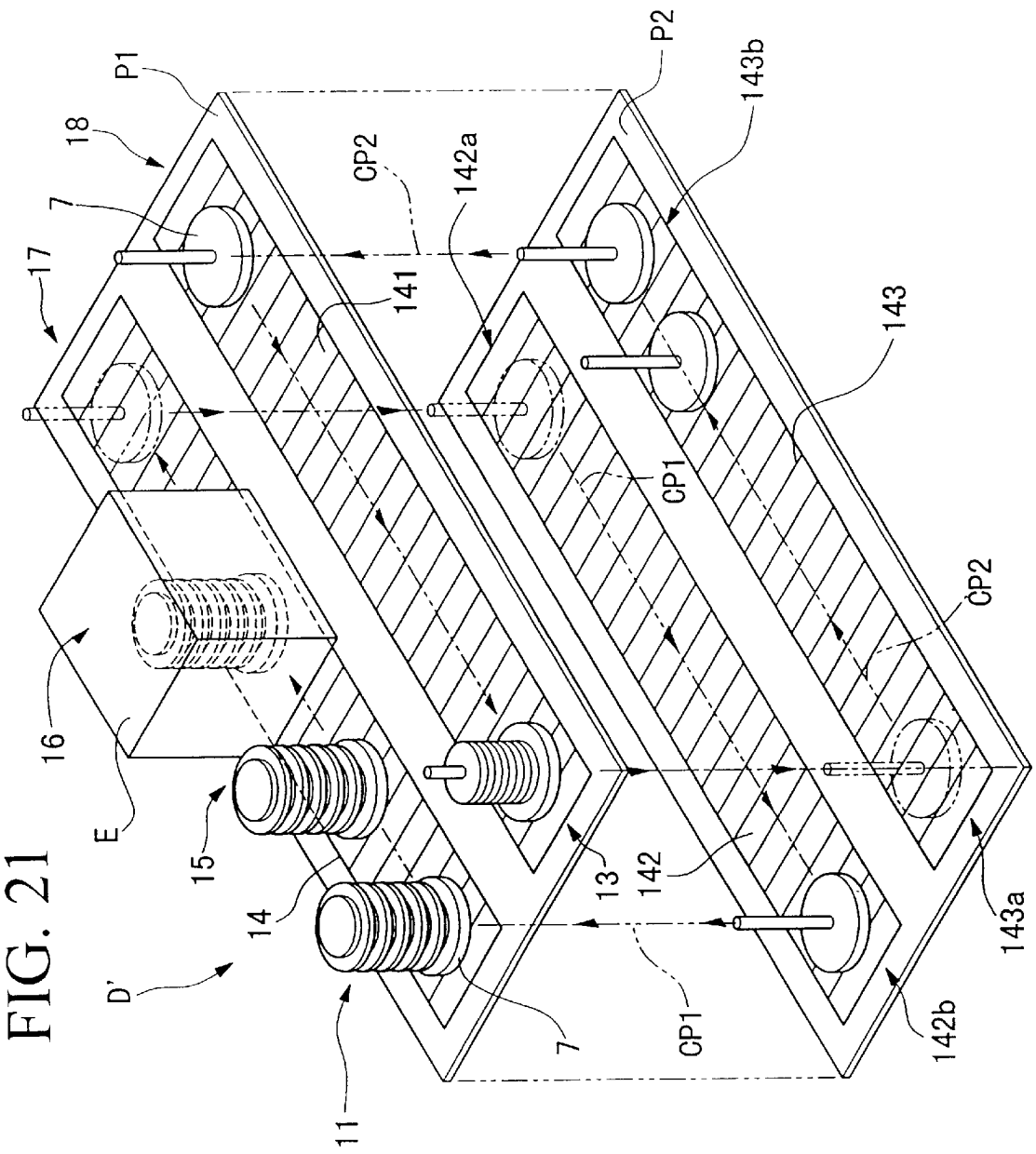
FIG. 21 is a perspective view schematically showing a disc stacking/separating apparatus used for the optical disc manufacturing apparatus of FIG. 20.

In this disc stacking/separating apparatus D', in addition to a conveyer 14 for transporting a disc holder 7 from a first position 11 to a second position 17, a conveyer 141 is provided for transporting the disc holder 7 from a third position 18 to a fourth position 13. Moreover, as shown in FIG. 21, a conveyer 142 for transporting the disc holder 7 in an inverse direction to the transportation direction of the conveyer 14 is provided on a plane P2 positioned below a plane P1 formed by the first, second, third and fourth positions 11, 17, 18 and 13, below the conveyer 14. A conveyer 143 for transporting the disc holder 7 in an inverse direction to that of the conveyer 141 is provided on the plane P2 below the conveyer 141.

Vertically moving means (not shown) for taking the disc holder 7 down from the second position 17 to a starting point 142a of the conveyer 142 is provided between the second position 17 and the starting point 142a of the conveyer 142. Vertically moving means (not shown) is provided also between the a final point 142b of the conveyer 142 and the first position 11, and the disc holder can ascend from the final point 142b of the conveyer 142 to the first position 11. Thus, a transportation path CP1 of the disc holder 7 which starts from the first position 11 and returns to the first position 11 via the second position 17, the starting point 142a of the conveyer and a final point 142b is formed so as to form a plane perpendicular to the plane P1.

Furthermore, vertically moving means (not shown) for taking the disc holder 7 down from the fourth position 13 to the starting point 143a of the conveyer 143 is similarly provided between the fourth position 13 and the starting point 143a of the conveyer 143. Vertically moving means (not shown) is provided also between the final point 143b of the conveyer 143 and the third position 18, and the disc holder 7 can ascend from the final point 143b of the conveyer 143 to the third position 18. Thus, a transportation path CP2 of the disc holder 7 which starts from the fourth position 13 and returns to the fourth position 13 via the starting point 143a of the conveyer 143, the final point 143b of the conveyer 143 and the third position 18 is formed so as to form a plane perpendicular to the plane P1.

The circulation of the rigid disc 8 and the disc holder 7 by this disc stacking/separating means D' is as follows.

Figure 22:
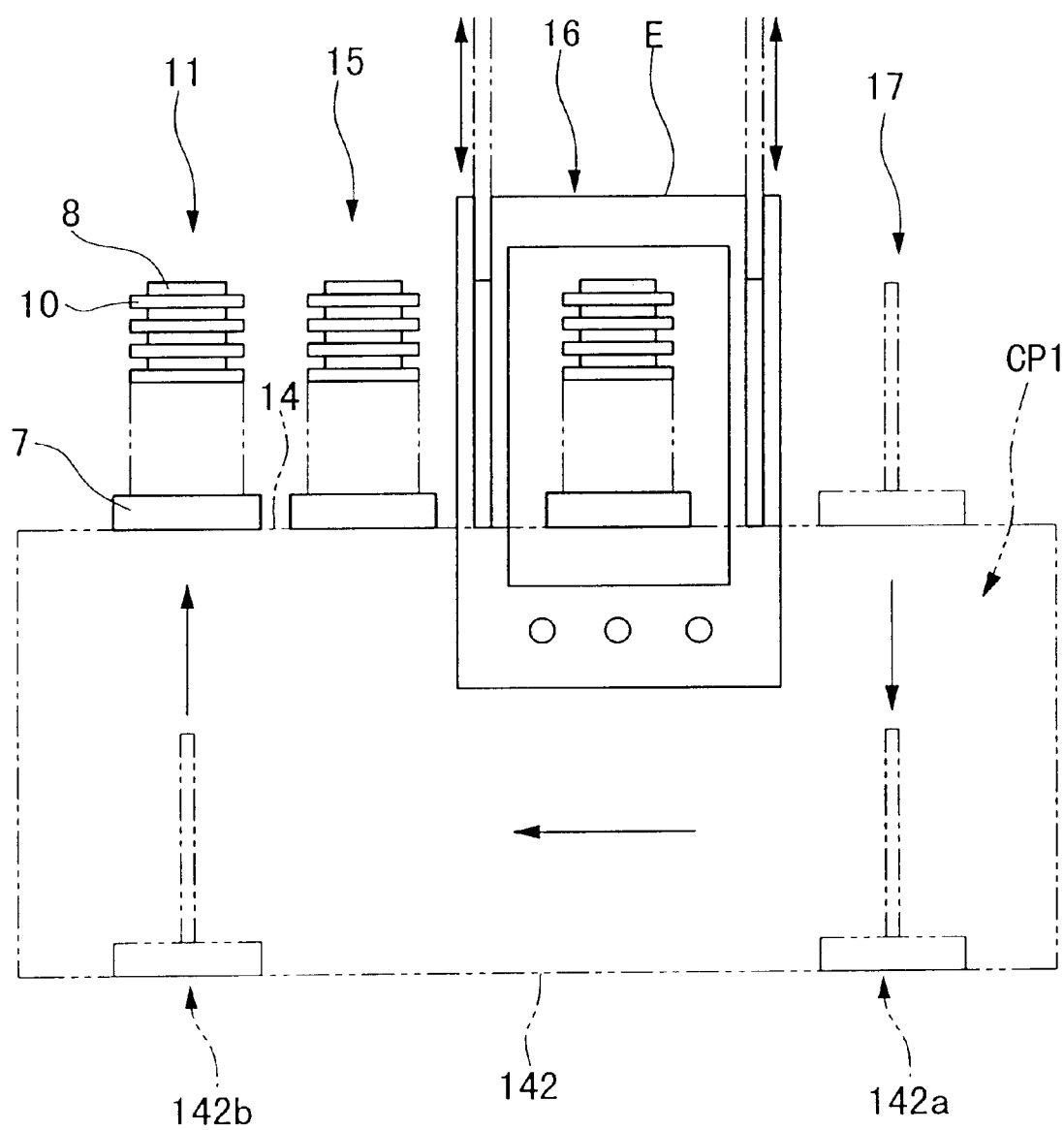
FIG. 22 is an elevation view showing a first transportation path in the disc stacking/separating apparatus of FIG. 21.

The first transportation path CP1 is schematically shown in FIG. 22. The disc 10 transported by the axis alignment transportation apparatus 6 is superposed alternately on the rigid disc 8 one upon another on the disc holder 7 disposed in the first position 11. Next, the disc holder 7 loading the discs 10 stacked in such manner is moved to a fifth position 15, whereby an spreading treatment for the discs 10 is performed in the fifth position 15. Moreover, the disc holder 7 loading the discs 10 is moved to a sixth position 16, whereby a heating treatment for the discs 10 is performed. Then, the disc holder 7 is transported to the second position 17, and the disc 10 and the rigid disc 8 are separated from each other in the second position 17.

The separated disc 10 is moved to a disc checking region R3 and placed thereon. As described later, the rigid disc 8 is moved to the disc holder 7 disposed in the fourth position 13 and placed thereon.

When all of the discs 10 and the rigid discs 8 are moved to the disc checking region R3 and to the fourth position 13 and placed thereon, the disc holder 7 in the second position 17 becomes an empty state. The empty disc holder 7 is allowed to move down to the starting point 142a of the conveyer 142 this time, and transported to the final point 142b by the conveyer 142.

The empty disc holder 7 transported to the final point 142b of the conveyer 142 is made to move from the final point 142b upward, and transported to the first position 11. Thereafter, the disc holder 7 is made to be stacked with the rigid discs 8 and discs 10 one upon another, and transported toward the second position 17.

Figure 23:
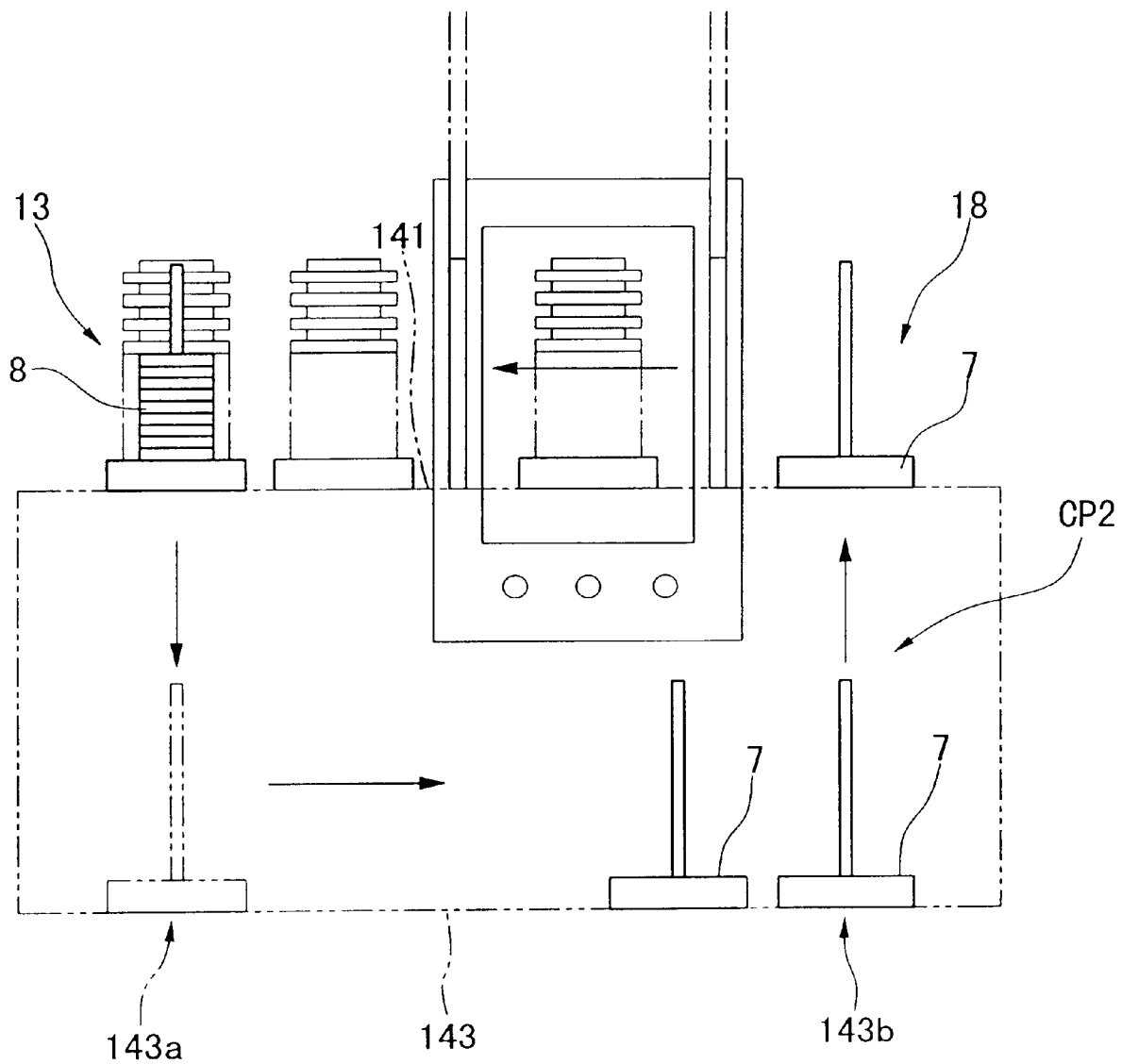
FIG. 23 is an elevation view showing a second transportation path in the disc stacking/separating apparatus of FIG. 21.

On the other hand, FIG. 23 shows the second transportation path CP2 schematically. In FIG. 23, as described above, the rigid disc 8 separated in the second position 17 is moved to the disc holder 7 disposed in the third position 18 and placed thereon. Then, after the rigid discs 8 on the disc holder 7 are stacked by a predetermined amount, the disc holder 7 is transported to the fourth position 13 by the conveyer 141 in a state where the disc holder 7 loads the rigid discs 8. Hereupon, the rigid discs 8 reached to the fourth position 13 are used for superposition of the rigid disc 8 on the disc 10 in the first position By moving and placing the rigid disc 8 onto the first position 11, the disc holder 7 disposed in the fourth position 13 becomes an empty state, and the empty disc holder 7 is allowed to move downward this time. Then, the disc holder 7 is transported to the starting point 143a of the conveyer 143.

Then, this disc holder 7 is transported to the final point 143b by the conveyer 143. In the final point 143b of the conveyer 143, the plurality of empty disc holders 7 is made to be a standby state. After the disc holder 7 that has been stacked the with rigid discs 8 in the third position 18b is transported toward the fourth position 13, another disc holder 7 is supplied toward the third position 18 from the final position 143b side of the conveyer 143.

In the empty disc holder 7 supplied to the third position 18, the rigid discs 8 separated in the second position 17 are stacked, and the disc holder 7 that has been loaded with a predetermined amount of rigid discs 8 is transported to the fourth position 13.

According to the DVD manufacturing apparatus described above, the rigid disc 8 is circularly used in the first, second, third and fourth positions 11, 17, 18 and 13 in the disc stacking/separating apparatus D', and the disc holder 7 is circularly used on the first and second transportation paths CP1 and CP2. Thus, the circular use of the rigid disc 8 and the disc holder 7 is achieved, and effective manufacturing steps can be realized.

In this case, since the first and second transportation paths CP1 and CP2 are formed so as to be perpendicular to the plane P1, much plane space is not required in circularly using the disc holder 7, and it is possible to achieve the circular use of the disc holder 7 effectively in a limited space.

Third Embodiment

Next, a third embodiment of the present invention will be described while taking a manufacture of a DVD as an example with reference to the drawings.

Note that constitutions common to those of the first and second embodiments are denoted by the same reference numerals, and descriptions for that constitution are omitted.

Figure 24:
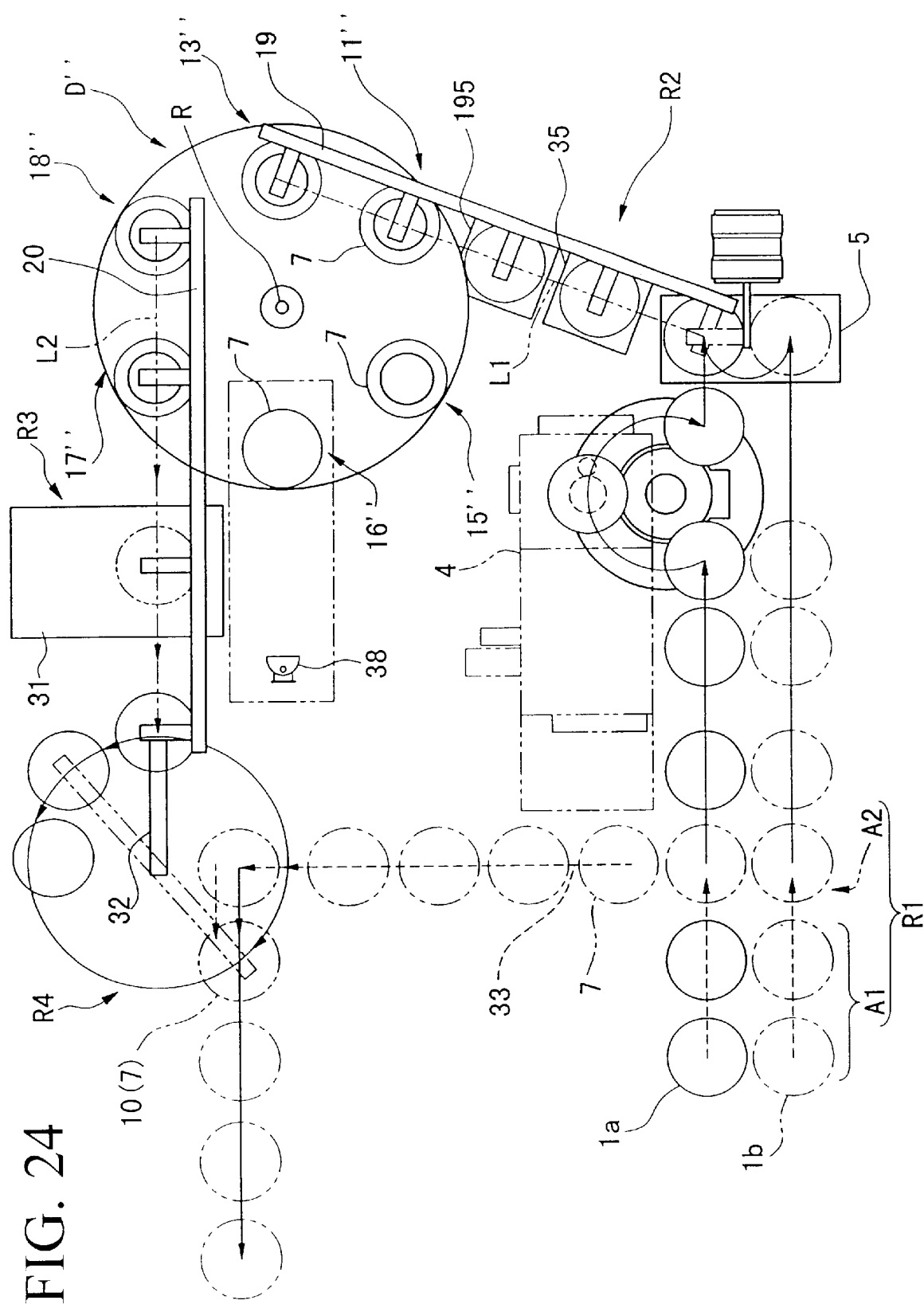
FIG. 24 is a plan view schematically showing a third embodiment of the optical disc manufacturing apparatus according to the present invention.

The DVD apparatus shown in FIG. 24 is roughly constituted by a disc substrate taking-out region R1, a disc preparation region R2, a disc checking region 3 and a disc stacking region R4.

The disc substrate taking-out region R1 is constituted by a stock area A1 in which first and second disc substrates 1a and 1b are held by a disc holder 7 in a stacked state, and a taking-out area A2 for taking out, one by one, the first and second disc substrates 1a and 1b held in the disc holder 7.

Moreover, the disc preparation region R2 is constituted by a dropping and radiating apparatus 4 for dropping UV curable cationic composition onto the first disc substrate 1a; a superposition apparatus 5 for allowing a plane of the first disc substrate 1a, onto which the UV curable cationic composition was dropped, to face the second disc substrate 1b, and superposing the first and second disc substrates 1a and 1b one upon another; a transportation apparatus 19 for transporting a disc 10 formed in the superposition apparatus 5; a disc stacking/separating apparatus D" for performing spreading and end curing treatments for the disc 10; and a transferring apparatus 20 for moving the disc 10 from the disc stacking/separating apparatus D" to the disc checking region R3 and placing thereon.

Moreover, the disc checking region R3 is constituted by a disc checking apparatus 31 which checks whether the disc 10 formed is a non-defective product or not. The disc stacking region R4 is constituted by a disc selection/stacking apparatus 32 for ejecting the defective disc 10, and stacking the discs 10 judged to be a non-defective product on the disc holder 7.

The disc substrate taking-out region R1, the disc preparation region R2, the disc checking region R3 and the disc stacking region R4 are sequentially disposed so as to form approximately a U character shape when viewed from the above. The disc substrate taking-out region R1 and the disc-stacking region R4 are respectively disposed in a starting point of the U character and a final point thereof A transportation path 33 for transporting an empty disc holder 7 is formed between the disc substrate taking-out region R1 and the disc stacking region R4.

Next, an outline of DVD manufacturing steps in this embodiment will be described.

In the disc substrate taking-out region R1, the first and second disc substrates 1a and 1b stacked on the disc holder 7 in the taking-out area A2 are taken out. In this case, to prevent the simultaneous taking-out of the two or more disc substrates, deflection impartment means 22, 22' and 22" as shown in FIG. 2, FIG. 18 and FIG. 19 are preferably used.

When a predetermined amount of disc substrates are taken out, the disc holder 7 becomes an empty state, and the empty disc holder 7 is transported to the disc stacking region R4 via the transportation path 33.

The UV curable cationic composition is dropped onto one side plane of the first disc substrate 1a among the first and second disc substrates 1a and 1b taken out in such manner, by the dropping and radiating apparatus 4 according to the procedures similar to those of the foregoing first embodiment, and the first disc substrate 1a is superimposed on the second disc substrate 1b in the superimposing apparatus 5.

The disc 10 formed by superimposing the first and second disc substrates 1a and 1b is transported to the disc stacking/separating apparatus D" from the superposition apparatus 5 by the transportation apparatus 19. The transportation apparatus 19 comprises seizing portions 191, 192, 193 and 194 capable of freely seizing and releasing the disc 10 and the rigid disc 8, as shown schematically in FIG. 25.

Among the seizing portions 191 to 194, the seizing portion 193 has a constitution similar to the vacuum suction portion 62 and the air picker 63 in the axis alignment apparatus 6 shown in FIG. 7, and the seizing portion 193 can transport 10 the disc 10 in a state where the central axis of the first and second disc substrates 1a and 1b are made to be coincident with each other. Furthermore, the seizing portions 191 to 194 are disposed at regular intervals on a straight line, and the intervals are in agreement with an interval between the first and fourth positions 11" and 13" in the disc stacking/separating apparatus D". In addition, the seizing portions 191 to 194 are capable of interlocking along the straight line L1 connecting the first and fourth positions 11" and 13" in the disc stacking/separating apparatus D", when viewed from the above.

To move the disc 10 from the superposition apparatus 5 side to the disc stacking/separating apparatus D" side and place the disc 10 thereon, the disc 10 formed in the superposition apparatus 5 is seized by the seizing portion 191 which is disposed closest to the superposition apparatus 5 among the seizing portions 191 to 194, and the seizing portion 191 is allowed to moved along the straight line L1 together with the seizing portions 192, 193 and 194, thus supplying the disc 10 to a pressuring apparatus 35 (see FIG. 24).

Figure 26:
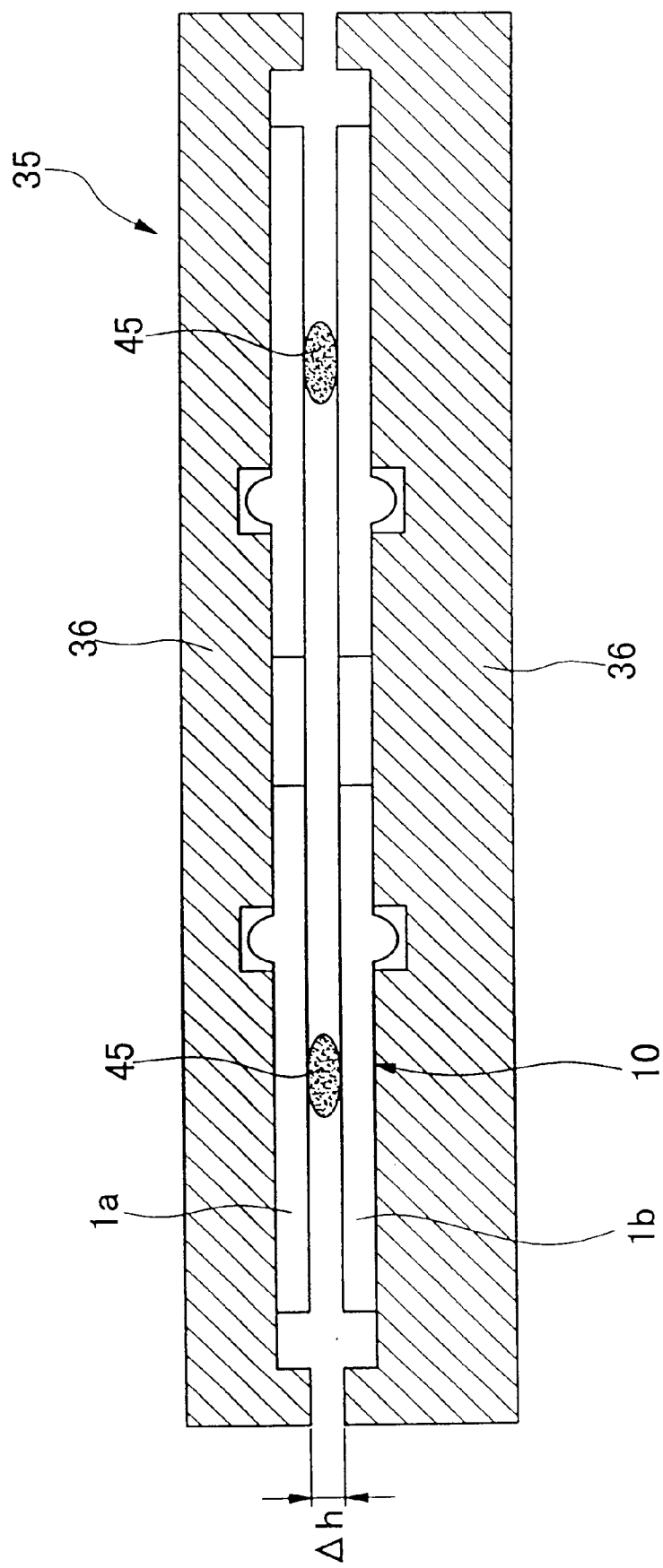
FIG. 26 is an elevation section view schematically showing a pressuring apparatus used for the optical disc manufacturing apparatus of FIG. 24.

The pressuring apparatus 35 comprises a pair of pressuring portions 36 and 36 opposed to each other, which are capable of seizing upper and lower surfaces of the disc 10. When the disc 10 is supplied to the pressuring apparatus 35, the pressuring apparatus 35 pressures from the upper and lower surfaces of the disc 10 by the pressuring portion 36 thereof. Hereupon, the pressuring apparatus 35 is formed so that a predetermined gap $\Delta h$ as shown in FIG. 26 is preserved between the pressuring portions 36 and 36, and also the first and second disc substrates 1a and 1b constituting the disc 10 are disposed so as to be opposed to each other in a state where preserving a predetermined gap. In such situation, the UV curable cationic composition between the first and second disc substrates 1a and 1b can be spread after passage of a predetermined period of time. Note that the foregoing gap $\Delta h$ is decided such that the foregoing spreading is performed satisfactorily.

The disc 10 that has undergone the spreading treatment in the pressuring apparatus 35 is seized by the seizing portion 192 this time. The seizing portion 192 transports the disc 10 to an axis alignment transportation buffer 195 (see FIG. 24). Then, the disc 10 supplied to the axis alignment transportation buffer 195 is seized by the seizing portion 193, and supplied onto the disc holder 7 disposed in the first position 11" of the disc stacking/separating apparatus D", in a state where central axes of the first and second disc substrates 1a and 1b are made to be coincident with each other.

At this time, the rigid disc 8 has been already disposed in the disc holder 7 disposed in the disc stacking/separating apparatus D". The disc 10 is disposed so as to be superimposed on the rigid disc 8.

When the disc is supplied to the disc holder 7 disposed in the first position 11" by the seizing portion 193, the seizing portion 194 is on the fourth position 13" of the disc stacking/separating apparatus D" as shown in FIG. 25(b). Hereupon, the seizing portion 194 seizes the rigid disc 8 at the same time when the seizing portion 193 releases the disc 10 in the first position 11". Then, as shown in FIG. 25(a), the seizing portion 194 is allowed to move to the first position 11" together with the seizing portions 191, 192 and 193. When the seizing portion 194 releases the rigid disc 8, the rigid disc 8 can be superimposed on the disc 10 disposed in the first position 11".

At this time, since the seizing portion 193, 192 and 191 respectively moves to a disc waiting portion 195, to the pressuring apparatus 35, and to the superposition apparatus 5, the respective discs 10 positioned in the superposition apparatus 5, the pressuring apparatus 35 and the disc waiting portion 195 are seized by the seizing portions 191, 192 and 193, and the seizing portions 191, 192 and 193 are allowed to move to the positions shown in FIG. 25(b). The seizing portions 191, 192 and 193 release the discs 10, whereby the discs 10 can be sequentially moved from the superposition apparatus 5 to the disc stacking/separating apparatus D" and placed thereon.

Furthermore, the rigid disc 8 is again seized by the seizing portion 194 in a state shown in FIG. 25(b), and the seizing portion 194 releases the rigid disc 8 in a state shown in FIG. 25(a). Thus, the rigid disc 8 can be stacked in the first position 11". Specifically, according to this transportation apparatus 19, the discs 10 can be sequentially moved from the superposition apparatus 5 to the disc stacking/separating apparatus D" and placed thereon, and the rigid discs 8 and the discs 10 can be stacked one upon another in the first position 11".

The disc stacking/separating apparatus D" is constructed so as to allow the disc holder 7 to move circularly among the first position 11", the fifth position 15", the sixth position 16", the second position 17", the third position 18" and the fourth position 13" which are positioned on the same circumference of a circle around the center R as a rotation center. When the discs 10 and the rigid discs 8 are stacked on the disc holder 7 in the first position 11" by a predetermined weight by the foregoing transportation apparatus 19, the disc stacking/separating apparatus D" allows this disc holder 7 to move to the fifth position 15" and a predetermined period of time to elapse. Thus, the spreading of the UV curable cationic composition on the disc 10 is securely performed.

Subsequently, the disc stacking/separating apparatus D" allows the disc holder 7 loaded with the discs 10 to move to the sixth position 16", and performs an end curing treatment (curing promotion treatment). The end curing treatment is a treatment for aiming at the following objects. Since the curing of the UV curable cationic composition exposing to the outside from the stuck plane of the disc 10 is delayed, obstacle to disc handling are brought about. Accordingly, the curing of the UV curable cationic composition is promoted by means for radiating ultraviolet rays onto the end of the disc or means for heating the disc using a heater 38.

Next, the disc stacking/separating apparatus D" allows the disc holder 7 loaded with the disc 10 to move to the second position 17". In this second position 17", the discs 10 and the rigid discs 8 are separated from each other by a transferring apparatus 20. The transferring apparatus 20 comprises seizing portions 201, 202 and 203 as shown in FIG. 27. The seizing portions 201, 202 and 203 are formed so as to be able to seize and release the disc 10 and the rigid disc 8, and disposed at regular intervals on a straight line. Moreover, a distance between the seizing portions 201 and 202, 202 and 203 is in agreement with a distance between the second position 17" and the third position 18". In addition, the seizing portion 201, 202 and 203 are capable of interlocking along the straight line L2 connecting the second position 17" and the third position 18" when viewed from the above.

Among the seizing portions 201, 202 and 203, the seizing portion 201 closer to the disc stacking/separating apparatus D". first seizes the rigid disc 8 on the disc holder 7 in the second position 17" as shown in FIG. 27(a). Then, the seizing portion 201 is allowed to move to the third position 18" as shown in FIG. 27(b), and the seizing portion 201 releases the rigid disc 8 there, so that the rigid discs 8 are disposed on the disc holder 7 of the third position 18" so as to be stacked. At this time, since the seizing portion 202 is on the second position 17", the seizing portion 202 is allowed to seize the disc 10 and to move to a disc checking apparatus 31 to be described later as shown in FIG. 27(a). Then, the seizing portion 202 is allowed to release the disc 10. Thus, the disc 10 can be moved from the second position 17" to the disc checking apparatus 31 and placed thereon. In addition, at this time, since the seizing portion 201 is on the second position 17" as shown in FIG. 27(a), the rigid disc 8 can be seized. By repetition of such operation, the discs 10 and the rigid discs 8 can be separated in the second position 17", and the rigid discs 8 separated can be stacked in the disc holder 7 in the third position 18".

In FIG. 27(b), the seizing portion 203 is positioned above the disc checking apparatus 31, and in FIG. 27(a), the seizing portion 203 is positioned above the disc selecting/separating apparatus 32 to be described later. Accordingly, by seizing the disc 10 on the disc checking apparatus 31when the seizing portion 203 is in the position shown in FIG. 27(b), and by releasing the disc 10 when the seizing portion 203 is in the position shown in FIG. 27(a), the disc 10 can be moved from the disc checking apparatus 31 to the disc selecting/separating 32 and placed thereon.

On the other hand, the rigid discs 8 stacked on the disc holder 7 in the third position 18" are transported to the fourth position 13", and used there for the superposition operation of the disc 10 and the rigid disc 8 in the first position 11".

The discs 10 are moved from the disc stacking/separating apparatus D" to the disc checking apparatus 31 and placed thereon, and the check whether the disc 10 is a non-effective product or not is performed. The disc 10 after checking are moved to the disc selecting/stacking apparatus 32 by the seizing portion 203 and placed thereon, as described above. In the disc selecting/stacking apparatus 32, the discs 10 decided to be the defective product in the disc checking apparatus 31 are screened, and only the discs decided to be the non-defective product are disposed on the disc holder 7 which has moved from the disc substrate taking-out region R1 via the transportation path 33, so as to be stacked. The discs 10 which are disposed so as to be stacked in such manner are loaded on the disc holder 7, and further transported to the next step.

According to the DVD manufacturing apparatus described above, since in the disc stacking/separating apparatus D", the disc holder 7 is allowed to move circularly among the first position 11", the fifth position 15", the sixth position 16", the second position 17", the third position 18" and the fourth position 13" sequentially which are disposed on the same circumference of a circle, a circulation and reuse of the disc holder 7 can be realized with a simple constitution.

Furthermore, the seizing portions 183 and 184 of the transportation apparatus 19 interlock on the straight line L1, whereby the rigid disc 8 and the disc 10 are alternately stacked one upon another in the first position 11". Accordingly, a transportation efficiency of the discs 10 is satisfactory, and a productivity of the discs 10 is high.

In addition, also in the transferring apparatus 20, the seizing portions 201 and 202 interlock on the straight line L2, whereby the rigid discs 8 and the discs 10 are separated from each other in the second position 17". Thus, the rigid discs 8 and the discs 10 can be separated with a high efficiency, and a productivity is high.

Furthermore, the disc substrate taking-out region R1 and the disc stacking region R4 are connected to each other by the transportation path 33, and the empty disc holder 7 can be circularly reused, so that it is possible to practically use the disc holder 7 more effectively. Moreover, since the disc substrate taking-out region R1, the disc preparation region R2, the disc checking region R3 and the disc stacking region R4 are disposed so as to form approximately an U-character shape, it is possible to shorten the transportation path 33, and an excellent spatial efficiency is achieved.

In the above described embodiments, in an optical disc manufacturing apparatus, dehumidification means may be provided for any one or the both of the step for performing from the dropping to spreading treatments of the UV curable cationic composition 45 and the step for performing the end curing treatment of the UV curable cationic composition 45, and the above described steps may be performed under low humidity environment. Thus, inhibition of curing of the UV curable cationic composition 45 is satisfactorily prevented.

INDUSTRIAL APPLICABILITY

An optical disc manufacturing apparatus of the present invention is for manufacturing an optical disc such as a DVD adopting a bonding method. Ultraviolet rays are previously radiated onto UV curable cationic composition, and thereafter the UV curable cationic composition is spread on a disc substrate on a statically placing plane. Thus, the disc can be manufactured. Therefore, the obtained disc is free from air bubble trapping and unevenness in curing, and a deformation of the disc after sticking can be avoided.

What is claimed is:

1. An optical disc manufacturing apparatus comprising:
   a nozzle for ejecting UV curable cationic composition;
   ultraviolet radiation means for radiating ultraviolet rays while the UV curable cationic composition dropping from the nozzle reaches a disc substrate; and
   superposition means for superimposing said disc substrate with another disc sobstrate by allowing planes thereof on which said UV curable cationic composition is dropped to be faced, and for forming one optical disc.

2. The optical disc manufacturing apparatus according to claim 1, comprising:
   a placing plane for placing said disc substrates while spreading said UV curable cationic composition between said two disc substrates superimposed by said superposition means.

3. The optical disc manufacturing apparatus according to claim 2, further comprising:
   an optical disc superimposing means for superposing a plurality of optical discs, and
   rigid disc placing means for placing a rigid disc including a flat plane on said optical disc, between pairs of the optical discs, in the course of stacking the plurality of optical discs.

4. The optical disc manufacturing apparatus according to claim 3, further comprising
   an optical disc stacking/separating apparatus superimposing the rigid disc having the flat plane on said optical disc, allowing said UV curable cationic composition to spread, and separating said disc and said rigid disc from each other after completion of spreading, and
   wherein said optical disc stacking/separating apparatus comprises:
      disc holders each including a pedestal and a spindle and disposed respectively in different first and second positions;
      disc holder circulating means for allowing said disc holders disposed in said first and second positions to circularly move sequentially;
      stacking means for stacking said optical discs and said rigid discs alternately one upon another on the disc holder disposed in said first position; and
      separating means for separating said optical discs and said rigid discs from each other, which are stacked one upon another, on said disc holder disposed in said second position, and for allowing said rigid discs separated to be stacked on a disc holder disposed on a third position different from said first and second positions,
      the disc holder disposed in said third position moving to a fourth position different from any of said first to third positions in a state where said disc holder disposed in said third position is stacked with said rigid discs, and
      said stacking means performs a superposition of said disc and said rigid disc by use of said rigid discs stacked on the disc holder disposed in said fourth position.

5. The optical manufacturing apparatus according to claim 1, further comprising
   an ultraviolet exposure prevention cover covering a periphery of an ejection opening of said nozzle.

6. The optical manufacturing apparatus according to claim 1,
   said apparatus further comprising:
   holding means for holding said disc substrate;
   axis alignment means for allowing a position of an inner wall plane of a hole portion in one disc substrate to be coincident with that of the other disc substrate; and
   moving means for moving said holding means and said axis alignment means together.

7. The optical disc manufacturing apparatus according to claim 1, comprising:
   a heater for performing a heating treatment for a plurality of optical discs while superposed.

8. The optical disc manufacturing apparatus according to claim 1,
   further comprising:
      a disc substrate taking-out region for taking out disc substrates one by one from a disc holder for holding a plurality of stacked disc substrates;
      a disc preparation region comprising said nozzle and said ultraviolet radiation means, wherein one optical disc is obtained by sticking together two taken-out disc substrates with said UV curable cationic composition therebetween;
      a disc checking region for checking the obtained optical disc; and
      a disc stacking region for stacking the optical disc after checking on said disc holder.

9. The optical disc manufacturing apparatus according to claim 1, wherein the UV curable cationic composition falls a vertical distance between the nozzle and a disc substrate, whereby the UV curable cationic composition is at least partly irradiated while freely falling onto the disc substrate.

10. The optical disc manufacturing apparatus according to claim 9, wherein the vertical distance is greater than a droplet size of the UV curable cationic composition.

* * * * *